(12) United States Patent
Sawada et al.

(10) Patent No.: US 7,676,401 B2
(45) Date of Patent: Mar. 9, 2010

(54) DATA DISTRIBUTION SYSTEM AND DATA SELLING APPARATUS THEREFOR, DATA RETRIEVING APPARATUS, DUPLICATED DATA DETECTING SYSTEM, AND DATA REPRODUCTION APPARATUS

(75) Inventors: Yuji Sawada, Osaka (JP); Hisashi Saiga, Tenri (JP); Masafumi Yamanoue, Yamatokoriyama (JP); Keisuke Iwasaki, Ikoma-Gun (JP); Yoshihiro Kitamura, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 0 days.

(21) Appl. No.: 11/314,017

(22) Filed: Dec. 20, 2005

(65) Prior Publication Data

US 2006/0106677 A1    May 18, 2006

Related U.S. Application Data

(62) Division of application No. 09/647,086, filed on Sep. 26, 2000, now abandoned.

(51) Int. Cl.
G06Q 30/00    (2006.01)
(52) U.S. Cl. ......................................................... 705/26
(58) Field of Classification Search .................. 705/26, 705/27
See application file for complete search history.

(56) References Cited

U.S. PATENT DOCUMENTS

| 4,674,055 A | 6/1987 | Ogaki et al. |
| 5,132,992 A | 7/1992 | Yurt et al. |
| 5,195,092 A | 3/1993 | Wilson et al. |

(Continued)

FOREIGN PATENT DOCUMENTS

EP    0 593 305 A2    4/1994

(Continued)

OTHER PUBLICATIONS

Abhijit K. Choudhury, et al. ;*Copyright Protection for Electronic Publishing Over Computer Networks*; IEEE Network; May/Jun. 1995; No. 3; New York, US; pp. 12-20.

(Continued)

*Primary Examiner*—Mila Airapetian
(74) *Attorney, Agent, or Firm*—Edwards Angell Palmer & Dodge LLP; David G. Conlon; David A. Tucker

(57) ABSTRACT

A data distribution system includes a plurality of data sources each capable of transmitting a data item, and a data vending machine capable of receiving the data item from the plurality of data sources and selling the received data item to a user. The data vending machine includes a data selecting apparatus operated by a user to select a desired data item, a data source selecting apparatus connected to the data selecting apparatus for selecting, among the plurality of data sources, one that holds the data item selected by the data selecting apparatus, in accordance with a specific standard, a data receiving apparatus connected to the data source selecting apparatus for receiving selected data item from the data source selected by the data source selecting apparatus, and a data updating apparatus to which an external storage device is detachably mounted, for writing the data item received by the data receiving apparatus to the external storage device.

4 Claims, 44 Drawing Sheets

U.S. PATENT DOCUMENTS

| | | | |
|---|---|---|---|
| 5,633,839 A | 5/1997 | Alexander et al. | |
| 5,761,651 A | 6/1998 | Hasebe et al. | |
| 5,825,731 A | 10/1998 | Yokota | |
| 5,892,900 A | 4/1999 | Ginter et al. | |
| 5,987,607 A | 11/1999 | Tsumura | |
| 6,282,611 B1 | 8/2001 | Hamamoto et al. | |
| 6,385,596 B1 | 5/2002 | Wiser et al. | |
| 7,047,241 B1 * | 5/2006 | Erickson | 707/9 |
| 7,079,649 B1 * | 7/2006 | Bramhill et al. | 382/233 |
| 2002/0002688 A1 * | 1/2002 | Gregg et al. | 713/202 |

FOREIGN PATENT DOCUMENTS

| | | |
|---|---|---|
| EP | 0 807 894 A1 | 11/1997 |
| JP | 59-100968 A | 6/1984 |
| JP | 61-134836 | 6/1986 |
| JP | 62-047760 A | 3/1987 |
| JP | 62-251833 | 11/1987 |
| JP | 63-118838 | 5/1988 |
| JP | 63-195754 | 8/1988 |
| JP | 01-227270 | 9/1989 |
| JP | 02-001090 | 1/1990 |
| JP | 02-047771 | 2/1990 |
| JP | 03-003074 | 1/1991 |
| JP | 04-086177 | 3/1992 |
| JP | 04-086177 A | 3/1992 |
| JP | 04-153795 A | 5/1992 |
| JP | 05-210786 A | 8/1993 |
| JP | 05-83948 | 11/1993 |
| JP | 06-106884 A | 4/1994 |
| JP | 06-119551 A | 4/1994 |
| JP | 06-150146 | 5/1994 |
| JP | 06-169275 A | 6/1994 |
| JP | 6-64840 | 8/1994 |
| JP | 06-230847 A | 8/1994 |
| JP | 06-85196 | 10/1994 |
| JP | 06-332799 | 12/1994 |
| JP | 07-028681 A | 1/1995 |
| JP | 07-114501 | 5/1995 |
| JP | 07-249262 | 9/1995 |
| JP | 08-016619 | 1/1996 |
| JP | 08-054952 A | 2/1996 |
| JP | 08-083206 | 3/1996 |
| JP | 08-149451 | 6/1996 |
| JP | 08-241260 A | 9/1996 |
| JP | 08-263440 | 10/1996 |
| JP | 09-008850 A | 1/1997 |
| JP | 09-073337 A | 3/1997 |
| JP | 09-128231 | 5/1997 |
| JP | 09-128875 A | 5/1997 |
| JP | 09-179820 A | 7/1997 |
| JP | 09-212517 | 8/1997 |
| JP | 09-245438 A | 9/1997 |
| JP | 09-297770 A | 11/1997 |
| JP | 09-319570 A | 12/1997 |
| JP | 09-322133 | 12/1997 |
| JP | 10-021248 | 1/1998 |
| JP | 10-049469 | 2/1998 |
| JP | 10-049986 | 2/1998 |
| KR | 1989-0013636 | 9/1989 |
| KR | 1996-0025662 | 12/1995 |
| KR | 1997-0050695 | 7/1997 |
| KR | 1997-0076311 | 12/1997 |
| WO | WO-95/15649 | 6/1995 |

OTHER PUBLICATIONS

M. Shibamiya et al.; *Security Management Technlogy*; pp. 15-28, with English language translation.

* cited by examiner

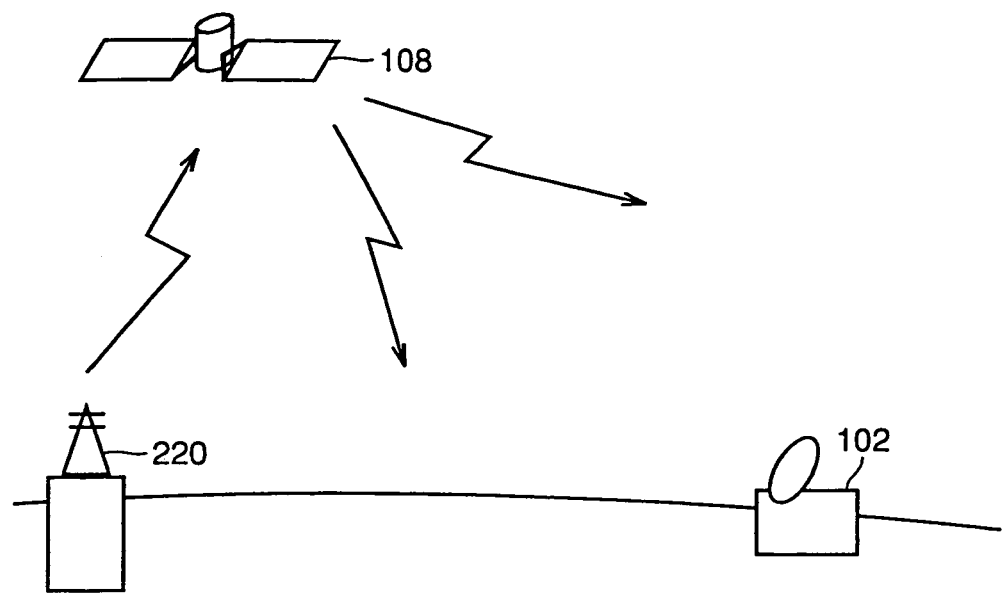

| 140 | 142 | 144 | 260 | 148 | 262 | 264 |
|---|---|---|---|---|---|---|
|  | As You Like It | 400 | 1 0 1 0 0 | 14636 | 122 | 1997/10/23 15:00:42 |
| 3 | Moby Dick | 800 | 0 1 1 0 0 | 31744 | 150 | 1997/11/14 9:32:54 |
|  | Sound and the Fury | 250 | 1 1 1 1 1 | 10305 | 450 | 1997/12/30 23:26:14 |

266

240

| FIRST BYTE 520 | LAST BYTE 522 | DEPTH LEVEL 524 | IDENTIFICATION NUMBER 526 | SUBLEVEL ITEM NUMBER 528 | COMPONENT NAME |
|---|---|---|---|---|---|
| 0 | 112356 | 0 | 0 | 5 | WHOLE BOOK |
| 320 | 7618 | 1 | 0 | 0 | PREFACE |
| 7619 | 28005 | 1 | 1 | 3 | CHAPTER 1 |
| 7704 | : | 2 | 0 | 0 | SECTION 1 |
| : | : | 2 | 1 | 0 | CHAPTER 1, SECTION 2 |
| : | : | 2 | 2 | 0 | CHAPTER 1, SECTION 3 |
| : | : | 1 | 2 | 2 | CHAPTER 2 |
| : | : | 2 | 0 | 0 | CHAPTER 2, SECTION 1 |
| : | : | 2 | 1 | 0 | CHAPTER 2, SECTION 2 |
| : | : | 1 | 0 | 4 | CHAPTER 3 |
| : | : | 2 | 0 | 0 | CHAPTER 3, SECTION 1 |
| : | : | 2 | 1 | 0 | CHAPTER 3, SECTION 2 |
| : | : | 2 | 2 | 0 | CHAPTER 3, SECTION 3 |
| : | : | 2 | 3 | 0 | CHAPTER 3, SECTION 4 |
| 109503 | 112304 | 1 | 0 | 0 | POSTSCRIPT |

510 points to row with 0/112356; 512 to 320/7618; 514 to 7619/28005.

| 890 | 892 |
|---|---|
| 15438 | 1997/9/29 15:00:34 |
| 848578 | 1997/9/29 14:20:50 |
| 114571 | 1997/9/29 13:21:05 |
| 843 | 1997/9/28 23:45:32 |
| 24056 | 1997/9/29 13:08:18 |
| 8043 | 1997/9/29 14:38:01 |
| 115 | 1997/9/29 15:03:36 |
| 9947574 | 1997/9/29 14:32:23 |
| | |
| | |

874

| 1160 — | MANAGEMENT INFORMATION AREA IDENTIFIER | 2 | — 1150 |
| --- | --- | --- | --- |
| 1162 — | DATA SIZE | 4 | |
| 1164 — | BIBLIOGRAPHIC INFORMATION AREA | n | |
| 1166 — | COPY PERMISSION INFORMATION AREA | n | |
| 1168 — | REPRODUCING APPARATUS SPECIFYING INFORMATION AREA | n | |
| 1170 — | ------------ | | |

FIG.60

| 1180 — | COPY PERMISSION INFORMATION IDENTIFIER | 2 | — 1160 |
|---|---|---|---|
| 1182 — | DATA SIZE | 4 | |
| 1184 — | COPY PERMISSION VALUE | 1 | |

FIG.61

| 1190 — | DISPLAY APPARATUS ID INFORMATION IDENTIFIER | 2 | — 1168 |
|---|---|---|---|
| 1192 — | DATA SIZE | 4 | |
| 1194 — | DISPLAY APPARATUS ID INFORMATION | n | |

DATA DISTRIBUTION SYSTEM AND DATA SELLING APPARATUS THEREFOR, DATA RETRIEVING APPARATUS, DUPLICATED DATA DETECTING SYSTEM, AND DATA REPRODUCTION APPARATUS

This is a divisional patent application of U.S. patent application Ser. No. 09/647,086 filed 26 Sep. 2000 now abandoned, by (the same inventors as of this divisional application), entitled DATA DISTRIBUTING SYSTEM AND DATA SELLING APPARATUS THEREFOR, DATA RETRIEVING APPARATUS, DUPLICATED DATA DETECTING SYSTEM, AND DATA REPRODUCTION APPARATUS

TECHNICAL FIELD

The present invention relates to a system for distributing digital data such as electronic book data recorded electronically as well as to a data vending machine therefor and a data reproducing apparatus. More specifically, the present invention relates to a data distribution system in which data recorded on a storage medium through a data distributing apparatus is used in the form of reproduction by an apparatus of a user, for example, a data vending machine and a data reproducing apparatus therefor, and to a system promoting distribution of data storage medium recorded legitimately in such a data distribution system.

BACKGROUND ART

Along with the recent development of network technique and accompanying digital implementation of book data, music data and so on, a technique of distributing data using a communication network has been developed. Examples of such a technique are disclosed, for example, in Japanese Patent Laying-Open No. 2-47771 and Japanese Patent Publication No. 5-83948. The inventions disclosed in these published documents relate to a technique for down-loading electronic book data to a storage device such as a memory or a hard disk through a communication network and not through a bookstore, and reproducing the data by a reproducing apparatus.

More specifically, Japanese Patent Laying-Open No. 2-47771 discloses an information transmitting system including a data supplying apparatus and a data reproducing apparatus connected thereto by a communication network. The data reproducing apparatus instructs the data supplying apparatus on the data to be retrieved, through the communication network. The data supplying apparatus includes a data base storing a number of data groups, a searching apparatus searching any of the data groups in the data base in accordance with the instructions from the reproducing apparatus, and a communication apparatus for data transmission/reception to and from the data reproducing apparatus.

The data supplying apparatus structured in this manner retrieves the data group instructed by the data reproducing apparatus from the data base, in response to a request from the data reproducing apparatus and transmits the data group through the communication apparatus and the communication network to the data reproducing apparatus. The data reproducing apparatus has a storage device storing the data group, and displays page by page the data group stored in the storage device, based on an instruction from the user. Thus it is possible for the user to obtain data of a book and the like simply through the communication network, without any intervenient bookstore. It is possible for the user to reproduce the data at any time and at any place as needed, using the data reproducing apparatus.

Japanese Patent Publication No. 5-83948 discloses a public information vending system including one or a plurality of public information vending machines installed at places readily accessible by unspecified number of information purchasers, and one or a plurality of information source apparatuses connected to the public information vending machines through a communication network. In this system, the information purchaser connects to any of the information source apparatuses that contains information of which purchasing is desired through the public information vending machine and the communication network, and makes a transaction for purchasing the desired information. Confirmation of an identification ensuring adjustment or payment of charges takes place at the time of completion of the transaction contract at the public information vending machine. At the same time, the purchaser can obtain immediately the desired information from appropriate information source apparatus through the public information vending machine and the communication network. It is expected that such a system promotes distribution of information.

In such a transaction, the information is once recorded on a storage medium and reproduced by the reproducing apparatus. As the digital data allows easy copying of data and are free of any degradation of data in data reproduction, there arises a problem of how to prevent unauthorized copying of the storage medium. Conventionally, a method has been known as one such technique in which copying is restricted by a flag indicating prohibition or allowance of copying. In accordance with such a method, when a recording apparatus is connected to a reproducing apparatus and an attempt is made to copy the data reproduced by the reproducing apparatus on a storage medium by the recording apparatus, the recording apparatus checks the flag embedded in the data. If the flag has a value that means copy-prohibited, the recording apparatus prohibits copying, or provides analog outputs instead of digital outputs, so as to prevent digital copying.

SCMS (Serial Copy Management System) employed for a DAT (Digital Audio Tape) has been known as a representative example of such technique. In SCMS, a copy flag of 2 bits is recorded in multiplexed manner in the data at every prescribed time period, so as to prevent unlimited digital copying. The copy flag has the definitions of "00: copy prohibited", "01: one copy allowed", "10: reserved" and "11: copy allowed," and copying is controlled by an appropriate operation in accordance with the copy flag.

The conventional technique outlined above is very convenient for distributing electronic data to the users. Actual use of such technique, however, has the following problems.

(1) When the capacity of the data to be distributed increases, necessary time for transmission becomes longer, resulting in excessively long wait time of the user. When the object of electronic distribution is extended to publications including a large number of photographs and/or pictures such as a picture book or a photograph album or further to CD (Compact Disk) albums having larger capacities than the text data, such an excessive wait time imposes a great difficulty in spreading the system. The time necessary for the user to obtain a desired book or the like through the common sales route, for example, at a bookstore, is generally unrelated to the contents of the publication. Therefore, solution of this problem is critically important if the system for distributing electronic data through communication is to be practically implemented.

(2) The problem of copyright protection is very important in a simple system of data distribution. If protection of copying of digital data is not at all afforded, it is impossible to detect any unauthorized copy by a malicious user purchasing the electronic data. This is a major difference between a paper document which requires time for copying and the electronic data. Embedding a copy flag within the data, as described above, may be a solution to this problem. Nevertheless, unauthorized copying cannot be prevented if an apparatus which ignores the copy flag is used as the recording apparatus. In other words, practical implementation of such data distribution system requires technical support to solve not only the technical problems but also institutional constraints including copyright protection.

(3) Another problem of the conventional technique is that a situation where various data sources (information sources) utilizing different communication rates and different communication methods coexist is not taken into consideration. For example, computers of various generations may possibly be the data sources, and the speed of processing of the computers may vary widely. Storing capacities thereof may also differ widely. Further, the method and the rate of communication may vary widely, possibly including wired communication, wireless communication, communication through optical communication, satellite network or satellite broadcast allowing broadcast of same data to multiple points simultaneously. Therefore, when there are a plurality of data sources holding data desired by a user, it becomes a problem from which data source the data should be received. In such a case, it is desired that an optimal data source can be selected automatically based on various standards.

As such various and wide data sources were not expected conventionally, optimization of data source selection has not been considered.

(4) Conventionally, a so-called "browsing in a bookstore" has been possible. When one wishes to a buy a book, he/she may actually look into the contents before determining to buy or not to buy the book. Electronic distribution of data makes it difficult for the user to examine the contents of the data before the purchase. In the conventional technique described above, accounting of the purchase of the electronic data takes place at the time of purchase, that is, at a time point when the data is received from the data source. Therefore, there is a relatively high possibility for the user to find that the contents of the purchased electronic data is not so interesting as expected. Such a problem may hinder use of the data distribution system by the users.

Japanese Patent Publication No. 6-85196 discloses a software vending machine solving such a problem. The software vending machine has a function of demonstrating the software of the user at the time of purchasing the software. Such a demonstration of the product to be purchased, however, does not allow the user to filly appreciate the true value of the product, except for only a few software products. Similarly, since books generally require significant time to be fully appreciated, they also cannot be sufficiently evaluated by a user according to this method. This problem must be solved to spread the use of the electronic data distribution system.

(5) The conventional technique described above has a problem that what can be purchased is limited to data already in the electronic form. This seems to be a matter-of-fact constrict. Where it is known that wide variety of contents not in the electronic form are available through the traditional route as in the case of books, there would be only a small number of users who would be eager to use such an electronic data distribution system that allows access to information of very limited contents. Therefore, a system allowing purchase of data which may or may not be in the electronic form, in a single manner is desired.

(6) In the conventional technique, the unit of transaction has been, in principle, the whole data of an electronic book, for example. Now, there may be a method of utilizing data in which data source search is conducted by a key word, and a portion including the key word is retrieved. At this time, a user may wish to retrieve not the segments of sentences including the key words but a section, a chapter or other sizable unit from the data source. Conventionally, such an apparatus for retrieving data in such a form from the data source did not exist.

(7) As already described, there is a method of determining whether a copy is allowed or not, based on a value of a copy flag included in the data, when there is an instruction for copying the digital data. When the value of the copy flag is set to indicate "copy prohibited", the user suffers from a problem that it is impossible to copy the data for back up. A back up copy is legitimate and hence there must be some measure for the user's convenience.

Therefore, an object of the present invention is to provide a data distribution system capable of reducing time necessary for data transfer as much as possible, and a data distributing apparatus and a data reproducing apparatus therefor.

Another object of the present invention is to provide a data distribution system effectively preventing unauthorized copying in electronic data distribution.

A still further object of the present invention is to provide a data distribution system capable of distributing data to the user from an optimal data source in accordance with various standards.

An additional object of the present invention is to provide a data distribution system allowing data purchase at a reasonable expense.

A further object of the present invention is to provide a data distribution system allowing a user to select any article other than electronic data.

A still further object of the present invention is to provide a data distribution system allowing distribution of data in a unit of utility value for the user.

DISCLOSURE OF THE INVENTION

The data distribution system in accordance with the present invention includes a plurality of data sources each capable of transmitting data items, and a data vending machine capable of receiving data items from the plurality of data sources and vending the received data items to the user. The data vending machine includes: a data selecting apparatus operated by the user to select a desired data item; a data source selecting apparatus connected to the data selecting apparatus and selecting, among the plurality of data sources, that one which holds the data item selected by the data selecting apparatus, based on a specific standard; a data receiving apparatus connected to the data source selecting apparatus and receiving selected data item from the data source selected by the data source selecting apparatus; and a data updating apparatus having a detachable external storage and writing the data item received by the data receiving apparatus to the external storage.

When the user selects data, it is possible to receive the data from that one of the plurality of data sources that is selected in accordance with a specific standard by the data source selecting apparatus. The specific standard may be defined as the shortest reception time, for example, and it becomes possible for the user to receive the most preferable data source, even if he/she does not have any knowledge of the data sources.

Preferably, the data vending machine includes a data information table storing information specifying desired data items, size of each data item, and information specifying a data source holding each data item; and a data rate table storing data transmission rate from the plurality of data sources to the data vending machine. The data source selecting apparatus selects, referring to the data information table and the data rate table, that data source ensuring shortest time for receiving the selected data item.

This structure enables reception of data from the most convenient data source, considering not only the data source but also the data rate of the intermediate transfer path. It is unnecessary for the user to have knowledge of such reception path.

More preferably, the data vending machine charges, at the time of data writing by the data updating apparatus to the external storage, based on price information of the data item already recorded in the external storage, the time of writing the last data item to the external storage recorded in the external storage, and the time obtained with reference to a clock.

As the charge is based on the time period in which the data has been recorded in the external storage, it becomes possible for the user to casually receive and utilize data, different from the purchase of data conducted conventionally. Any data item which is of no interest to the user may be soon overwritten by other data, and hence the charge to the user would be little.

In another embodiment, the data vending machine further charges, at the time of data writing by the data updating apparatus to the external storage, based on the price information of the data item which has been recorded on the external storage, and on the information related to reproduction of the data item already recorded in the external storage.

As the charge is based on the state of use of the data item, it becomes possible for the user to casually receive and utilize data, different from the conventional purchase of data. Any data item not of interest to the user may not be used frequently, and hence the charge to the user would be little.

More preferably, the data vending machine further includes a data buffering apparatus for temporarily storing a received data item, and the data source selecting apparatus handles the data buffering apparatus as one of the plurality of data sources.

As the data buffering apparatus is handled as one of the data sources, it becomes unnecessary to receive data from a distant data source. Further, as the transfer from the data buffering apparatus is far faster as compared with other transfer, the time necessary for the user to obtain the data item can be reduced. Preferably, the data buffered in the data buffering apparatus is selected in accordance with the size of the data item, the time necessary for one transfer of data, the number of times the data has been selected, or in accordance with the combination of these. When the free area of the data buffering apparatus becomes small, the data is selected and erased in accordance with some standard. The data is preferably selected in accordance with the time necessary for one transfer, the size of the data selection, the time past after the data was selected last time, or an arbitrary combination of these.

In another embodiment, the plurality of data sources repeatedly transmit data items respectively, and the data vending machine further includes a transmission schedule table connected to the data source selecting apparatus and storing transmissions schedule of the data items of the plurality of data sources. The data source selecting apparatus refers to the transmission schedule table, selects that data source among the plurality of data sources which allows the earliest reception of the selected data item, and receives the data item.

The plurality of data sources may determine distribution of time allotted for the transmission of respective data items, in accordance with a predetermined standard. For example, time distribution may be determined as a function of frequency of selection of each data item. The plurality of data sources may divide each data item into a plurality of blocks and transmit in time divisional manner. The data receiving apparatus restores the selected data item by receiving and integrating a plurality of blocks corresponding to the selected data item.

The data searching apparatus in accordance with another aspect of the present invention includes: a storage device storing a plurality of data items as a set of partial data items structured as a hierarchy of one or a plurality of levels; a search condition setting apparatus by which the user sets a search condition of which searching is desired by the user as well as a level from which retrieval is desired by the user from one or the plurality of levels; a searching apparatus searching the storage device in accordance with the search condition set by the search condition setting apparatus, and retrieving partial data item matching the search condition of the level set by the user; and a writing apparatus having an external storage detachably attached, writing the partial data item retrieved by the searching apparatus to the external storage.

Thus, it is possible to search and retrieve data satisfying the desired search condition, with the partial data item of a desired level as a unit.

According to another aspect of the present invention, a copied data detecting system includes: a data reproducing apparatus to which an external storage medium is mounted, so that the data item recorded on the external storage medium is reproduced; and a data checking apparatus is connected by communication to the data reproducing apparatus for determining whether or not the external storage medium is mounted on the data reproducing apparatus, reproduction of the data is instructed, and the data was copied without authorization or not. In the normal state of use, each external storage medium has a unique authentication data allotted and recorded thereon, and the authentication data is copied as it is to the external storage medium when copied without authorization. The data reproducing apparatus includes a reproducing apparatus to which an external storage medium can be attached, reproducing a data item recorded on the external storage medium in response to a reproduction instruction, a reproduction switch instructing reproduction of the data item to the reproducing apparatus, and means responsive to an operation of the reproduction switch for transmitting an authentication data recorded on the external storage medium to the data checking apparatus. The data checking apparatus includes a data management table managing the authentication data of the external storage medium which is being reproduced, by recording the authentication data transmitted from the data reproducing apparatus, and determining means for determining whether the external storage medium mounted to the data reproducing apparatus contains an unauthorized copy or not, by determining whether the authentication data transmitted from the data reproducing apparatus already exist in the data management table or not.

As it is possible to determine whether the external storage medium contains an unauthorized copy or not, a necessary action can be taken, discouraging unauthorized copying.

The copied data detecting system in accordance with another aspect of the present invention includes: a data reproducing apparatus to which an external storage medium is mounted so that a data item recorded on the external storage medium is reproduced, and a data checking apparatus that is connected by communication to the data reproducing apparatus determines whether or not the external storage medium is mounted on the data reproducing apparatus and whether or not reproduction of the stored data item is authorized. The data reproducing apparatus includes a reproducing apparatus to which an external storage medium can be attached, reproducing a data item recorded on the external storage medium in response to a reproduction instruction, a reproduction switch instructing reproduction of the data item to the reproducing apparatus, and transmitting means responsive to an operation of the reproduction switch for transmitting authentication data recorded on the external storage medium repeatedly to the data checking apparatus in accordance with a prescribed transmission pattern. The data checking apparatus includes a data management table managing the authentication data of the external storage medium which is being reproduced, by recording the authentication data transmitted from the data reproducing apparatus and the time of transmission, and determining means responsive to the authentication data transmitted from the data reproducing apparatus for determining, based on the record of the data management table and the time of transmission of the authentication data, whether the external storage medium which mounted on the data reproducing apparatus contains an unauthorized copy or not.

As it is possible to determine whether the external storage medium contains an unauthorized copy or not, necessary action can be taken, discouraging unauthorized copying.

According to a still further aspect of the present invention, the copied data detecting system includes a data vending machine vending data to a holder of an external storage medium, by accepting an external storage medium mounted thereto and writing a data item to the external storage medium or updating a data item recorded on the external storage medium; and a data checking apparatus connected by communication to the data vending machine and determining whether the external storage medium mounted on the data vending machine is a record of data copied without authorization. The data vending machine includes a data updating apparatus to which an external storage medium is detachably attached, writing a data item designated by the user to the external storage medium, a data management table managing data by recording authentication data of an external storage medium of which use is prohibited, and means responsive to mounting of the external storage medium to the data updating apparatus, for reading the authentication data of the external storage medium, determining whether the authentication data is for the one of which use is prohibited, by referring to the data management table, and controlling operation of the data updating apparatus in accordance with the result of determination.

As the operation of the data updating apparatus is controlled based on the determination as to whether the external storage medium contains an unauthorized copy or not, it becomes difficult for the holder of the illegitimate copy to perform a desired operation, discouraging unauthorized copying.

According to a still further aspect of the present invention, the digital data reproducing apparatus includes a first determining apparatus determining whether a reproduction apparatus specifying information matches, using apparatus ID information unique to the reproducing apparatus, and a control apparatus enabling or disabling reproduction of the digital data by the reproducing apparatus based on the result of determination by the first determining apparatus.

The digital data is reproduced only when the reproducing apparatus ID information unique to the reproducing apparatus matches the reproducing apparatus specifying information contained in the digital data. No restriction is posed on a legitimate user, including use of a backed up copy. By contrast, a holder of unauthorized copy is not allowed to reproduce digital data.

The reproducing apparatus in accordance with a still further aspect of the present invention reproduces digital data including external storage medium specifying information specifying an external storage medium. The external storage medium specifying information corresponds to the external storage medium identifying information uniquely allotted in advance for each external storage medium. The reproducing apparatus includes an external storage medium identifying information reading apparatus to which an external storage medium can be attached, reading the external storage medium identifying information recorded on the mounted external storage medium, a first determining apparatus determining whether the external storage medium specifying information included in the digital data satisfies a prescribed relation with the external storage medium identifying information, and a control apparatus enabling or disabling reproduction of the digital data by the reproducing apparatus, based on the result of determination by the first determining apparatus.

The digital data is reproduced only when the identifying information of the external storage medium mounted on the reproducing apparatus satisfies a prescribed relation with the external storage medium specifying information included in the digital data. No restriction is posed on a legitimate user, including use of a back up copy. By contrast, the holder of an unauthorized copy is not allowed to reproduce digital data.

BRIEF DESCRIPTION OF THE DRAWINGS

FIG. 6 is a schematic diagram representing a principal of the first embodiment of the present invention.

FIG. 7 is a schematic diagram showing a state of data broadcast from a data satellite in the first embodiment of the present invention.

FIG. 60 is a schematic diagram showing configuration of a copy permission information area in accordance with the twelfth embodiment.

FIG. 61 is a schematic diagram showing a configuration of a reproducing apparatus specifying information area in accordance with the twelfth embodiment.

BEST MODES FOR CARRYING OUT THE INVENTION

First Embodiment

Figure 1:
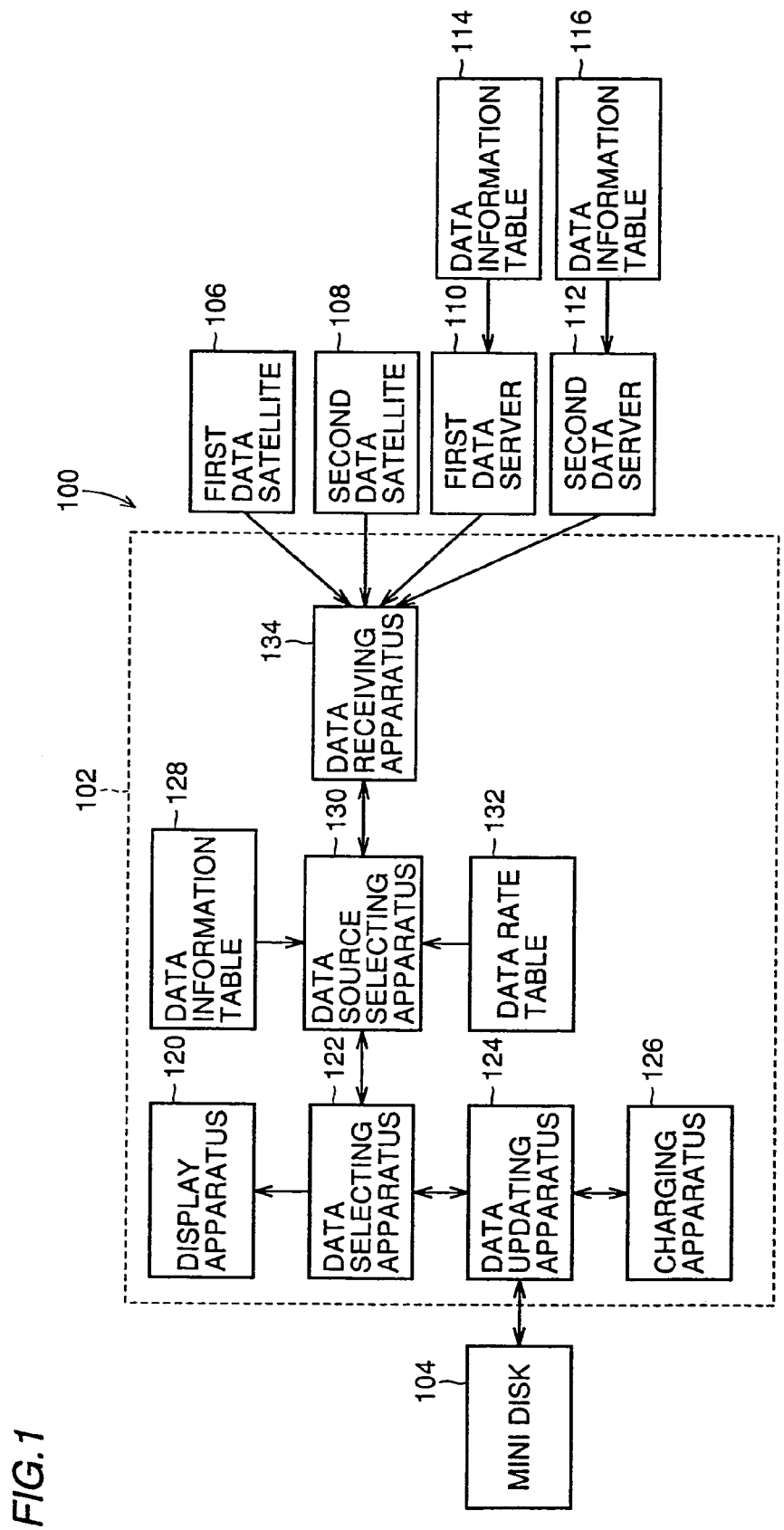
FIG. 1 is a block diagram of a data distribution system in accordance with a first embodiment of the present invention.

Referring to FIG. 1, a data distribution system 100 in accordance with the first embodiment of the present invention includes one or a plurality of data vending machines 102 installed at appropriate places such as in a shop, allowing relatively free use of a user, and data sources 106, 108, 110 and 112 connected through various communication media to data vending machine 102. As an example, the data sources include a first data satellite 106, a second data satellite 108, a first data server 110 and a second data server 112. It is assumed that data vending machine 102 is for vending, by writing, electronic book data, on a storage medium such as a mini disk (MD) 104 or a memory card held by a user. It should be noted, however, that specifications, structures of details or data configuration of various components described below are examples only, and not limiting the scope of the present invention. The same applies to other embodiments.

The data vending machine 102 includes: a data information table storing various information related to data available at any of the data sources; a data rate table 132 storing a communication rate between the data vending machine 102 and each of the data sources; a data receiving apparatus 134 for receiving data from each of the data sources 106, 108, 110 and 112; a display apparatus 120 and a data selecting apparatus 122 functioning in cooperation to present information necessary for the user to select a desired data, while making reference to the contents of data information table 128; a data source selecting apparatus 130 selecting a data source for retrieving the data selected by the data selecting apparatus 122 and receiving data through the data receiving apparatus 134, with reference to data information table 128 and data rate table 132; a data updating apparatus 124 for writing the received data to the mini disk 104 or rewriting data which has been stored in mini disk 104 with the received data; and a charging apparatus 126 for charging for the data written to mini disk 104.

As will be described later, a data information table 114 and a data information table 116 having the same contents as the data information table 128 held in data vending machine 102 are held by the first data server 110 and the second data server 112, respectively.

As can be seen in the figure, data receiving apparatus 134 is connected to the first data satellite 106, the second data satellite 108, the first data server 110 and the second data server 112, and receives data. Though a plurality of data vending machines 102 may be used in the present system, the system may contain only one data vending machine 102. In any case, the operation of data vending machine 102 is not much different. Therefore, in the following, description will be given with reference to a data distribution system 100 having one data vending machine 102, as a representative.

Figure 2:
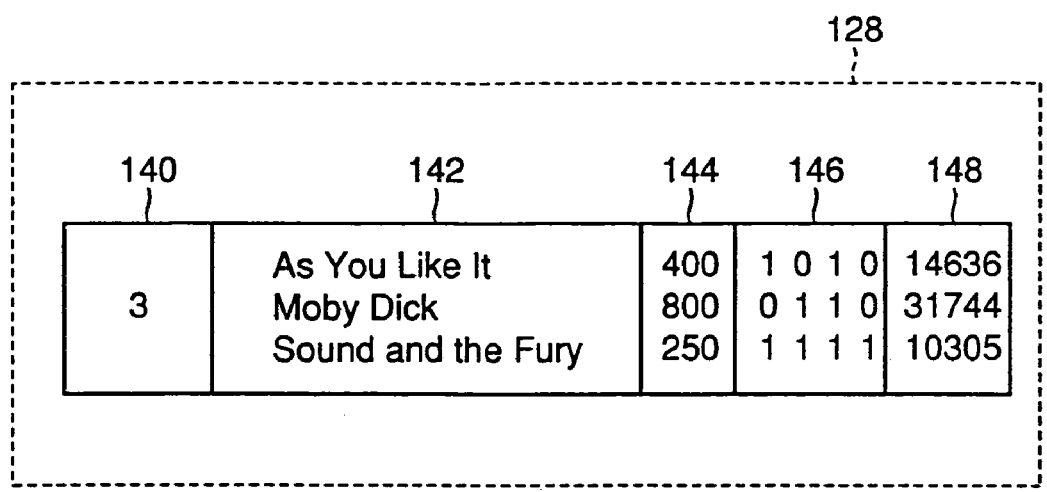
FIG. 2 is a schematic diagram showing a data information table of the first embodiment.

Referring to FIG. 2, the data information table 128 held by data vending machine 102 includes: a data number field 140 representing the number of selectable data; a name field 142 storing names of selectable data; a price field 144 storing price data representing sales price of each data; a data source field 146 representing data source where each data exists; and a size field 148 representing, in bytes, the size of each data. The number of data names stored in the name field 142 is the same as the number stored in the data number field 140.

The data number field 140 represents the number of selectable data by a 2-byte unsigned integer. In the example shown in FIG. 2, the number of selectable data items is 3.

Here, it is assumed that 36 characters of ASCII code are used for storing one piece of data in the name field 142. When the length of the data name exceeds 32 characters, only the first 32 characters are stored. If the length of the data name is shorter than 32 characters, 0 is filled in the remaining areas. Though ASCII code is used as the character code in the example shown in FIG. 2, 2-byte character code such as the shift JIS code generally used in Japan, or 3-byte code such as UNICODE may be used.

In price field 144, the price of each data is represented by a 2-byte unsigned integer. In the example shown in FIG. 2, the price unit is yen.

Data source field 146 includes, for each data, at least data source information consisting of bits same in number as the number of data sources. Each bit of each data source information is uniquely associated with one data source. The bit "1" of the data source information represents that the data of interest exists in the corresponding data source. The "0" bit of the data source information represents that the data of interest does not exist in the corresponding data source. The data source information contained in the data source field 146 is updated every time the data prepared at each data source changes. In the example shown in FIG. 2, the number of bits of the data source information for each data is equal to the number of data sources. The number of which may be larger than the data source number. In that case, a bit not having a corresponding data source is cleared in advance to "0".

The size field 148 includes a 4-byte unsigned integer representing, in bytes, the size of each data.

In FIG. 2 and in the following figures, integer data are all represented by decimal notation for convenience of reference, and ASCII codes are all represented in the form of corresponding characters.

Figure 3:
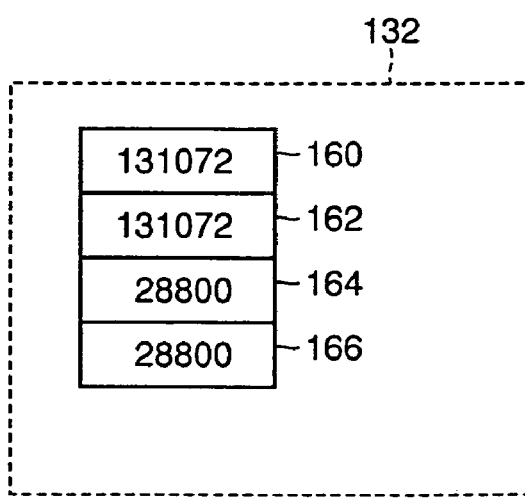
FIG. 3 is a schematic diagram showing a data rate table in accordance with the first embodiment.

Referring to FIG. 3, data rate table 132 holds fields 160, 162, 164 and 166 storing data rates for communication with respective data sources. Here, the data rate is represented as transfer bit numbers per second. The numerical values shown in FIG. 3 are mere examples for description, and do not necessarily represent standard technique at present. The data rate may vary dependent on the apparatus used as the data source, as well as on the technical innovation in communication method.

In the present embodiment, the data which can be supplied at each data source and the data rate of each data source are managed by data information table 128 and the data rate table 132. The reason for this is as follows. When the data which can be supplied from each data source or the data rate of each data source is fixed, it is possible by a wired hardware to select the data source of the highest speed for each data. Actually, however, the contents, price, data rate of the communication medium and so on of the data which can be supplied from each data source naturally change along with technical innovation. Even in such a case, such a change can readily be accepted by changing the contents of the tables, if the data sources are managed by using data information table 128 and data rate table 132 as in the present embodiment.

The method of rewriting data information table 128 or data rate table 132 is not covered by the subject matter of the present invention, and general technique may be used. For example, the contents of a new table may be read for updating from a removable storage medium (for example, a flexible disk, a memory card or the like) not shown. Alternatively, data related to the data source may be transmitted from each data source to data vending machine 102 at an appropriate timing, and only the corresponding portion of each table may be updated in accordance with an appropriate program. In any way, such a method is within a technical scope which can be readily implemented by a person skilled in the art based on the disclosure of the present application.

In the example shown in FIG. 3, it is assumed that the data rate received from the first data satellite 106, the second data satellite 108, the first data server 110 and the second data server 112 are written in fields 160, 162, 164 and 166, of data rate table 132, respectively, in this order.

Though each data source and the data vending machine 102 are shown adjacent to each other in FIG. 1, it is needless to say that the first and second data satellites 106 and 108 are both at a distance from the data vending machine 102, and data servers 110 and 112 may also be at points physically distant from data vending machine 102. In this example, it is assumed that the first and second data satellites 106 and 108 both transmit data to data receiving apparatus 134 by an electric wave. Further, it is assumed that the first and second data servers 110 and 112 are coupled to data receiving apparatus 134 through a high speed telephone network. The communication media are not limited to those described above and it is needless to say that there are various other possibilities dependent on the position and type of the data source as well as the technique ever changing with time.

Figure 4:
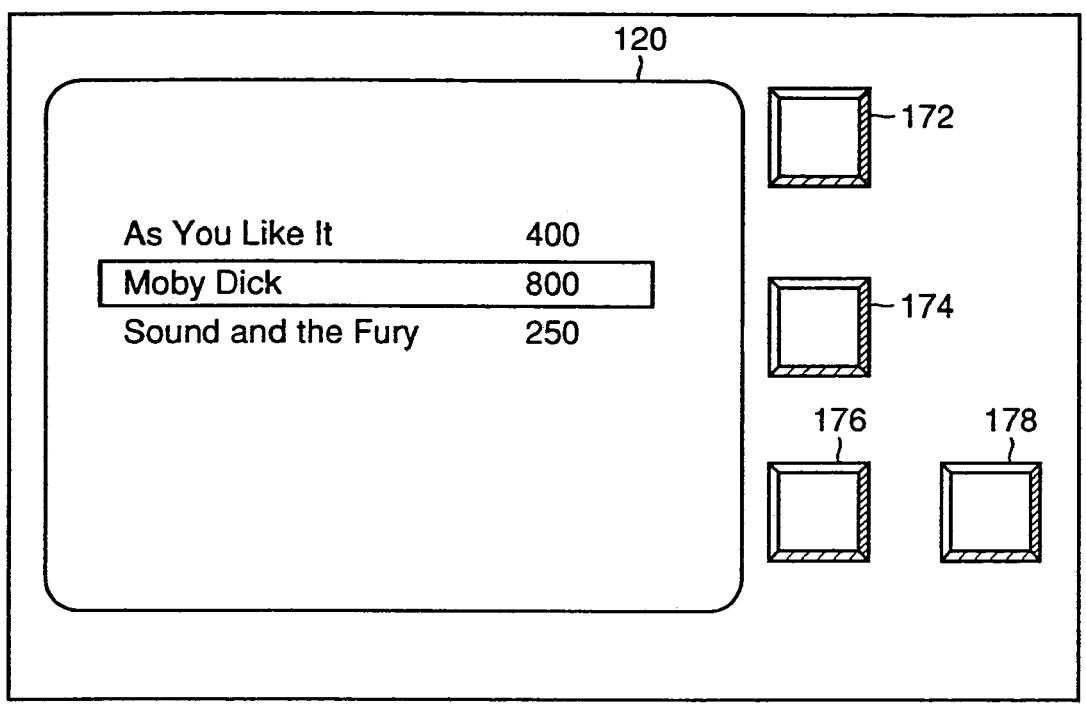
FIG. 4 is a schematic diagram showing an exemplary display of a display apparatus and a data selecting apparatus in accordance with the first embodiment.

The configurations of display apparatus 120 and data selecting apparatus 122 will be described with reference to FIG. 4. Display apparatus 120 displays various information in accordance with an operation by the user. FIG. 4 shows an exemplary display when data selection is to be made, in which the data names stored in name field 142 and corresponding prices stored in price field 144, shown in FIG. 2, are displayed.

Data selecting apparatus 122 includes a previous item switch 172, a next item switch 174, an OK switch 176, and a cancel switch 178. Display apparatus 120 and data selecting apparatus 122 co-operate to let the user select desired data. The operation by the user and the operation of the apparatuses therefor will be described later.

Figure 5:
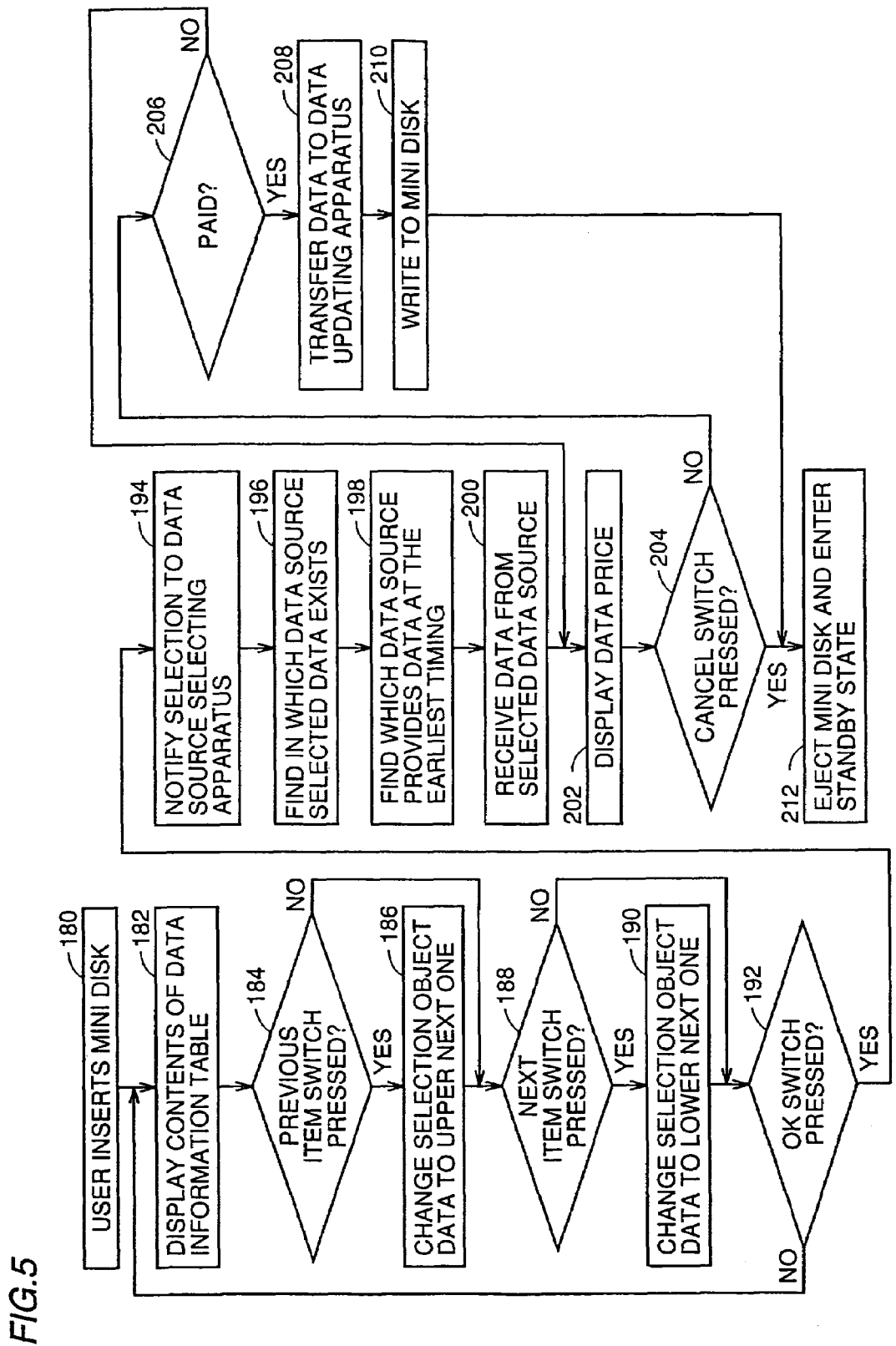
FIG. 5 is a flow chart showing an operation of a data vending machine in accordance with the first embodiment.

First, the operation of the apparatus will be described with reference to FIGS. 1 to 4 as well as the flow chart of FIG. 5. First, a user inserts a mini disk 104, which the user brings with himself/herself, to data updating apparatus 124 (180). In response to the insertion of mini disk 104 to data updating apparatus 124, data selecting apparatus 122 retrieves a part of the contents stored in data information table 128 and displays the retrieved contents on display apparatus 120 (182). The example of display is as shown in FIG. 4. At this time, the name and sales price of the data which is being selected at present are displayed surrounded by a rectangle as shown in FIG. 4 as an example, or displayed in highlight.

Thereafter, whether the previous item switch 172 shown in FIG. 4 is pressed or not is determined (184). When the previous item switch 172 is pressed, the selection target data is switched to the data immediately above (or immediately left of) the data which is the present target (186).

Thereafter, whether the next item switch 174 shown in FIG. 4 is pressed or not is determined (188). When the next item switch 174 is pressed, the selection target data is switched to the data immediately below (or immediately right of) the present target data (190).

Further, whether the OK switch 176 (see FIG. 4) is pressed or not is determined (194). When the OK switch 176 is not pressed, the flow returns to step 182, and the processes described above are repeated. When the OK switch 176 is pressed, data selecting apparatus 122 notifies the data which is the object of selection at that time to data source selecting apparatus 130 (194). Thus, information as to which data is the object of purchase by the user is given to data source selecting apparatus 130.

As data information table 128 is shared by data source selecting apparatus 130 and data selecting apparatus 122, what must be transmitted from data selecting apparatus 122 to data source selecting apparatus 130 is simply the information as to which numbered data of data information table 128 is selected. In response to this information, data source selecting apparatus 130 refers to the data source field 146 of data information table 128, and finds in which data source the selected data exists (196). Further, data source selecting apparatus 130 retrieves the data rate for retrieving data from the data source in which the selected data exists, from data rate table 132, and selects that data source of which data rate is the highest (198). More specifically, a data source which is considered to have the shortest time necessary for transferring in average, is selected.

For example, assume that the second data in the data information table (see FIG. 2) is selected by the user. Data source selecting apparatus 130 refers to the data source information stored in data source field 146 of data information table 128. In this case, the data source information is "0110", and therefore, it is understood that the selected information exists in the second and the third data sources, that is, the second data satellite 108 (see FIG. 1) and the first data server 110. Thereafter, the data source selecting apparatus 130 refers to data rate table 132 so as to determine from which data source the data of interest can be obtained at the highest rate. In the example shown in FIG. 3, the data rate of the second data source is far higher than the data rate of the third data source. More specifically, the data rate of the second data satellite shown in FIG. 1 is far higher than the data rate of the first data server 110. Therefore, data source selecting apparatus 130 selects as the data source, the second data satellite 128.

Again referring to FIG. 5, data source selecting apparatus 130 controls the data receiving apparatus 134, and receives the data from the data source selected in the above described manner (200). At this time, whether it is necessary to transmit a data request to the selected data source or not from the data receiving apparatus 134 depends on the nature of the selected data source.

For example, the second data satellite 108 broadcast data received from a ground station 220 to the ground, as shown in FIG. 6. Such satellite broadcast is received by the data vending machine 102. In such a satellite broadcast, generally, the transmission is in one direction only. Namely, the transmission is only one direction from the data satellite to the data vending machine 102 on the ground.

In such a situation where the transmission is one directional while the data rate is extremely high, all the data are broadcast in a prescribed time period (222) as shown in FIG. 7, and the same data are broadcast in the next cycle (224), and such processings are repeated. If it is known that the desired data will be transmitted without fail after a prescribed time period as in this example, the received data up to the reception of the desired data may be discarded, and only the necessary data can be received and processed. Such a method is practical especially for a data source such as a data satellite, of which transmission is at very high speed while transmission of selected data to individual destination is difficult.

It should be noted here, however, that the data rate stored in data rate table 132 must be the one considering the average wait time until the transmission of the desired data. In this example, both the first and second data satellites 106 and 108 repeatedly transmit data as described above, and it is assumed here that the data rates stored in fields 160 and 162 of data rate table 132 (see FIG. 3) are values taking into account the average wait time.

By contrast, when a data source that transmits requested data for the first time after a data request is selected, it is necessary for the data vending machine 102 to issue a data request to the data source. In this example, it is assumed that the first and the second data servers 110 and 112 are data sources of this type.

For a data source requiring a data request, it is necessary to transmit a data request of any form from data vending machine 102. Therefore, it is assumed that data receiving apparatus 134 has a function of transmitting a data request to such a data server, when data is to be received from the first data server 110 or the second data server 112.

When data receiving apparatus 134 issues a data request to the first date server 110 or the second data server 112, it is assumed that only the order of the data on data information table 128 is transmitted to the server, so as to reduce traffic. As the first and second data servers 110 and 112 have data information tables 114 and 118 which are identical to data information table 128, respectively, it is possible to know which of the data is requested, when the order on the table is received. Nevertheless, the data source selecting apparatus 130 may transmit all the information specifying the selected data contained in data information table 128 to the data source.

In this manner, in any case, it is possible for the data receiving apparatus 134 to obtain the data desired by the user from a data source that is determined to be optimal by data source selecting apparatus 130.

Again referring to FIG. 5, data selecting apparatus 122 displays the price of data obtained from data information table 128 on display apparatus 120 (202). The user puts in the money displayed on display apparatus 120 to the charging apparatus 126, or presses a cancel switch 178 of FIG. 4.

Data vending machine 102 determines whether the cancel switch 178 is pressed or not (204). When cancel switch 178 is pressed, mini disk 104 is ejected from data updating apparatus 124, and data vending machine 102 is ready to accept next insertion of mini disk by a user (212).

When it is determined in step 204 that the cancel switch 178 (see FIG. 4) is pressed, then whether the money corresponding to the price displayed on display apparatus 120 in step 202 is put into the charging apparatus 126 or not is determined (206). When the money is put in, the data receiving apparatus 134 transfers the received data to data updating apparatus 124 (208). Data updating apparatus 124 writes the data from the data receiving apparatus 134 to mini disk 104 (210). Thereafter, data updating apparatus 124 ejects the mini disk 104, and the data vending machine 102 is ready for the next insertion of a mini disk by a user (212).

When the prescribed amount of money is not input in step 206, the control again returns to step 202 and the process steps from step 202 are repeated.

As described above, in the apparatus of the present embodiment, it is possible to receive data designated by the user from a data source from which the data can be obtained at the highest speed, as the data information table and the data rate table are referred to. Therefore, even when the data size is large, wait time of the user can be made short, and hence practical distribution of electronic data is possible.

In the first embodiment described above, the owner of the data source is not a problem and it is unnecessary that the owner of the data vending machine 102 is the same as the owner of the data source. Further, even when a large number of such data vending machines 102 are connected, the operation of each data vending machine is the same as that of data vending machine 102 shown in FIG. 1 described above.

In the first embodiment described above, data satellites and data servers are described as data sources. Other than these, a common DRAM (Dynamic Random Access Memory), a hard disk and the like may be the data sources. More specifically, these apparatuses are connected through an interface to data receiving apparatus 134. In that case also, as in the common data source, what is of interest is the size of the data and the data rate. Therefore, storage means other than a data satellite or a data server may be a data source.

Though a charging apparatus 126 to which a note or a coin is to be actually input has been described, it is possible to use a prepaid card or a credit card for settlement. When a credit card is to be used, it is desirable that the charging apparatus 126 has in itself a function of communicating with a host apparatus of a card company.

In the first embodiment, electronic book data is assumed as the data to be distributed. The data may be in any form provided that it allows electronic processing. If the information contains characters only, for example, it is possible to convert the information to text data by using an appropriate code system dependent on the language and apparatus used, such as ASCII code or the shift JIS code. Alternatively, each page of a book may be read by a scanner as image data and turned to electronic data. Further, an integrated data including text data, image data and layout information therefor may be used. The present invention is generally applicable to electronic book data regardless of the data format or the method of converting to electronic data.

Further, the apparatus and the system of the present embodiment can be applied not only to the book data but also music data, image data, video data, commercial data, computer software, game software and so on. Though a mini disk is used in the above described embodiment as the data storing apparatus, various other storing media including a flexible disk, a memory card, a magneto-optical disk and so on may be used.

Further, a storage device corresponding to the mini disk may be provided in a reproducing apparatus for reproducing data. In such a case, when the reproducing apparatus is removed from the data updating apparatus 124, it is possible to reproduce data by using the reproducing apparatus at an arbitrary place.

Second Embodiment

Figure 8:
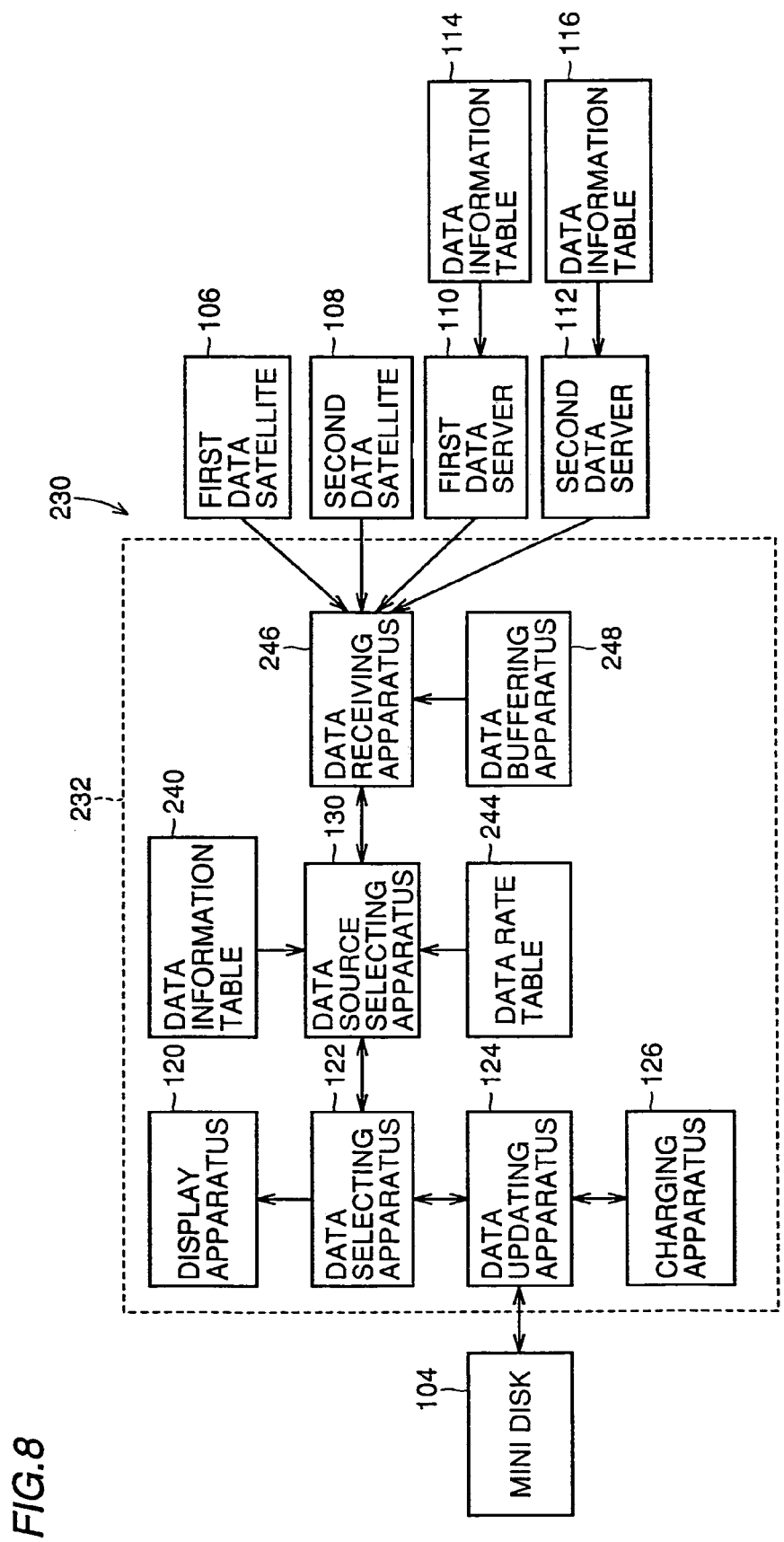
FIG. 8 is a block diagram of a data distribution system in accordance with a second embodiment of the present invention.

FIG. 8 is a block diagram of a data distribution system 230 using a data vending machine 232 in accordance with the second embodiment. In FIG. 8, the same components as in FIG. 1 are denoted by the same reference characters and the same names. Functions are the same. Therefore, detailed description thereof is not repeated here.

The data vending machine 232 shown in FIG. 8 differs from the data vending machine 102 shown in FIG. 1 in that it includes, in place of data receiving apparatus 134 of FIG. 1, a data receiving apparatus 246 connected to a data buffering apparatus 248 for buffering data selected based on a prescribed standard among the data received from respective data sources, for receiving data regarding the data buffering apparatus 248 as a kind of data source; and that it includes a data information table 240 and a data rate table 244 of which contents are slightly different from those of data information table 128 and the data rate table 132 shown in FIG. 1, as the data buffering apparatus 248 is regarded as a kind of data source. Here, the data information tables 114 and 116 are copies of the data information table 240 held by data vending machine 232.

Different from data sources 106, 108, 110 and 112, data buffering apparatus 248 is not connected to data receiving apparatus 246 through a communication medium. The data buffering apparatus 248 as such an apparatus, however, can be regarded as a kind of data source as described in the first embodiment, as long as it is connected to data receiving apparatus 246 through an interface.

Figures 9, 10:
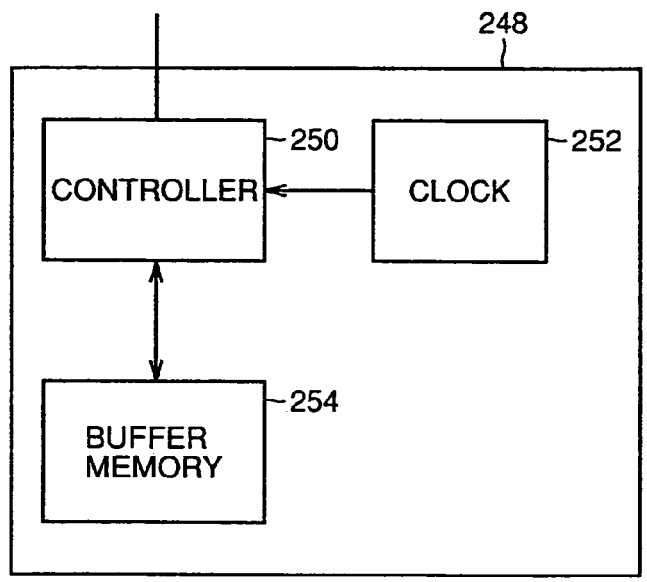
FIG. 9 is a block diagram of a data buffering apparatus in accordance with the second embodiment.
FIG. 10 is a schematic diagram representing a data information table used in the second embodiment.

Referring to FIG. 9, more specifically, data buffering apparatus 248 includes a clock 252 maintaining year, month, date as well as time, minutes and second, a buffer memory 254 for storing data, and a controller 254 having a function of managing data stored in buffer memory 254 and a function of updating data information table 240 and the data rate table 244 as needed. Controller 254 is connected to data receiving apparatus 246, and has a function of selecting which of the data received by data receiving apparatus 246 is to be stored in buffer memory 254.

Referring to FIG. 9, the data information table 240 in accordance with the second embodiment differs from the data information table 128 in accordance with the first embodiment shown in FIG. 2 in that it further includes a selection number field 262 storing the number of selection of each data by the data selecting apparatus 122 and a selected time field 264 indicating the time of last selection of each data by the data selecting apparatus 122, and in that in place of data source field shown in FIG. 2, it includes a data source field 262 including data source information additionally including a bit 266 corresponding to data buffering apparatus 248.

Figure 11:
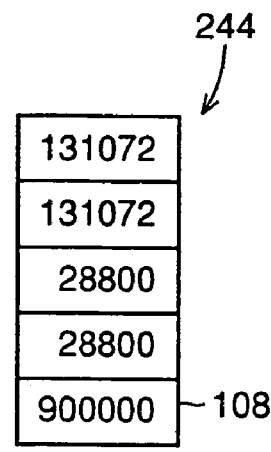
FIG. 11 is a schematic diagram of a data rate table of the second embodiment.

Referring to FIG. 11, data rate table 244 differs from the data rate table 132 shown in FIG. 3 in that it includes, in addition to fields 160, 162, 164 and 166 corresponding to the four data sources, a new field 168 corresponding to the data buffering apparatus 248.

The bit 266 of data information table 240 shown in FIG. 10 is initialized to "0" for any data, when the data vending machine 232 is powered on. In field 168 of data rate table 244, an extremely high value, for example, "900000" is stored. This makes it clear that extremely high speed transfer is possible from data buffering apparatus 268. It goes without saying that in place of such a fixed value, an average value of the actually measured data rate in transferring the data from data buffering apparatus 248 to data receiving apparatus 246 may be stored.

Figure 12:
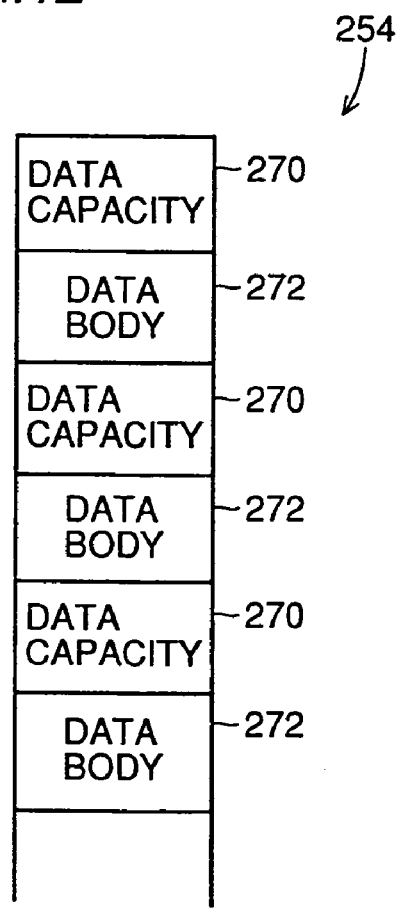
FIG. 12 is a schematic diagram showing a state of data storage of a data buffering memory in accordance with the second embodiment.

FIG. 12 shows the manner of storage of the data in buffer memory 254 shown in FIG. 9. As can be seen from FIG. 12, buffer memory 254 stores in order, the data size and the data body continuously, for each data. Further, buffer memory 254 stores data by repeating the above-described configuration by the number of necessary data. For example, buffer memory 254 stores, after the data size 270 of the first data, the data body 272 of the said data, as shown in FIG. 12. Immediately thereafter, data size 270 of the second data is stored, immediately followed by the data body 272 of the second data. In the similar manner, the data size 270 and the data body 272 of the third data are stored, and the manner is the same thereafter.

Each data size 270 represents the number of bytes of the data body 272, by a 4-byte unsigned integer. No space is formed between different data. At this time, the amount of use U of buffer memory 254 is calculated in accordance with the following equation.

$$U=4*\text{data number}+\text{sum of size of each data body}$$

The data number and the size of each data body can be readily obtained from the data number field 140 and the size field 148 of data information table 240, and therefore the amount of use U of buffer memory 254 can be readily calculated.

The operation of the data distribution system 230, in accordance with the second embodiment having such a configuration, particularly the operation of data vending machine 232 is similar to that of the data vending machine 102 in accordance with the first embodiment, concerning the basic operation of the data source selecting apparatus 130 selecting the data source. It should be noted, however, that while the data is not stored in data buffering apparatus 248, each bit 246 in data information table 240 (see FIG. 10) is cleared to 0, and therefore, data buffering apparatus 248 is never selected as the data source.

When data is received, data buffering apparatus 248 operates in the following manner. In the following embodiment, it is assumed, as an example, that controller 250 shown in FIG. 9 stores data that is frequently selected by data selecting apparatus 122 to buffer memory 254 with priority.

Figure 13:
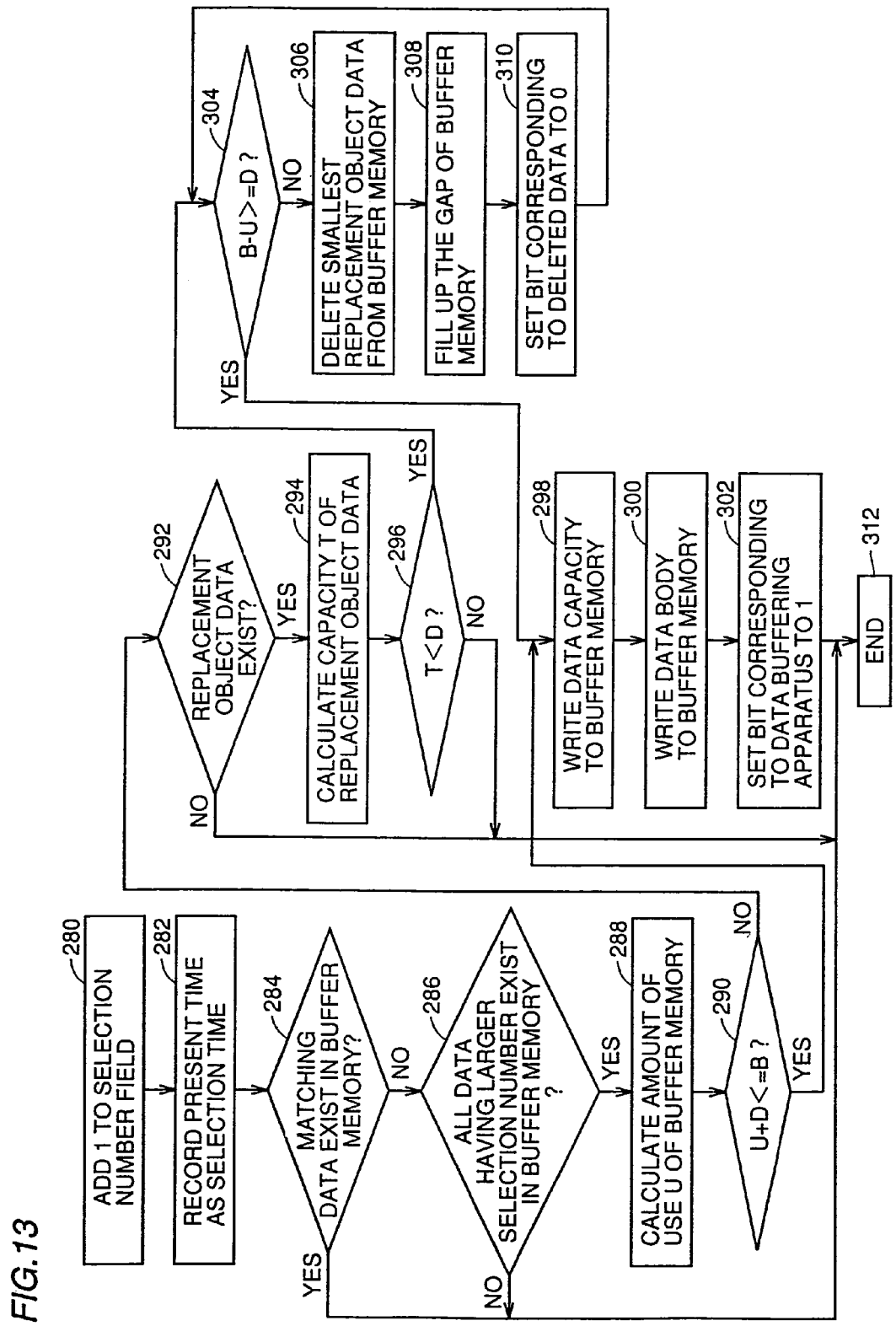
FIG. 13 is a flow chart showing an operation of a data vending machine in accordance with the second embodiment.

Referring to FIG. 13, when a new data is selected by data selecting apparatus 122, data buffering apparatus 248 adds 1 to the value of the selection number field corresponding to the said data, of data information table 240 shown in FIG. 10 (280). Data buffering apparatus 248 further writes the present date and time obtained from clock 252 (see FIG. 9), to the selection time field 264 corresponding to the said data, of data information table 240 (282).

Thereafter, whether the received data exists in the buffer memory 254 or not is determined (284). Whether the data exist in buffer memory 254 or not can be determined by making a reference to data source field 260, particularly, bit 266, of data information table 240 (see FIG. 10). More specifically, of the data source information corresponding to the data, if the bit 266 corresponding to the data buffering apparatus 248 is "1", the data exists in buffer memory 254 and if it is "0", it does not exist. In the example shown in FIG. 10, only the third data is stored in buffer memory 254, and the first and second data are not stored in buffer memory 254, as can be seen from bit 266.

If it is determined in step 284 that the data of interest exists in the buffer memory, the process of data buffering apparatus 248 is completed. If it is determined that the data of interest does not exist in buffer memory 254, then the control proceeds to step 286.

In step 286, controller 254 determines whether all the data of which number of selection is larger than the data of interest are stored in buffer memory 254 or not (286). The determination can be made by making reference to the value of selection number field 262 and the value of data source field 260, to see if there is such a data of which number of selection is larger than the data of interest and the bit corresponding to the data buffering apparatus 248 of data source field 260 is reset to 0. If such a data does not exist, it can be determined that all the data of which number of selection is larger than the data of interest are stored in buffer memory 254.

If the result of determination in step 286 is "YES", it means that the data of interest is qualified to be stored newly in the buffer memory 254. At this time, controller 250 calculates the present amount of use U of the buffer memory, so as to determine whether there is a margin to store the data in buffer memory 254 (288). As already described, the amount of use U can be readily calculated based on the contents of data information table 240.

Thereafter, controller 250 compares the sum of the amount of use U calculated in step 288 and the size D of the data of interest with the capacitance B of buffer memory 254 (290). If the sum U+D is not larger than B, buffer memory 254 has free area sufficient to register the data of interest. Controller 250 writes the data size of the data from the first address of non-used area of buffer memory 254 (298) immediately followed by the data body (300), and sets the bit 266 corresponding to the data buffering apparatus 248 of data source field 260 of the data of interest in data information table 240 shown in FIG. 10 to "1" (302), and the process is terminated (312).

When U+D>B in step 290, it means that buffer memory 254 does not have sufficient free area to store the data of interest. Controller 250 refers to the selection number field 262 and data source field 260 of data information table 240 shown in FIG. 10, and determines whether there is such a data of which number of selection is smaller than that of the data of interest and the bit 266 of data source field 260 corresponding to which the set to "1". The data of which number of selection is smaller than that of the data of interest with the set bit 266 will be hereinafter referred to as "replacement target data." More specifically, in step 292, whether the replacement target data exists in buffer memory 254 or not is determined. When there is no replacement target data, the process of data buffering apparatus 248 is terminated (312).

When there is the replacement target, then the capacity T of replacement target data is calculated (294). Specifically, the capacity T is calculated in accordance with the following equation.

$$T = 4 * \text{number of replacement target data} + \text{sum of capacity of each replacement target data}$$

The replacement target data is obtained by making reference to the selection number field 262 and data source field 260 of data information table 240 as described above. Therefore, the information of the number of replacement target data and the size of each replacement target data necessary for calculating the capacity T of the replacement target data can be obtained from the contents of data source field 260, the size field 148 and the selection number field 262 of data information table 240. The capacity T of replacement target data T represents the capacity occupied in buffer memory 254 by the data which can be replaced by the data of interest. Therefore, it is confirmed whether capacitance T<D holds or not (296), and the following operation is performed selectively dependent on the result of determination.

When T<D holds, it is impossible to replace the replacement target data by the data of interest. Therefore, in this case, the process of data buffering apparatus 248 is terminated (312).

When T<D does not hold, the contents of buffer memory 254 is condensed in the following manner. First, whether the relation B−U≧D holds or not is determined (304). If the result of determination is "NO", then of the replacement target data existing in buffer memory 254, that one having the smallest capacity is deleted from the buffer memory at that time point (306). Thereafter, the space made in this manner of buffer memory 24 is filled up (308), and the bit 266 corresponding to the replacement target data deleted from buffer memory 254 of data source field 260 of data information table 240 is reset to "0" (310). Thereafter, the control returns to step 304 and the process steps described above are repeated.

When the relation B−U≧D holds in step 304, control proceeds to step 294, and controller 250 writes from the first address of an unused area of buffer memory 254, the data capacity of the data of interest by a 4-byte unsigned integer (298), writes the data body immediately thereafter (300), sets the bit 266 corresponding to the data of interest of data source field 260 of data information table 240 to "1" (302), and the process terminates (312).

After the writing of data by data buffering apparatus 248 to buffer memory 254 is completed, the operation of the data processing system 230 is the same as that of the system of the first embodiment. It should be noted, however, that different from the first embodiment, data buffering apparatus 248 is selected as the data source in place of data sources 106, 108, 110 and 112, when the data stored in data buffering apparatus 248 is selected by data selecting apparatus 122, as the contents of data information table 240 and the data rate table 244 are partially different, in consideration of the existence of data buffering apparatus 248.

As the data buffering apparatus 248 is provided in this manner, once data received from a distant data source is stored in data buffering apparatus 248, it is unnecessary to receive the data again from the distant data source every time the data is selected. As it is possible to retrieve data at high speed from data buffering apparatus 248, it is effective in that the wait time of the user can further be reduced as compared with the system of the first embodiment.

As a reference for controller 250 to select data to be stored in buffer memory 254, in the second embodiment, the data of which number of selection by data selecting apparatus 122 is large is stored in buffer memory 254 with priority. When the buffer memory 254 becomes full, that one of the data stored in buffer memory 254 of which number of selection by data selecting apparatus 122 is small is deleted with priority from buffer memory 254. In other words, in the second embodiment, the data of which number of selection by data selecting apparatus 122 is large is stored with priority in buffer memory 254.

Various other methods may be employed, including a method in which data having large size is stored with priority in buffer memory 254, the method in which data requiring long time for one transmission is stored with priority in buffer memory 254 considering data rate as well, a method in which a product of the data size and the number of selection of the data is large is stored with priority in buffer memory 254, or the data of which time of last selection is least recent is deleted from buffer memory 254 with priority, for example. These methods can be implemented by using data information table 240 and data rate table 244 of which examples are shown in FIGS. 10 and 11.

Further, there may be various references for selecting the data to be deleted when the free area of buffer memory 254 becomes smaller. For example, a method in which data having the smallest data size is deleted first, a method in which the data requiring shortest time for one transmission is deleted first, a method in which the data of which number of selection is the smallest is deleted first, or the method in which the data of which time of last selection is the least recent is deleted first may be employed by itself or in combination.

For example, a method is possible in which data that requires long time for transmission from a data source other than the buffer memory to the data receiving apparatus is stored with priority in buffer memory 254. This method can be implemented in the following manner. First, from the size field 148 of data information table 240 shown in FIG. 10, sizes of respective data are retrieved. From data source field 260, data sources in which respective data exist are specified. Thereafter, from data rate table 244 shown in FIG. 11, data rates of respective data sources are retrieved. Thereafter, sizes of respective data are divided by the data rates of the data sources in which respective data exist, and the quotients are compared with each other. The data having the smallest quotient is deleted with priority from buffer memory 254. The reason for this is that the data requires shorter time as compared with other data, for receiving from the data source again.

Other than the methods mentioned here, various references may be used to select the data to be stored in buffer memory 254 and the data to be deleted from buffer memory 254. The information necessary for such determination may be held in data information table 240 or data rate table 244 or other table at an appropriate time point, and the contents thereof may be updated at an appropriate time point.

Third Embodiment

Figure 14:
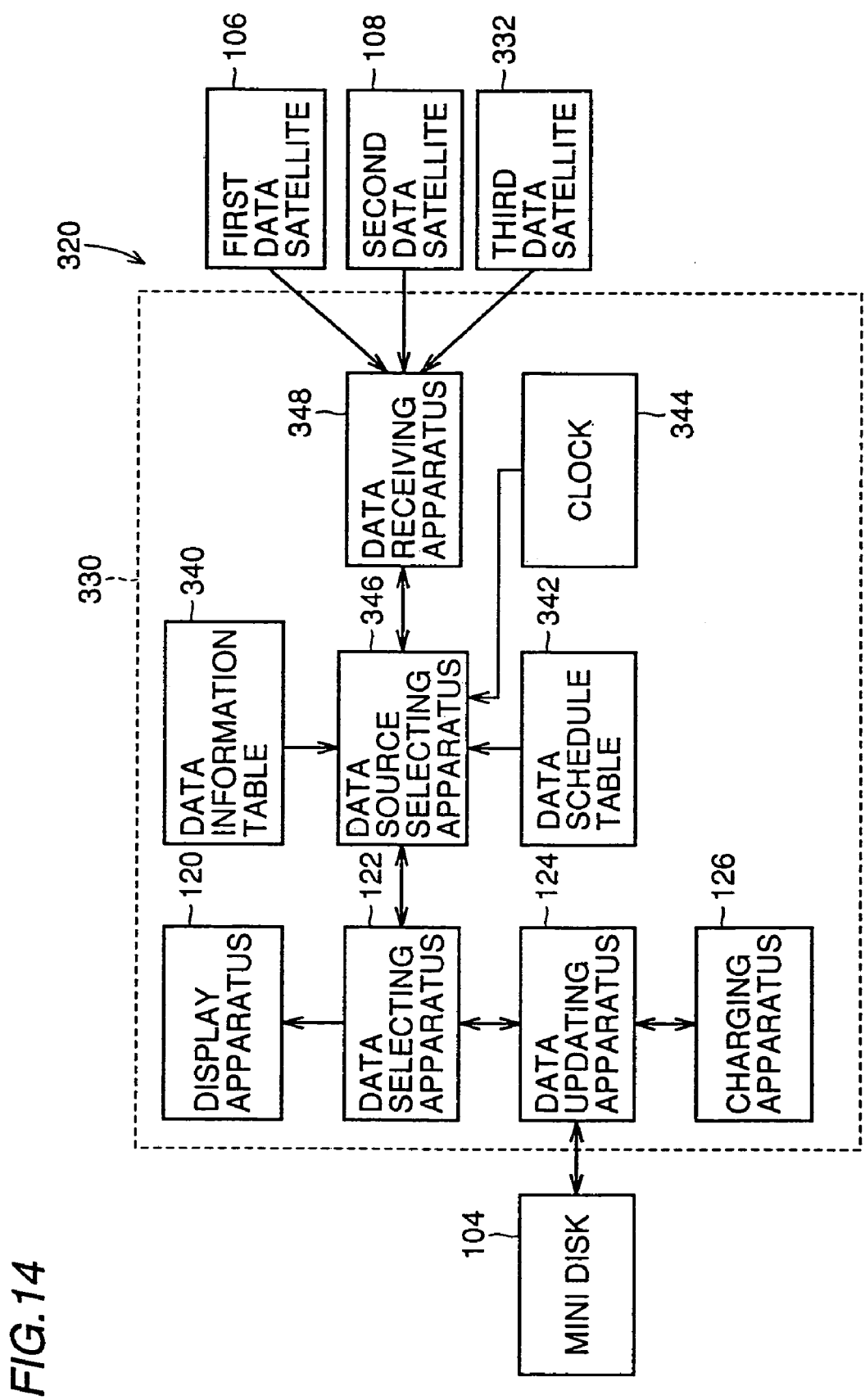
FIG. 14 is a block diagram of a data distribution system in accordance with the third embodiment of the present invention.

FIG. 14 is a block diagram of a data distribution system 320 in accordance with the third embodiment of the present invention. In FIG. 14, the same components as those of the data distribution system shown in FIG. 1 are denoted by the same reference characters and referred to by the same names. The functions are also the same. Therefore, detailed description thereof will not be repeated here.

The system 320 of the third embodiment differs from the system 100 of the first embodiment shown in FIG. 1 first in that in place of the first data server 110 and the second data server 112 shown in FIG. 1, a third data satellite 332 is included as the data source. Further, in system 320, in place of the data vending machine 102 of the first embodiment, a data vending machine 330 having a slightly different configuration from data vending machine 102 is provided.

The data vending machine 330 differs from the data vending machine 102 in that it newly includes a data schedule table 342 holding schedule of data broadcast from the first to third data satellites 106, 108 and 332, as well as a clock 344 holding date and time, and that in place of data source selecting apparatus 130 shown in FIG. 1, it includes a data source selecting apparatus 346 selecting a data source from which the data selected by the data selecting apparatus 122 is to be retrieved and receiving the data from the data source by controlling the data receiving apparatus 348, by making references to data information table 128, data schedule table 342 and clock 344. Different from the data receiving apparatus 134 shown in FIG. 1, data receiving apparatus 348 of data vending machine 330 need not have the function of transmitting a data request to a data source. It is of course possible to use data receiving apparatus 134 shown in FIG. 1 directly as data receiving apparatus 348 of data vending machine 330. In the data vending machine 330, data rate table 132 shown in FIG. 1 is not provided, as the data sources are all data satellites having approximately the same data rates.

In the system 320, a plurality of data sources including the first data satellite 106, the second data satellite 108 and the third data satellite 332 transmit the same data in time-divisional manner, with shifted timings, respectively. The data transmitted by one data satellite includes a plurality of book data, and once transmission starts, each book data is transmitted to the end without any intervention by other data. The data transmitted by the first data satellite 106, the second data satellite 108 and the third data satellite 332 are of the same configuration. The time of starting transmission of one data, however, is shifted to be different from satellite to satellite. Data source selecting apparatus 346 has a function of taking into account such difference in broadcast time and selecting such a data source that assures earliest retrieval of the data selected by the data selecting apparatus 122. Specifics, detailed structures and data configurations of various components described below are examples for description only, and not intended to limit the present invention to the present embodiment.

Figure 15:
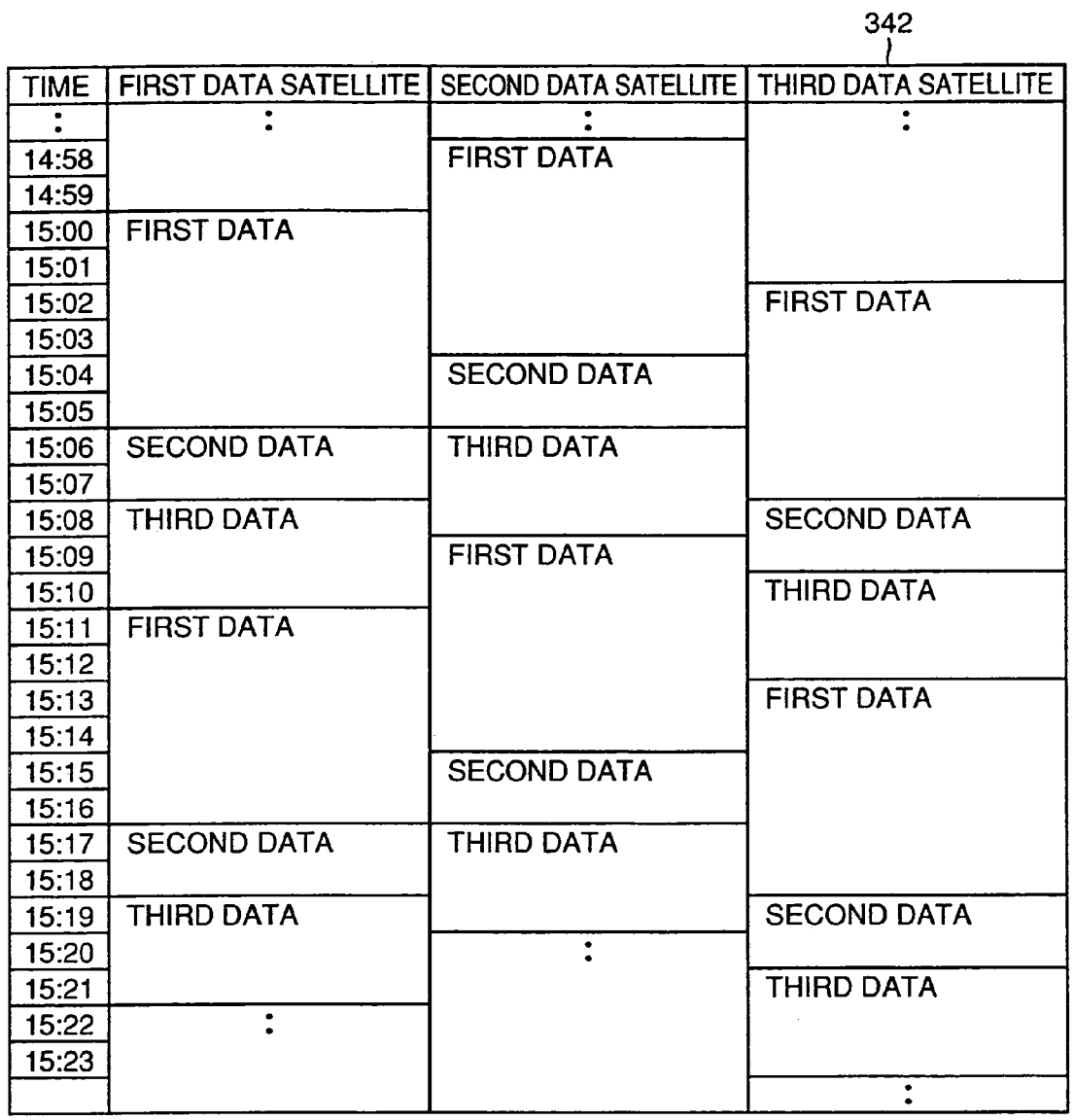
FIG. 15 is a schematic diagram showing contents of a data schedule table in accordance with the third embodiment.

FIG. 15 shows a part of an example of the contents of a data schedule table 342. In FIG. 15, data of the same name have the same contents. Data satellites broadcast the whole data in the order of "first data", "second data" and "third data", respectively. In FIG. 15, different data are represented as having different times necessary for one transmission. This representation reflects different length of the data to be transmitted.

In this example, each data source transmits data in time-divisional manner in one same order. It is, however, only an example, and the method of data transmission is not limited thereto. What is necessary is that the contents of data schedule table 342 are associated with the transmission schedule from the data sources such that the information as to when the data selected by data selecting apparatus 122 is transmitted from each data source can be obtained from data schedule table 342. If the transmission schedule can be obtained by a different method, for example, by calculation based on the name of the data, it is unnecessary to provide an independent table such as the data schedule table 342. Here, it is assumed that the first data satellite 106, the second data satellite 108 and the third data satellite 332 broadcast data in accordance with the schedule of data schedule table 342 shown in FIG. 15.

Though only the data satellites are described as the data sources in the present embodiment, any data source may be used provided that it transmits in accordance with the schedule. When a data source having a data rate different from that of the data transmission from a data satellite, for example, a cable broadcast is used, it may be necessary to provide such a data rate table 132 as shown in the first embodiment, to calculate the data reception time. Though there are three data sources in the example shown in FIG. 14, the number of data sources may be 4 or more, or 2 or less.

Figure 17:
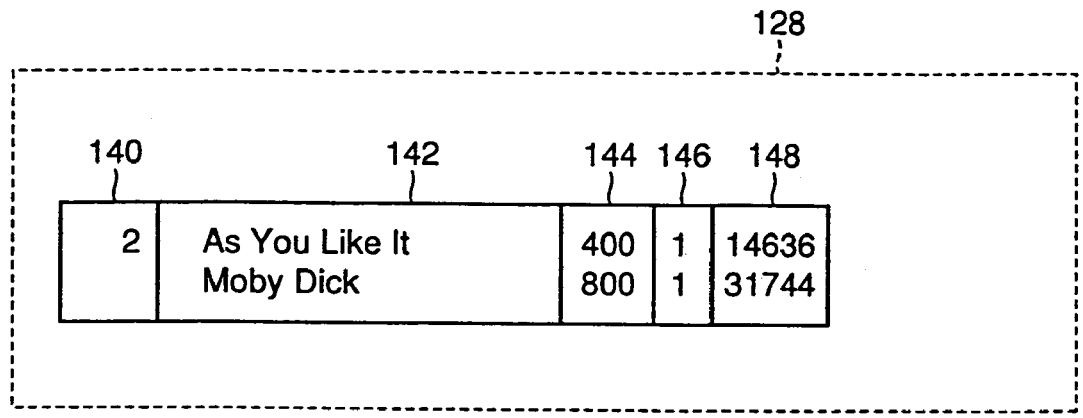
FIG. 17 is a schematic diagram showing an example of contents of data distribution table in accordance with the fourth embodiment.

FIG. 17 shows the contents of data information table 128. Though the number of data is not "3" but "2" in data information table 128, the configuration thereof is the same as that of the data information table 128 in accordance with the first embodiment.

The data distribution system 320 in accordance with the third embodiment operates in the following manner.

Until selection of the data by data selecting apparatus 122, the operation of the data reservation system 320, and hence the operation of data vending machine 330 is the same as that of the first embodiment.

When the data is selected, data source selecting apparatus 346 refers to the data schedule table 342 and clock 344, and selects that data source which first initiates transmission of the selected data after the present time. For example, assume that the time obtained from clock 344 is 15:11 and the data having the name "first data" is selected. Data source selecting apparatus 346 refers to data schedule table 342, and obtains the time of next transmission of "first data" from the first data satellite 106, the second data satellite 108 and the third data satellite 332. According to the data schedule table 342 of FIG. 15, the times of transmission from the first data satellite 106, the second data satellite 108 and the third data satellite 332 are 15:19, 15:17 and 15:21, respectively. Therefore, data source selecting apparatus 346 selects as the data source the second data satellite 108 which starts the transmission of the selected data at the earliest timing.

In the example shown in FIG. 15, at the time point (15:11) when the first data is selected, the third data satellite is transmitting the first data. Transmission of the former half of the first data, however, has already been completed, and hence it is necessary to wait until 15:21 to obtain the first data from the third satellite. Such control in that a data source is found to receive the latter half of the first data from 15:11 and the not-yet receive remaining portion is received from other data source, is possible. Such control is only a modification of the third embodiment, and it is within the scope of the present invention.

The following operation of data distribution system 320 until the next data is selected is the same as that of the system in accordance with the first embodiment, except that the data sources are different and the data rate table is not used.

In the foregoing, it has been assumed that there is no significant difference in time from the start of transmission from each data source until completion of data reception at the data receiving apparatus 348 (hereinafter referred to as "communication time") between each of the data sources. Based on such assumption, the data source which starts the transmission of the desired data at an earliest timing next is selected by the data source selecting apparatus 346, as described above.

There may be cases, however, where the difference in communication time between each of the data sources is not negligible. In such a case, the data source may be selected in the following manner. First, data source selecting apparatus 346 obtains the next time at which the transmission of the desired data starts, for each data source, from data schedule table 342. The data source selecting apparatus 346 adds the communication time of each data source to the transmission start time of each data source, and selects the data source having the earliest start time by comparing the results. In this case, substantially, the data source selecting apparatus 346 compares the time of termination of transmission from each data source, or the time at which reception is completed at the data receiving apparatus 348.

Fourth Embodiment

Figure 16:
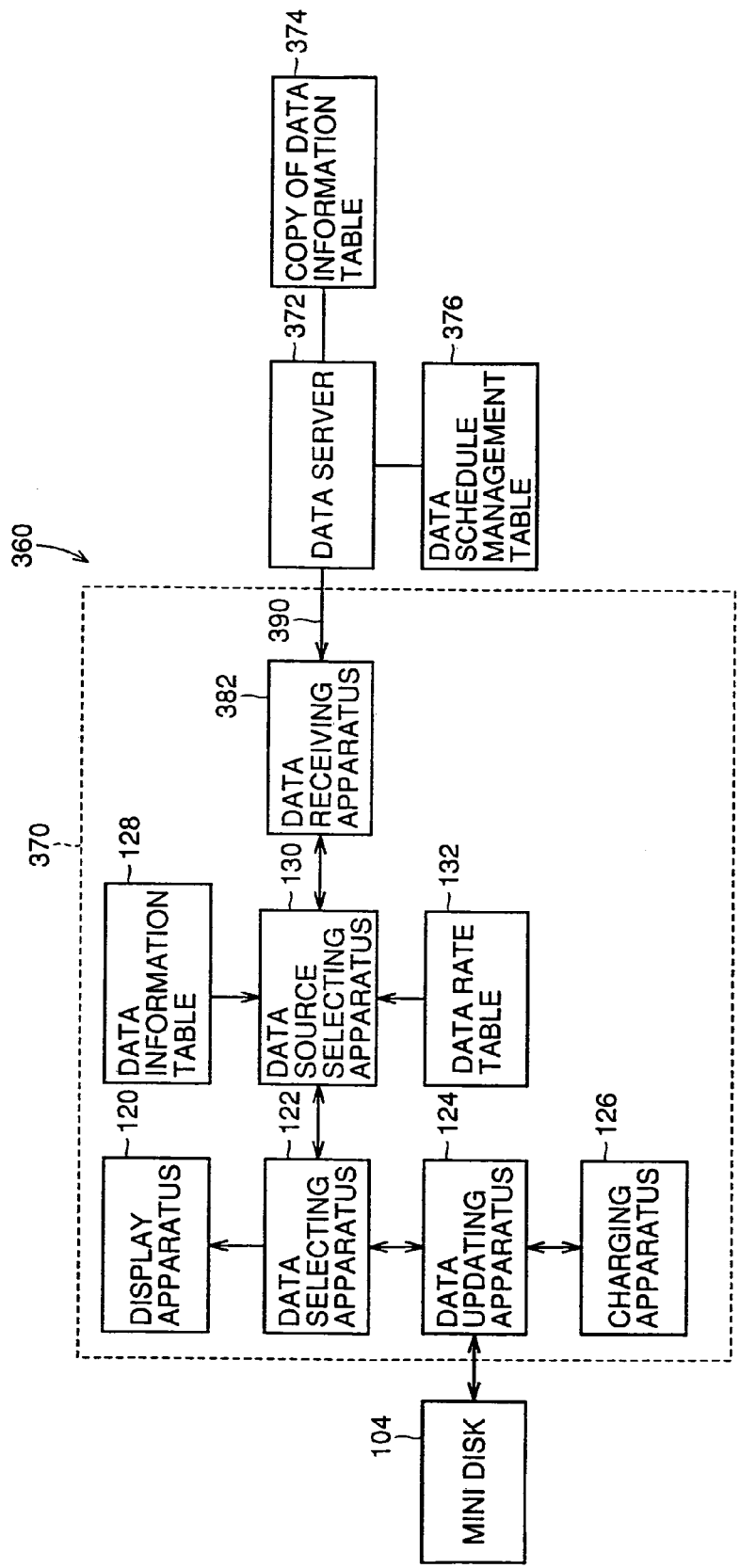
FIG. 16 is a block diagram of a data distribution system in accordance with a fourth embodiment of the present invention.

FIG. 16 is a block diagram of a data distribution system 360 in accordance with the fourth embodiment. In FIG. 16, components common to those of FIG. 1 are denoted by the common reference characters. The names and the functions are also the same. Therefore, detailed description thereof will not be given here.

The data distribution system 360 in accordance with the fourth embodiment includes, in place of each of the data sources shown in FIG. 1, a data server 372 transmitting each data block by block in time-divisional manner. Further, data server 372 transmits data such that longer time is allotted to transmission of data of which number of selection by data vending machine 370 is large. By this method, it becomes possible to obtain data of which number of selection by the data vending machine 370 is larger with shorter wait time when selected, by data vending machine 370.

In order to implement this method, data distribution system 360 includes, in place of the data vending machine 102 of FIG. 1, the data vending machine 370. Data vending machine 370 includes, in place of the data receiving apparatus 134 of FIG. 1, a data receiving apparatus 382 capable of receiving data divided into blocks and restoring the original data.

FIG. 17 shows an example of the contents of data information table 128 held in data vending machine 370. As compared with the data table shown in FIG. 2, the data information table 128 shown in FIG. 17 is substantially the same as data information table 128 shown in FIG. 2, except that the data number is 2 and that the data source information of data source field 146 is 1 bit. The data server 372 uses a data schedule management table 376 storing the schedule for transmitting data block by block in time-divisional manner as described above, and has a copy 374 of the data information table 128.

In the following description, the term "selected data" refers to a unit data selected by data selecting apparatus 122. By contrast, the data included together with a header portion in each of the blocks prepared by dividing the data will be referred to as "data section". In the example shown in FIG. 17, each name in the name field 142 corresponds to one selected data, respectively.

In the fourth embodiment, only the data server 372 is indicated as a data source. This is for simplicity of description, and the data source may include a plurality of data servers. In a system having only one data server, data source selecting apparatus 130 and data rate table 132 may be omitted. In the fourth embodiment, data source selecting apparatus 130 and the data rate table 132 are provided in data vending machine 370, so that a plurality of data sources may be included.

Figure 18:
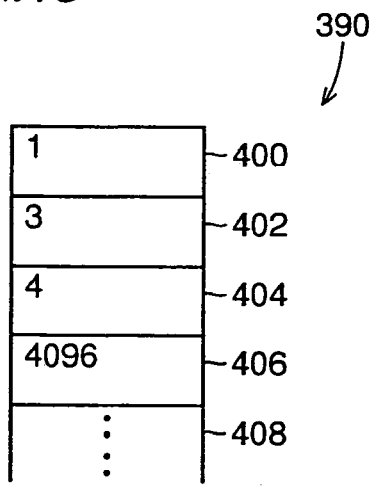
FIG. 18 is a schematic diagram representing a format of a data packet in accordance with the fourth embodiment.

Referring to FIG. 18, 1 block of data transmitted from data server 372 to data receiving apparatus 382 includes a data No. field 400, a block No. field 402, a block number field 404, a data length field 406 and a data section 408. Fields 400, 402, 404 and 406 constitute a header portion.

Data No. field 400 represents the serial number of the selected data in the name field 142 of data information table 128. The data No. field 400 is an integer of 2 bytes. Block No. field 402 includes a 2-byte integer representing which block among the selected data is the block 390. Block number field 404 includes a 2-byte integer representing how many blocks the selected data is divided into.

When two data blocks have the same value of the data No. field 400, it means that the two data blocks have the same value of the block number field 404.

Data section 408 includes the data body divided byte by byte. The length thereof is represented in byte unit, by a 4-byte integer included in the data length field 406. Here, it is assumed that from the first block of a certain data (block No. field=1) to the second last block (last block: block No. field=block number field), the data length field 406 of a certain selected data had a common value. This numerical value is referred to as a standard block size, which is 4 KB here. As to the last block, data length field 406 represents by byte number, the remainder of the length of the whole data divided by the standard block size. Therefore, in this example, the data length field 406 of each block of a certain selected data has the common value of 4 KB (4096 bytes) except for the last block.

In FIG. 18, all numerical values are represented in decimal notation. Each numerical value corresponds, as an example, to the third block of the first data of two data in the data information table 128 shown in FIG. 7. More specifically, in the example shown in FIG. 18, data No. field 400 of data block 390 stores "1", because, in the example shown in FIG. 17, the data is the first data. Block No. field 402 stores "3" representing the number of this block. Block number field 404 stores "4". The reason for this is that, according to the data information table 128 of FIG. 17, the size of the first data is 14636 bytes (see size field 148), and the length of 1 block is 4096 bytes, and hence the first data is divided into four data blocks. Data length field 406 stores 4096, as the block 390 is not the last block.

Figure 19:
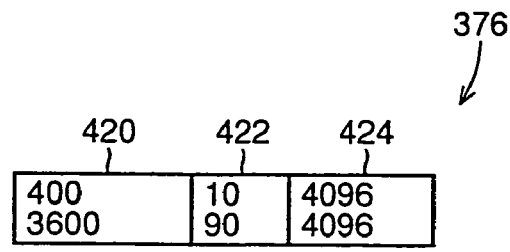
FIG. 19 is a schematic diagram of a data schedule management table in accordance with the fourth embodiment.

Referring to FIG. 19, data schedule management table 376 includes, in this example, a selection frequency field 420, an allocated block number field 422 and a data length field 424.

The selection frequency field 420 stores the frequency of each data selection by the data selecting apparatus 122. It is assumed that the field 420 is always initialized to 0 at the start of operation of data distribution system 360.

Allocated block number field 422 stores a value representing how many blocks among 100 transmitted blocks are allocated to the data. The method of determining the number of allocation will be described later.

The data length field 424 stores a standard block size for each data. In this example, a common value of 4096 (4K) is stored for every data. When the same data length is used for every data as in this example, this field is not always necessary. If the data length field 424 is provided, however, it is possible to readily accommodate data, even when block sizes to be handled differ data by data. The contents of data length field 424 matches the contents of data length field 406 (see FIG. 18), except for the last block of each transmitted data. Here, it is assumed that elements are arranged such that elements corresponding to the same data are the same both in the data information table 128 and the data schedule management table 376.

Figure 20:
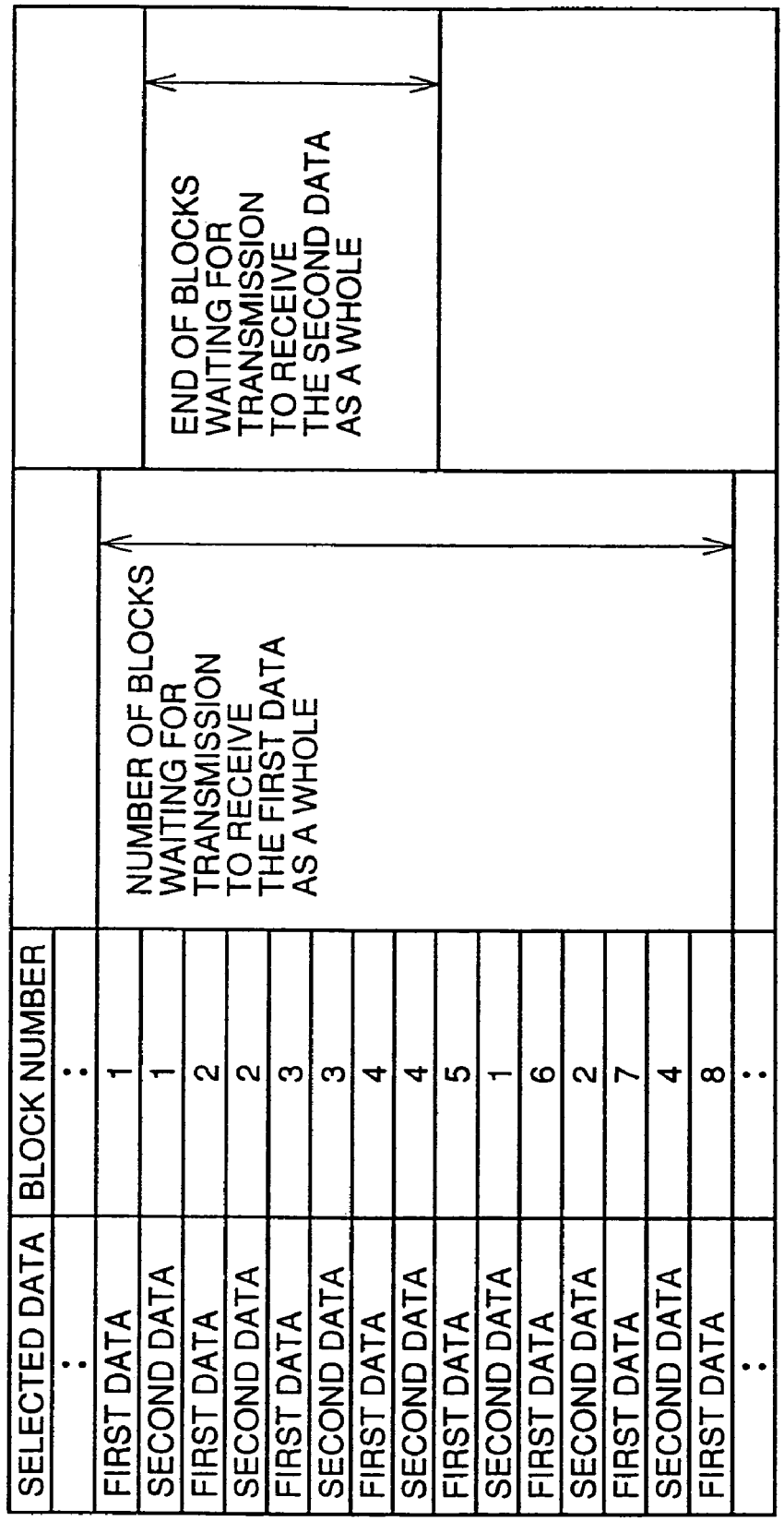
FIG. 20 is a schematic diagram representing a data broadcast sequence.

Now turn to FIG. 20. The first data shown in FIG. 17 has the size of 14636 bytes. As 14636/4096≈3.57, the first data is divided into a total of four blocks. Similarly, the second data is divided into 8 blocks, as 31744/4096=7.75.

As shown in FIG. 20, each data is transmitted in order from the first block. When transmission of one block of a certain data terminates, one block of a different data is transmitted next, and after the end of the transmission, transmission of one block of the first mentioned data is performed, and the operation continues in the similar manner. For any data, when the last data block is transmitted, transmission from the first block starts again.

In the example shown in FIG. 20, the number of blocks transmitted per unit time is the same for every data. Here, in order to receive the second data entirely, the time for transmitting 15 blocks in total is necessary, as is apparent from FIG. 20. For the reception of the first data as a whole, the time corresponding to transmission of 7 blocks is necessary. In this calculation, it is not taken into consideration that the length of the last block is generally different from other blocks (this assumption applies in the following as well).

Generally, it can be considered that the time necessary for transmitting/receiving 1 block does not much depend on the contents of data included in the block. Therefore, the ratio of block numbers to be transmitted for reception of two data can be considered as representing the ratio of time necessary for receiving these data. Then, the following problem arises if the number of blocks transmitted per unit time is made equal for every data as shown in FIG. 20. Assume, for example, that the second data shown in FIG. 17 is selected by data selecting apparatus 122 (see FIG. 16) 9 times more frequent than the selection of the first data shown in FIG. 1. Here, the average wait time when the data vending machine 370 is used ten times will be represented, in terms of the number of blocks to be transmitted for that period, as follows.

$$15 \text{ blocks}*9+7 \text{ blocks}*1=142 \text{ blocks} \quad (1)$$

In the fourth embodiment, by adjusting the schedule of data transmission from the data sources, the average wait time is reduced. For this purpose, the frequency of selection of each data is reflected on the schedule of data transmission from the data sources. For this purpose, an allocated block number field 422 is provided in data schedule management table 376 as shown in FIG. 19, and the value thereof is reflected on the data transmission schedule.

Referring to FIGS. 16 to 19, the data distribution system 360 operates in the following manner. The operation of data distribution system 360 until the data is selected by data selecting apparatus 122 is the same as that of data distribution system 100 shown in FIG. 1 (first embodiment). When the data is selected by the data selecting apparatus 122, data source selecting apparatus 130 refers to data information table 128 and the data rate table 132, and determines an optimal data source. In the example shown in FIG. 16, however, the data source includes only the data server 372, and therefore, data server 372 is always selected. In accordance with the control of data source selecting apparatus 130, data receiving apparatus 382 transmits a data transmission request to data server 372. The request is transmitted by the same method as the data receiving apparatus 134 of the first embodiment transmitting a data transmission request to the first data server 110 or 112.

Upon reception of the data transmission request from data receiving apparatus 382, data server 372 increments, based on a data designation number included in the request, a value of an element corresponding to the number in the selection frequency field 420 of data schedule management table 376. Further, data server 372 updates the element corresponding to the designated number of the allocated block number field 422 in accordance with the logic which will be described in the following.

When we represent the value of the element in selection frequency field 420 corresponding to the selected data Di as Fi and the element of the corresponding allocated block number field 422 as Qi, Qi can be calculated in accordance with the following equation.

$$Qi=(100*Fi)/\Sigma Fi$$

where Σ represents the sum for all the selected data.

In calculating Qi, figures below the decimal point are rounded off. Therefore, generally, ΣQi is smaller than 100. At this time, among 100 blocks, (100−ΣQi) blocks are allocated to that data which has the smallest allocated block number.

In the equation above, the selection frequency Fi of data Di and the sum ΣFi* of the selection frequencies of all the data can be obtained from the information in the selection frequency field 420 of data schedule management table 376.

Again referring to FIG. 16, data server 372 divides each selected data into blocks of which size is designated by the corresponding element of data length field 406 of data schedule management table 376. Data server 372 further transmits these blocks block by block (390), in accordance with the ratio of block numbers allocated to each data in allocated block number field 422.

Data receiving apparatus 382 connects individual data blocks transmitted in this manner to complete one data. Thereafter, the operation of data distribution system 360 until the data is newly selected by data selecting apparatus 122 is the same as that described in the first embodiment, and therefore, details thereof will not be repeated here. The number of blocks into which each data is to be divided can be determined from the information of size field 148 (see FIG. 17) in the copy 374 of the data information table, and from the data length field 424 of data schedule management table 376, and the determination is made by data server 372.

The data distribution system of the fourth embodiment provides the following effects. Assume that the frequency of selection of the first data D1 (8 blocks) by data selecting apparatus 122 is 9 times the frequency of selection of the second data (D2) (4 blocks). In the fourth embodiment, among 100 blocks to be transmitted, the number Qi occupied by the blocks of a certain data Di increases/decreases in accordance with the frequency of selection of the data Di. In the example above, when the block number allocated to the first data D1 is represented as Q1 and the block number allocated to the second data D2 is represented as Q2, Q1 and Q2 can be determined in accordance with the following equations.

$$Q1 = (100*9)/(1+9)$$
$$= 90$$

-continued $$Q2 = (100*1)/(1+9)$$
$$= 10$$

Therefore, the average of the total block numbers transmitted until the first data D1 and the second data D2 are obtained respectively are as follows.

D1: 8*100/90=8.89 blocks

D2: 4*100/10=40 blocks

The average of the total number of blocks which must be received until completion of data retrieval per 10 times of use of data vending machine 370 is determined in accordance with the following equation.

8.89 blocks*9+40 blocks*1=120 blocks     (2)

The value (120) obtained by the equation (2) is smaller by more than 15% than the value (142) obtained by the equation (1) described above. More specifically, the data distribution system of the present embodiment provides the effect that average wait time necessary for obtaining a desired data can be made shorter.

The gist of the fourth embodiment is that the number of data selection is automatically reflected to the amount of comparable data per unit time. As long as this effect is attained, the method for automatically reflecting the number of selection of the data to the amount of communication of the data is not limited to the one described above. Generally, the amount of transmission of each data per unit time can be represented by number of blocks allocated to each data per unit time×data length per 1 block. In the above described method, the number of blocks allocated to each data per unit time is changed while maintaining the data length per block constant. Alternatively, the same effect can be obtained by controlling data length per 1 block. Therefore, the method of controlling data lengths per block is also covered by the present invention. For example, data server 372 may maintain the contents of allocated block number field 422 of data schedule management table 376 constant for all the data, and change the value of data length field 424 for every data Di. The value may be calculated, for example, in accordance with the following equation.

Data length=$\alpha*Fi/\Sigma Fi$ where $\alpha$ represents a constant, Fi represents a value of an element of the selection frequency field 420 corresponding to data Di, and $\Sigma$ represents the sum for all the selected data. By this method also, the amount of data transmission per unit time reflects the number of data selection, and therefore, apparently, the same effect as described above is attained.

Division of the data into blocks is not always necessary. For example, the amount of data transmission of each data Di per unit time may be controlled based on the product of the entire data length and the number of transmission of the entire data per unit time. In this case, the data length itself is not changed. Therefore, in order to reflect the frequency of data selection to the amount of transmission per unit time of each data Di, it is necessary for the data server 372 to control the number of transmission per unit time of each data.

In data schedule management table 376 shown in FIG. 19, if the value of each element of data length field 424 is set extremely large, it follows that every data can be transmitted in one block. Therefore, in fact, the value of allocated block number field 422 represents the number of transmission per unit time of each whole data. Therefore, in order to reflect the frequency of selection to the amount of transmission per unit time of each data, what is necessary is to control each value of the allocated block number field 422. When we represent the value of the allocated block number field 422 corresponding to the ith data Di as Qi, the length of data Di as Si and the value of the element of selection frequency field 420 corresponding to data i as Fi, Qi can be given by the following equation.

$Qi=\beta*Fi/Si$ where $\beta$ represents a constant. The amount of data transmission of each data Di per time is equal to the product of Si and Qi, which in turn is equal to the product of constant $\beta$ and Fi. Therefore, the amount of data transmission of each data Di per unit time is in proportion to the selection frequency Fi of the data Di.

Fifth Embodiment

As described above, when a desired data is retrieved from a data server and stored in a desired storage medium, it is more convenient if not the entire data but only a part of the data can be searched. The apparatus in accordance with the fifth embodiment described in the following relates to a data searching machine for such an application. The data searching machine is adapted to the application of searching book data stored in a storage device in a text format such as ASCII or shift JIS. The description below is only an example, and the application, specifications of each components, detailed structure and the data configuration are not limited to those described below.

Figure 21:
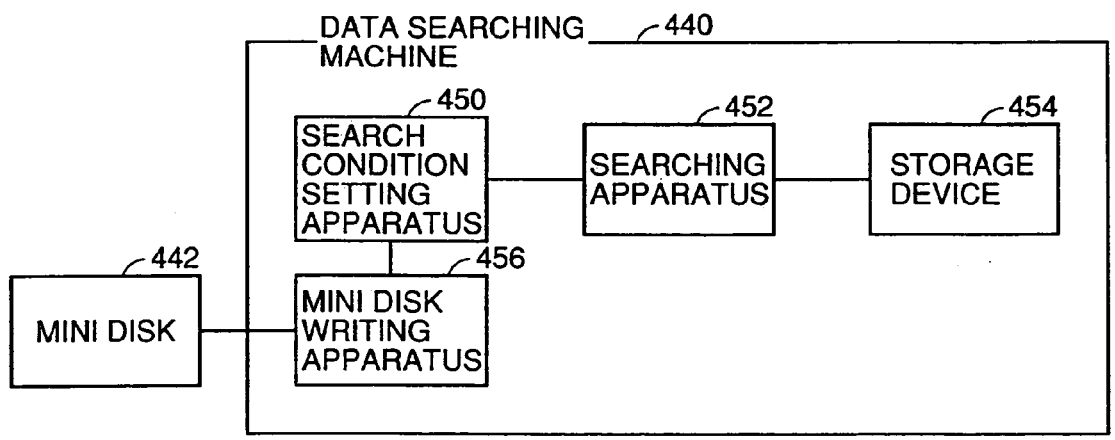
FIG. 21 is a block diagram of a data searching machine in accordance with a fifth embodiment.
Figure 22:
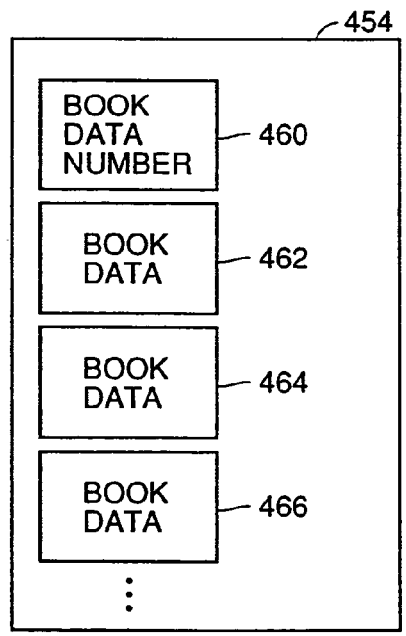
FIG. 22 schematically shows the data contents of the storing device shown in FIG. 21.

Referring to FIG. 21, the data searching machine 440 in accordance with the fifth embodiment of the present invention includes: a search condition setting apparatus 450; a storage device 454 storing a number of book data; a searching apparatus 452 searching the storage device 454 in accordance with the condition set by the search condition setting apparatus 450 and retrieving a desired portion of a desired book data; and a mini disk writing apparatus 456 writing the data retrieved from the storage device 454 by the searching apparatus 452 to a mini disk 442 prepared by a user. Referring to FIG. 22, the storage device 454 stores a number of book data 462, 464, 466, . . . and the number of book data 460. In the following, the description related to a book data 462 applies similarly to other book data 464, 466 and so on, unless otherwise specified.

Figure 23:
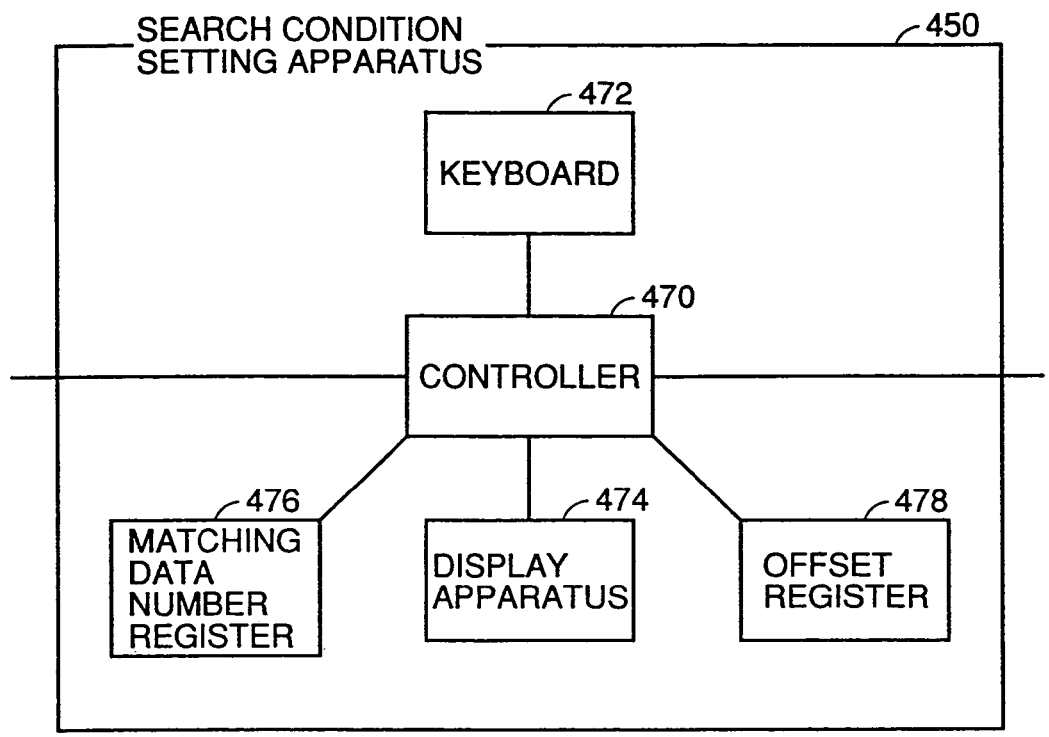
FIG. 23 is a block diagram of a search condition setting apparatus in accordance with the fifth embodiment.

Referring to FIG. 23, search condition setting apparatus 450 includes a controller 470 connected to searching apparatus 452 and mini disk writing apparatus 456, a keyboard 472 and a display apparatus 474 both connected to controller 470, and a matching data number register 476 and an offset register 478.

In the apparatus of this embodiment, search condition setting apparatus 450 is capable of setting a key word for searching book data, and various levels of components such as a paragraph, a section, a chapter or the book itself constituting the book data. In order to facilitate data retrieval with the component level designated, the book data 462 has such a data configuration as will be described in the following. The description, however, is only for the purpose of illustration. In a standard book data, even when the data is not structured, it is possible to break down the book data to components of an arbitrary level as needed, by analyzing the sentences by a program. Further, the structuring described below is not a sole method of structurizing the book data.

Figure 24:
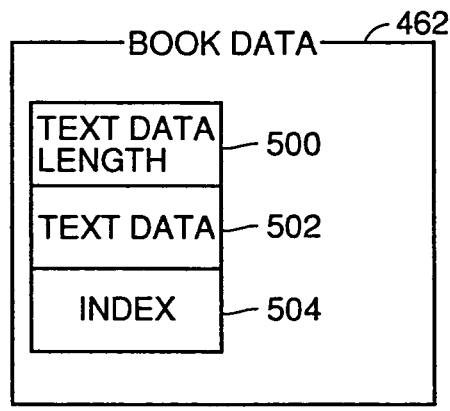
FIG. 24 schematically shows the contents of book data in accordance with the fifth embodiment.

Referring to FIG. 24, book data 462 includes a text data length 500, a text data 502 and an index 504. Text data 502 represents the text data of the whole book in which the text data of the whole book is represented in a prescribed code system (shift JIS code, JIS code, EUC, UNICODE, ASCII code or the like), The byte number of text data 502 is stored as a 4-byte numerical value, in text data length 500. Index 504 represents the contents of book data 462, and hence the contents thereof differ from one book data to another.

Figure 25:
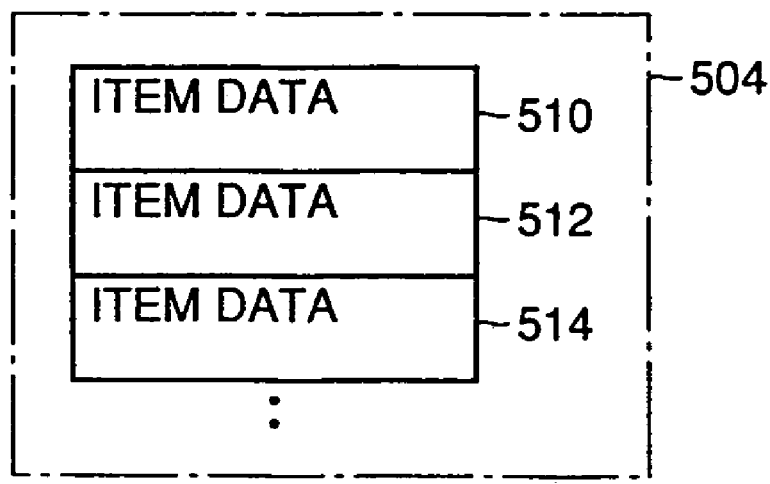
FIG. 25 schematically shows index data in accordance with the fifth embodiment.

Referring to FIG. 25, index 504 includes an array of a plurality of item data 510, 512, 514 and so on in order. Item data 510, 512, 514 and so on have the identical structure. In the following, item data 514 will be described as an example.

Figure 26:
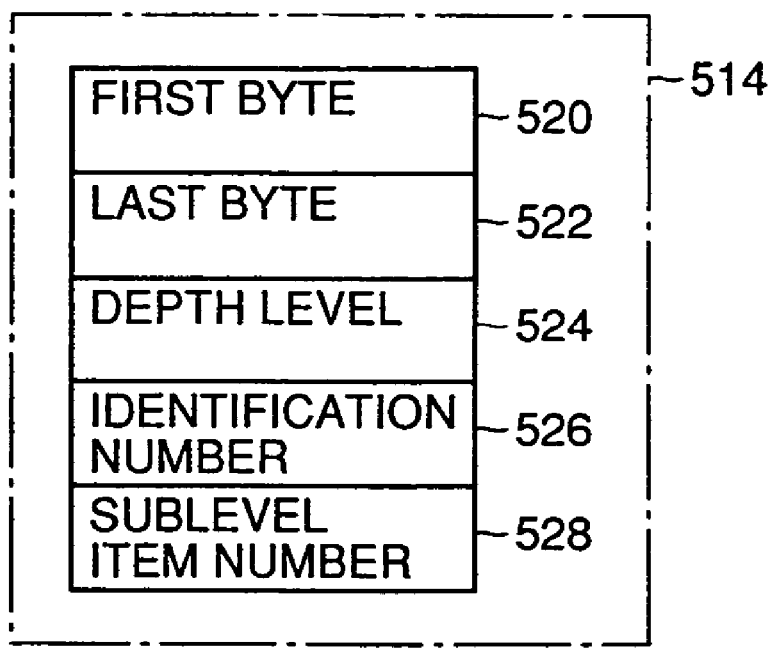
FIG. 26 schematically shows the contents of item data in accordance with the fifth embodiment.

Item data 514 represents information related to the components of different levels of the book such as the whole book, chapter, section or paragraph. Referring to FIG. 26, item data 514 includes a first byte 520, a last byte 522, a depth level 524, an identification number 526 and a sub level item No. 528. These are all in integer values, of which meanings and the sizes are as shown in Table 1 below.

TABLE 1

| Name of the numerical value | Meaning | Size |
|---|---|---|
| First byte 520 | Represents offset from the start of text data 502, of the first byte in the scope of text data 502 corresponding to item data 514 | 4 bytes |
| Last byte 522 | Represents offset from the start of text data 502, of the last byte in the scope of text data 502 corresponding to item data 514 | 4 bytes |
| Depth level 524 | Represents depth level of the scope of text data 502 corresponding to item data 514 | 2 bytes |
| Identification No. 526 | Represents to which order among the item data of the same level the scope of text data 502 corresponding to item data 514 belongs | 2 bytes |
| Sub level item No. 528 | Represents how many item data exist having the depth level upper by one in the scope of text data 502 corresponding to item data 514 | 2 bytes |

Figures 27, 28:
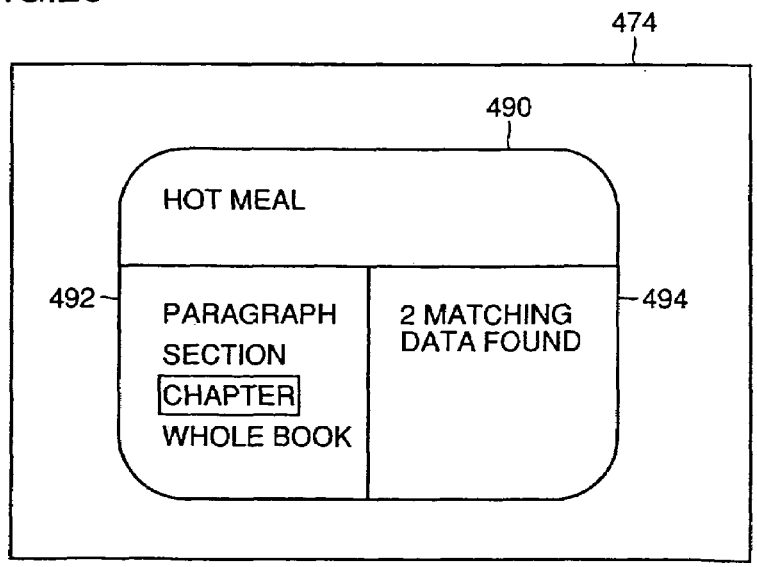
FIG. 27 is a schematic diagram showing an example of the contents of index data in accordance with the fifth embodiment.
FIG. 28 is a schematic diagram showing an exemplary display on a display apparatus in accordance with the fifth embodiment.

Consider book data having a hierarchical structure of a whole book: chapter: section, starting from the upper level. Assume that the book data has a preface, chapter 1, chapter 2, chapter 3 and a postscript. Chapters 1, 2 and 3 are assumed to have three sections, two sections and four sections, respectively. An example of the contents of index 504 corresponding to such book data is shown in FIG. 27. On the right side column of FIG. 27, "component name" is given just for the ease of understanding, and it is not a component of index 504. The name on the first row of the table of FIG. 27 does not constitute the index 504, either.

In the table of FIG. 27, each row except for the first row correspond to respective item data 510, 512, 514, . . . . In FIG. 27, however, numerical values of the first byte 520 and the last byte 522 are not shown for most of the item data.

Referring to FIG. 27, "preface" and "postscript" of the book are independent components not having any lower level, and handled in the similar manner as a chapter. In FIG. 27, the first byte position of each chapter is not always equal to the first byte position of the first section of each section. This is because in most cases a title or an introduction of the chapter precedes the first section of each chapter. Similarly, the start byte position of the whole book is not generally equal to the start byte position of the preface, because of the existence of a title of the book or the like. Similarly, the position of the last byte of the postscript does not generally equal to the last byte position of the book as a whole, because of the existence of a colophon or the like.

When the data structure described above is used for book data 462 (see FIG. 24), and the scope of data retrieval is selected by search condition setting apparatus 450 (see FIG. 21), the selected scope of data retrieval is represented by a numerical value designating the depth level 524 of each item data in the data searching machine 440.

The operation of the data searching machine 440 in accordance with the fifth embodiment will be described in the following. Referring to FIG. 21, a user inserts his/her mini disk 442 into mini disk writing apparatus 456. Thereafter, the user enters search condition of format data to data searching machine 440, using search condition setting apparatus 450.

FIG. 28 shows an example of a display on the search condition setting apparatus 450. In this example, by the search condition setting apparatus, a key word and a scope of data retrieval designating from what level unit such as the paragraph, section, chapter and the whole book, the data is to be retrieved. As can be seen in FIG. 28, on display apparatus 474, there are a key word window 490 displaying a key word ("hot meal") entered through the keyboard 472 (see FIG. 23), a data retrieval scope window 492 displaying a selectable scope of data retrieval and indicating, by a surrounding rectangle, the selected scope of data retrieval, and a search result window 494 displaying the search result. In key word window 490, the key word for searching entered by the user through keyboard 472 shown in FIG. 23 is displayed. The selection of data retrieval scope in data retrieval scope window 492 is performed by operating a cursor key provided on keyboard 472, to move upward/downward the rectangle surrounding the character string.

Setting of the search condition shown in FIG. 28 is only an example, and a so-called "equivocation search" may be possible. Here, for simplicity of description, such a partial match search is not considered, and it is assumed that only the full-match search is performed by searching apparatus 452. It is needless to say that forward match or backward match searching is possible.

The key word and the scope of data retrieval for searching entered through the search condition setting apparatus 450 are applied to searching apparatus 452 (see FIG. 21). Searching apparatus 452 searches the storage device 454, retrieves the portion containing the key word of the book data containing the key word, by the unit designated by the scope of data retrieval set by search condition setting apparatus 450 (the data retrieved in this manner will be referred to as "matching data"), and transfers the matching data to mini disk writing apparatus 456. Further, searching apparatus 452 transfers the number of matching data to search condition setting apparatus 452. The operation of searching apparatus 452 will be described in detail later with reference to FIG. 29.

Search condition setting apparatus 450 displays the number of matching data transferred from searching apparatus 452 on search result window 494 (see FIG. 28). FIG. 28 shows an example of display on the search result window 494 when there are two matching data.

Mini disk writing apparatus 456 writes the matching data transferred from searching apparatus 452 to the inserted mini disk 442. When writing ends, mini disk writing apparatus 456 ejects mini disk 442, and the process is terminated. When there is no matching data, mini disk writing apparatus 456 ejects mini disk 442 without writing, and the process is terminated.

Figure 29:
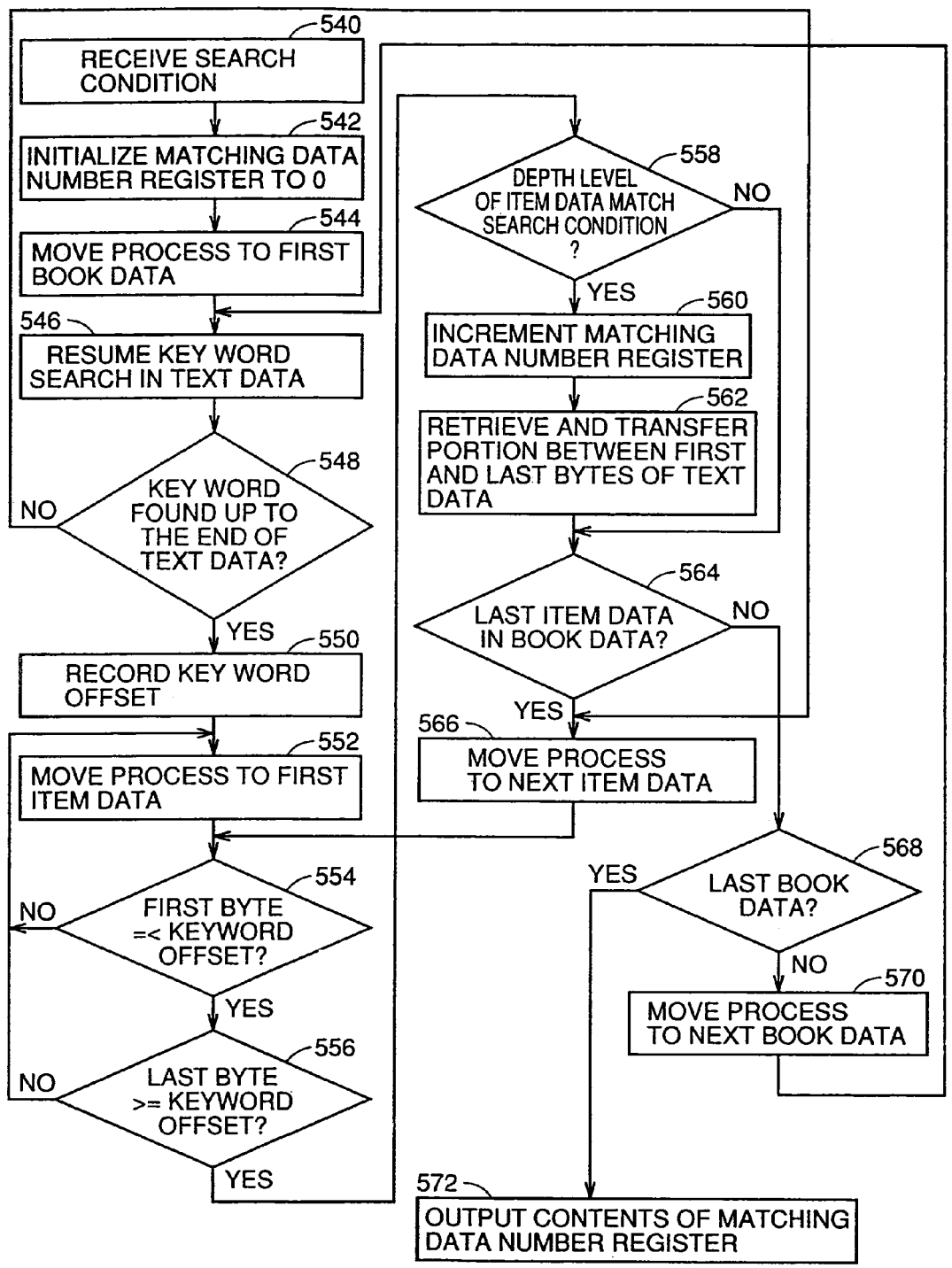
FIG. 29 is a flow chart representing an operation of the data searching machine in accordance with the fifth embodiment.

Referring to FIG. 29, details of the operation of searching apparatus 452 (see FIG. 21) will be described. The operation represents the process steps executed by controller 470 shown in FIG. 23. First, controller 470 receives the key word and the scope of data retrieval from search condition setting apparatus 450 (540). Thereafter, the matching data number register 476 is initialized to 0 (542). Among the plurality of book data 462, 464, 466 . . . stored in storage device 454, the process is moved to the first one (544), and key word is searched for in portions not yet processed of text data 502 (546). Every time the key word is found (YES in step 548), the byte offset of the matching key word from the start of text data 502 is recorded in offset register 478 (550). Thereafter, the process is moved to the first item data not yet processed in item data 510, 512 and 514 in index 504 (552). Referring to each of the item data 510, 512, 514 . . . , if there is an item data of which numerical value of the first byte 520 is equal to or smaller than the contents of offset register 478 and the numerical value of the last byte 522 is equal to or larger than the contents of offset register 478 (YES in step 556), then the control proceeds to step 558. If the result of determination is NO in either of steps 554 and 556, the control returns to step 552, the process proceeds to the next item data and the process steps are repeated.

Thereafter, whether the depth level 524 of the item data found in the above described manner matches the scope of data retrieval set by search condition setting apparatus 450 or not is determined (558). If there is a match, the matching data number register 476 is incremented (560). Thereafter, the first byte 520 and the last byte 522 of the matching item data are again referred to, the data within the scope are all retrieved from text data 502, and transferred to mini disk writing apparatus 456 (562).

After step 562, whether the item data processed in this manner is the last item data of the book data which is being processed or not is determined (564). The process also proceeds to this step 564 when it is determined in step 558 that the depth level of the item data does not match the searching condition. If it is determined in step 564 that the item data is the last item data, the process moves to the next item data (556), and the control returns to step 554. If the item data is not the last item data, whether the book data which is being processed at present is the last book data or not is determined (568). If the book data is the last one, the contents of the matching data number register is output to search condition setting apparatus 450, and the process is terminated (572). If the book data which is being processed is not the last one, the process is further moved to the next book data (570), and the control returns to step 546.

In the process of step 548, if a key word cannot be found to the last of the text data, the control proceeds to step 566, where the process is moved to the next item data, and the process steps following step 554 are repeated.

Referring to FIG. 22, it is assumed that book data 462, 464, 466 and so on are stored in the storage device 454 continuously without any space therebetween. Further, it is assumed that each book data, for example, book data 462, stores text data length 500, text data 502 and index 504 in this order. As the data is structured in this manner, it is possible for the searching apparatus 452 to know the start and end of each book data 462, 464 or 466. The reason will be described in the following.

Searching apparatus 452 first refers to the sub level item No. 528 of the whole book of index 504, to know which is the item data having the depth level of 1 and being the last one of that book. Referring to FIG. 27, generally, the last one of the item data of which depth level 524 is (n+1) can be known from the numerical value of the sub level item No. 528 of the immediately preceding item data having the depth level 524 of n. Therefore, when looking at the index 504 from the start, it is possible to know the end of index 504.

First, text data length 500 has a fixed length, and therefore, the end position thereof can naturally be known. The end of text data 502 can be found by making reference to the contents of text data length 500. Further, of the index 502, the last one of the item data having the depth level 524 of 1 can be found from the item data of index 504. Eventually, searching apparatus 452 is capable of finding the end position of index 504 of each of the book data 462, 464 and 466.

In addition to the description above, when the book data number 460 is referred to, it is possible for the searching apparatus 452 to know up to which capacity of storage device 454 the book data 462, 464, 466 and so on are stored.

Sixth Embodiment

Figure 30:
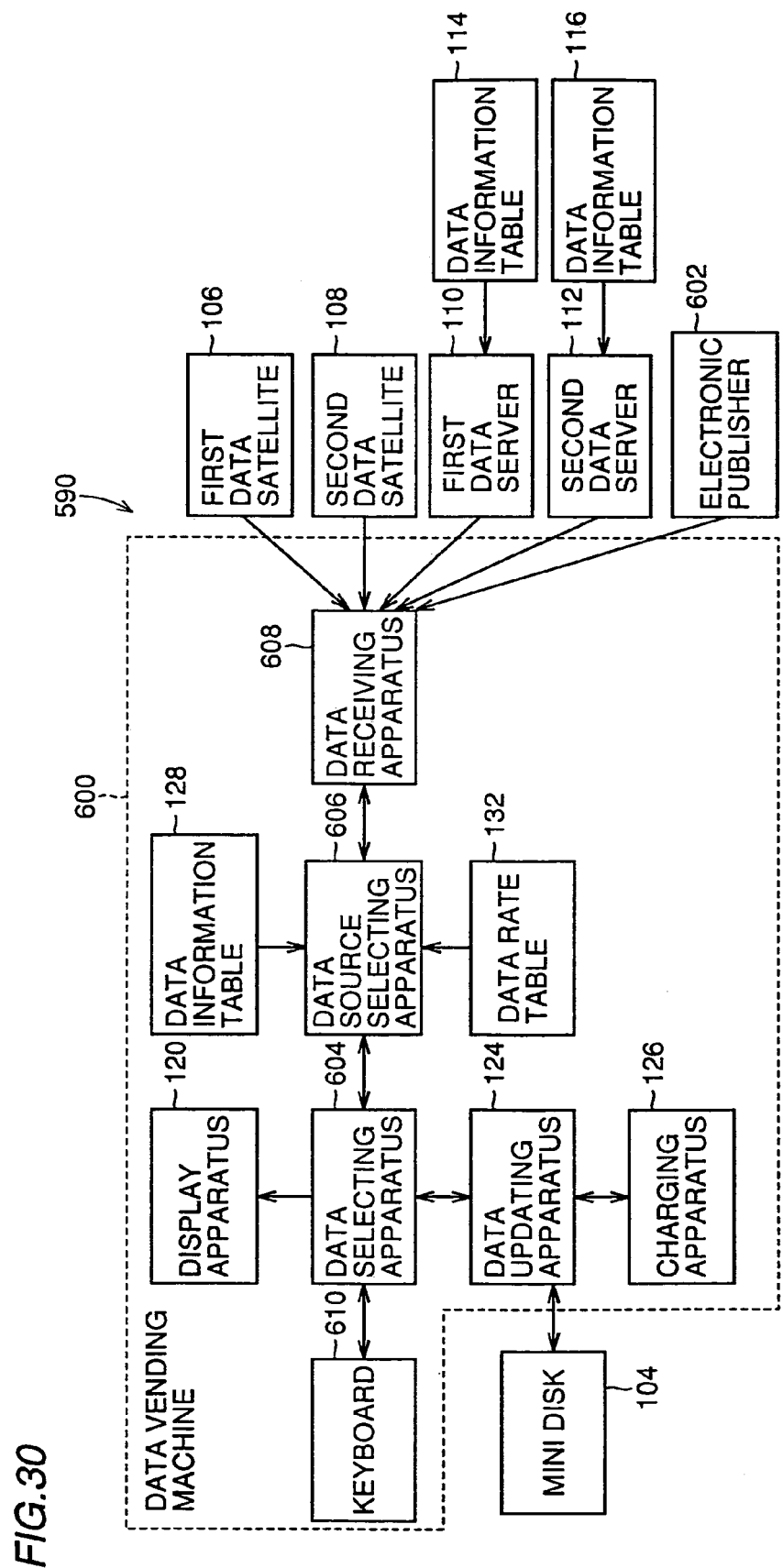
FIG. 30 is a block diagram of a data distribution system in accordance with the sixth embodiment.

FIG. 30 is a block diagram of a data distribution system 590 in accordance with the sixth embodiment of the present invention. The data distribution system 590 differs from the data distribution system 100 (see FIG. 1) of the first embodiment in that the data source newly includes an electronic publisher 602, and that in place of data vending machine 102 shown in FIG. 1, it includes a data vending machine 600 newly including a keyboard 610.

Data vending machine 600 includes, in place of data selecting apparatus 122, data source selecting apparatus 130 and data receiving apparatus 134 of data vending machine 102 shown in FIG. 1, a data selecting apparatus 604, a data source selecting apparatus 606 and a data receiving apparatus 608, respectively. Differences between these components and the corresponding components of FIG. 1 will be described later.

Electronic publisher 602 is much different in nature from other data sources, and it is unnecessary to register the publisher in data information table 128 and data rate table 132. Communication between data receiving apparatus 608 and electronic publisher 602 have only to be capable of one-directional communication from data receiving apparatus 608 to electronic publisher 602.

Different from the data vending machine 102 in accordance with the first embodiment, in the data vending machine 600 in accordance with the sixth embodiment, when the data selecting apparatus 604 displays selectable data on display apparatus 120, "others" is displayed as an option. When "others" is selected, data selecting apparatus 604 controls display apparatus 120 and keyboard 610 such that information of the data desired by the user can be input, and data source selecting apparatus 606 and data receiving apparatus 608 operate to place an order or issue an inquiry to electronic publisher 602 in accordance with the input information. When "others" is not selected in data selecting apparatus 604, the operation of data vending machine 600 is the same as that when a normal choice is made in the first embodiment.

Figure 31:
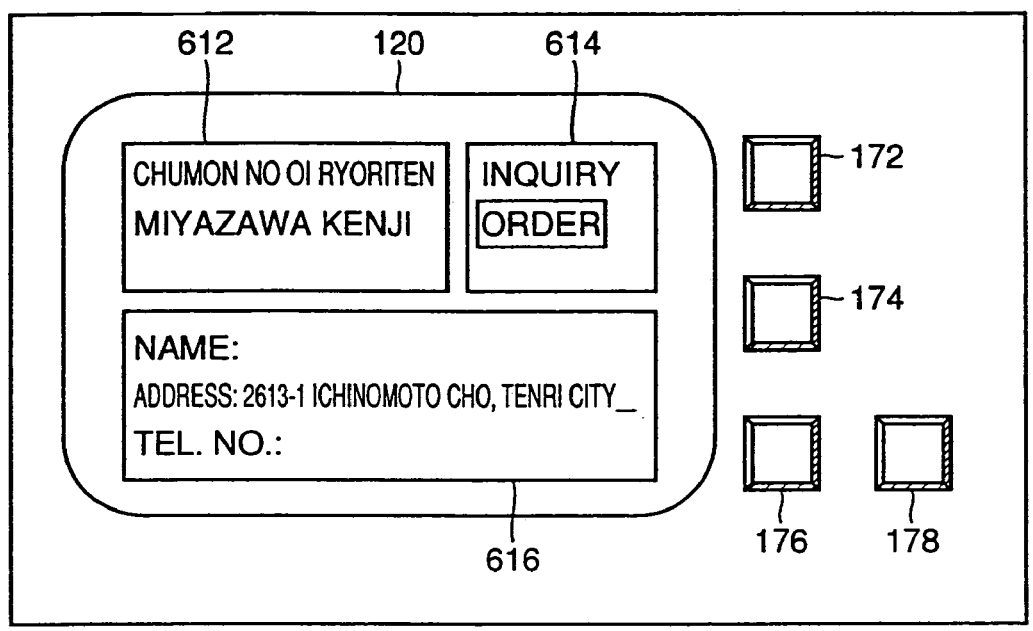
FIG. 31 is a schematic diagram representing an exemplary display on a display apparatus and a configuration of a data selecting apparatus in accordance with the sixth embodiment.

FIG. 31 shows an appearance of various switches on data selecting apparatus 604 and the exemplary display on display apparatus 120 when the user selected "others" on data selecting apparatus 604. Referring to FIG. 31, data selecting apparatus 604 includes a previous item switch 172, a next item switch 174, an OK switch 176 and a cancel switch 178. Display apparatus 120 has a data information input window 612 displaying the input data information, an action input window 614 displaying whether it is an inquiry or an order, and a user information input window 616 for entering name, address and telephone number of the user.

The user enters the information such as the name of the desired data to data information input window 612, enters whether it is an inquiry or order to action input window 614, and enters the user information such as the name, address and the telephone number to user information input window 616, in this order. At this time, every time the user presses the OK switch 176, the target window moves from window 612 to 514 and 616 in this order. When the OK switch 176 is pressed while an input point is within the user information input window 616, the data selecting apparatus 614 detects the end of input.

In the action input window 614, a rectangle surrounding character strings such as "inquiry" or "order" is moved upward by pressing the previous item switch 172, and move downward by pressing the next item switch 176, whereby it is possible to designate a desired action. When "others" is not selected in data selecting apparatus 604, the previous item switch 172, the next item switch 172, the OK switch 176 and the cancel switch 176 have the same function as those described in the first embodiment.

The information input by the user through keyboard 610 in this manner is transmitted through data source selecting apparatus 606 and data receiving apparatus 608 to electronic publisher 602. In response to the transmitted information, electronic publisher 602 sends an answer to data receiving apparatus 608 in accordance with the designated action, or sends the designated product to a designated place. Generally, it is considered difficult for the electronic publisher 602 to prepare data instantly. Therefore, different from other data source, it is not expected for the electronic publisher 602 that the data itself is transmitted immediately from electronic publisher 602 to data receiving apparatus 608. If such an operation is possible, the electronic publisher 602 is indistinguishable from other data sources, and hence the present embodiment would be the same as the first embodiment.

Bi-directional communication between data receiving apparatus 608 and electronic publisher 602 is of course possible. This ensures a path for transferring the data desired by the user electronically from the electronic publisher 602 to data updating apparatus 102. Therefore, in such a system, electronic publisher 602 may inform the user when the data is ready, and receiving the information, the user may again access the data vending machine 600 to receive data supplied from electronic publisher 602 and store the data in mini disk 104.

The electronic publisher 602 may be a common book store. In that case, it is possible for the electronic publisher to send the book not in the form of electronic data but in paper having the same or corresponding contents, to the user.

As the data vending machine 600 has the function of communicating with an electronic publisher 602 other than the inherent data sources, versatile data distribution becomes possible, allowing handling of data of wide variety to be distributed.

Here, it may be possible that the electronic publisher 502 inputs the available data among the options displayed on data selecting apparatus 604 in advance. When such a data is selected by the user, such a control may be performed in that the user is asked to input necessary information such as the destination of data transmission. In such a case, electronic publisher 602 can be regarded by the user, at least up to a certain point of operation, as just one of the common data sources.

Seventh Embodiment

Figure 32:
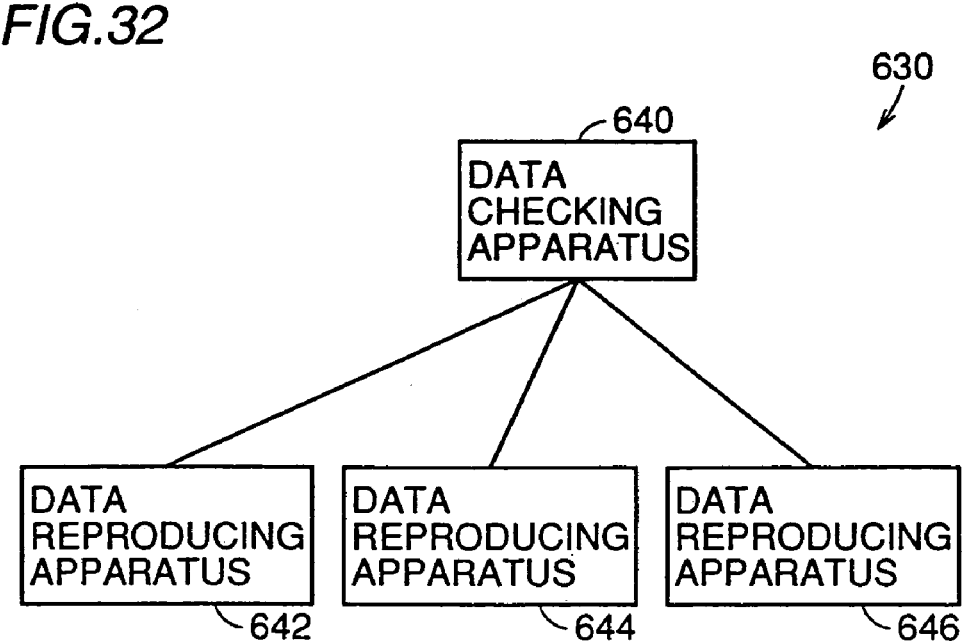
FIG. 32 is a block diagram of a data distribution system in accordance with a seventh embodiment.

In such an electronic data distribution system, preventing an unauthorized copying of data is of critical importance. The seventh embodiment relates to a copied data detecting system for detecting the unauthorized copying of the data distributed over the data distribution system. Referring to FIG. 32, the system 630 has a function of suppressing unauthorized copying by detecting whether a mini disk for storing distributed data used among a plurality of data reproducing apparatuses 642, 644 and 646 is a copied medium and taking an appropriate action dependent on the result of detection.

Referring to FIG. 32, the copied data detecting system 630 in accordance with the seventh embodiment of the present invention includes a data checking apparatus 640 connected to data reproducing apparatuses 642, 644, 646 and so on. Data reproducing apparatuses 642, 644, 646 and the like are identical in function, and it is assumed that the description for data reproducing apparatus 642 is similarly applicable to other data reproducing apparatuses.

Figure 33:
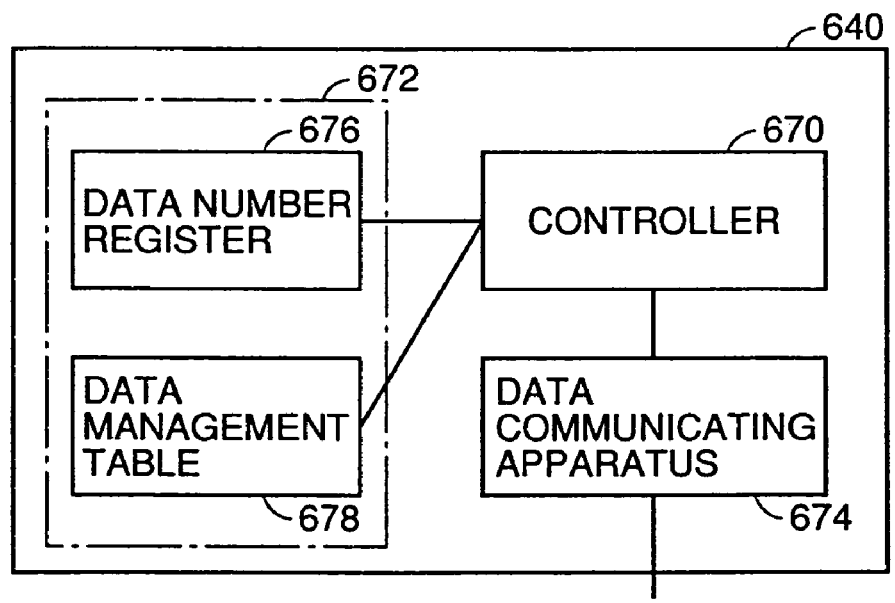
FIG. 33 is a block diagram of a data searching apparatus in accordance with the seventh embodiment.

Referring to FIG. 33, data checking apparatus 640 includes a controller 670, a data communicating apparatus 674 for communicating with data reproducing apparatuses 642, 644, 646 and so on, and a storage device 672. Storage device 672 includes a data number register 676 and a data management table 678.

Figure 34:
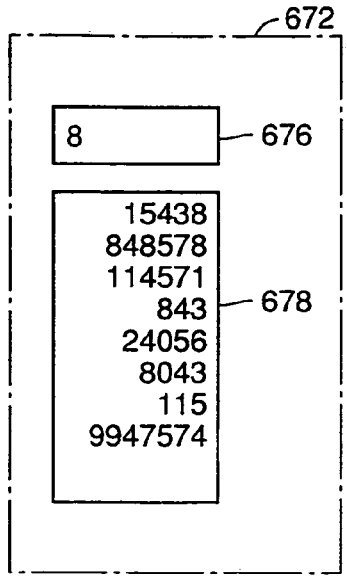
FIG. 34 is a schematic diagram showing data configuration of the storage device in accordance with the seventh embodiment.
Figure 38:
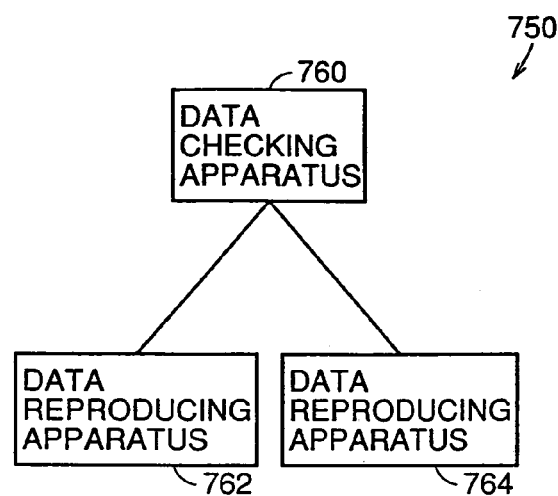
FIG. 38 is a block diagram of a data distribution system in accordance with the eighth embodiment of the present invention.

Referring to FIG. 34, data management table 678 stores continuously, numbers of authentication data transmitted along with a signal of "start of use" for a mini disk from each data reproducing apparatus 642. Data number register 676 stores the number of authentication data stored in data management table 678. In the example shown in FIG. 34, it is assumed that each data in data number register 676 and data management table 678 is a 4-byte unsigned integer. In FIG. 38, the number "8" of the authentication data and the number of corresponding 8 authentication data are both represented in decimal notation.

Figure 35:
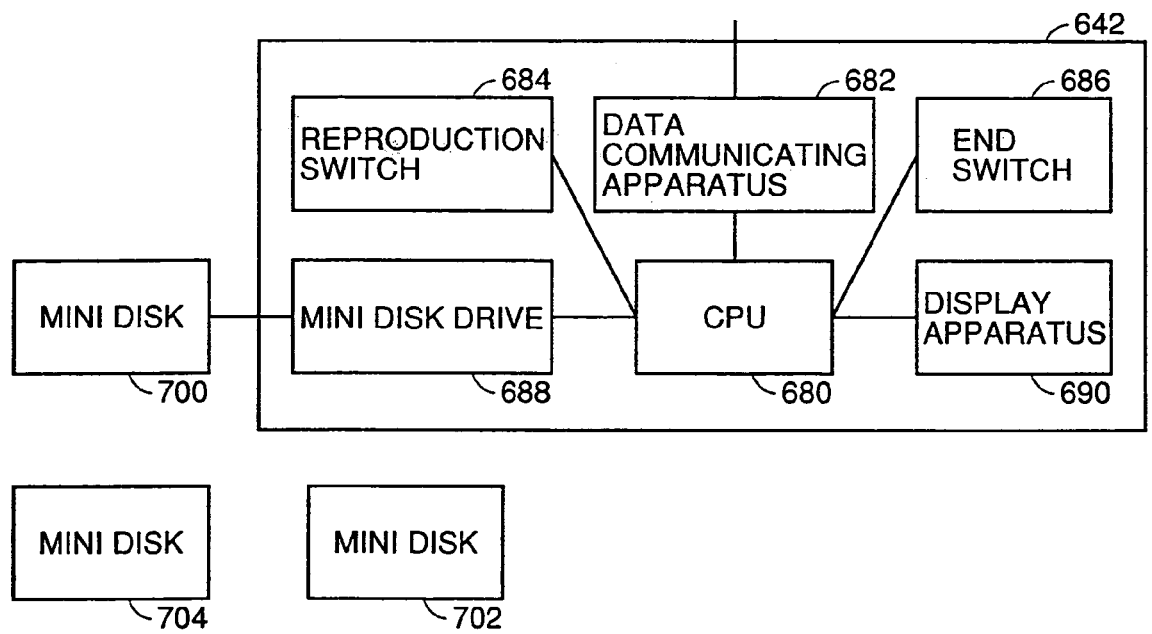
FIG. 35 is a block diagram of a data reproducing apparatus in accordance with the seventh embodiment.

Referring to FIG. 35, data reproducing apparatus 642 includes: a CPU (Central Processing Unit) 680 for controlling the overall operation of data reproducing apparatus 642; a data communicating apparatus 682 connected to CPU 680 for data communication with data checking apparatus 640; a display apparatus 690 controlled by CPU 680 and providing display of various information to the user; a mini disk drive 688 controlled by CPU 680 and reproducing data from mini disk 700; and a reproduction switch 684 and an end switch 686 for starting or ending reproduction of data from mini disk 700 by mini disk drive 688, connected to CPU 680, respectively.

Figure 36:
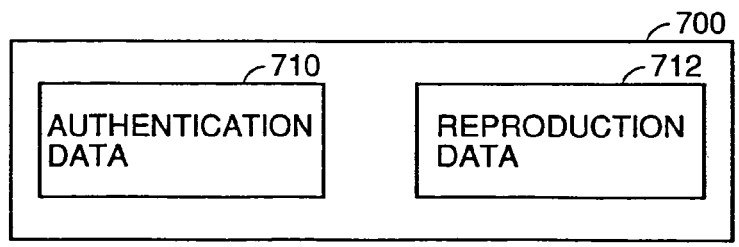
FIG. 36 is a schematic diagram showing contents of a mini disk in accordance with the seventh embodiment.

Referring to FIG. 36, each of the mini disks 700, 702, 704 and the like is mountable to mini disk drive 688, and has similar data structures. For example, mini disk 700 has an authentication data 710 uniquely allocated officially to mini disk 700, and reproduction data 712 to be reproduced by data reproducing apparatus 640. In the following, a copy of the contents of authentication data 710 may be simply referred to as authentication data 710.

Data communication apparatus 674 of data checking apparatus 640 shown in FIG. 33 and data communication apparatus 682 of data reproducing apparatus 642 shown in FIG. 35 are assumed to be capable of bi-directional communication by appropriate means such as telephone network, radiowave and so on. The operation of system 630 will be described in the following. For convenience of description, the operation of data reproducing apparatus 642 will be described first. The user inserts mini disk 700 to mini disk drive 688 and presses reproduction switch 684. CPU 680 detects pressing of reproduction switch 684 to drive mini disk drive 688, and mini disk drive 688 reads authentication data 710 from mini disk 700. CPU 780 applies the read authentication data 710 to data communication apparatus 682. Data communication apparatus 682 transmits the signal indicating "start of use" and authentication data 710 to data communication apparatus 674 of data checking apparatus 640.

Based on the authentication data, data checking apparatus 640 performs the copied data detecting process. The details will be described later. Dependent on the result of copied data detecting process, data checking apparatus 640 may transmit "reproduction prohibited" signal back to data reproducing apparatus 642.

During this period, mini disk drive 688 reads the reproduction data 712 from mini disk 700, and CPU 680 applies the reproduced data 712 to display apparatus 690. Thus reproduction of reproduction data 712 starts. If data communication apparatus 682 receives the "reproduction prohibited" signal from data checking apparatus 640 at this time, CPU 680 displays a message indicating "the data may possibly be an unauthorized copy" on display apparatus 690, and stops operation of mini disk drive 688. Namely, reproduction of mini disk 700 is prohibited.

When the user presses end switch 686 while the reproduction data 712 is being reproduced, data communication apparatus 682 transmits a signal indicating "end of use" and authentication data 710 to data communication apparatus 674 of data checking apparatus 640. Thereafter, CPU 680 stops operation of mini disk drive 688.

Figure 37:
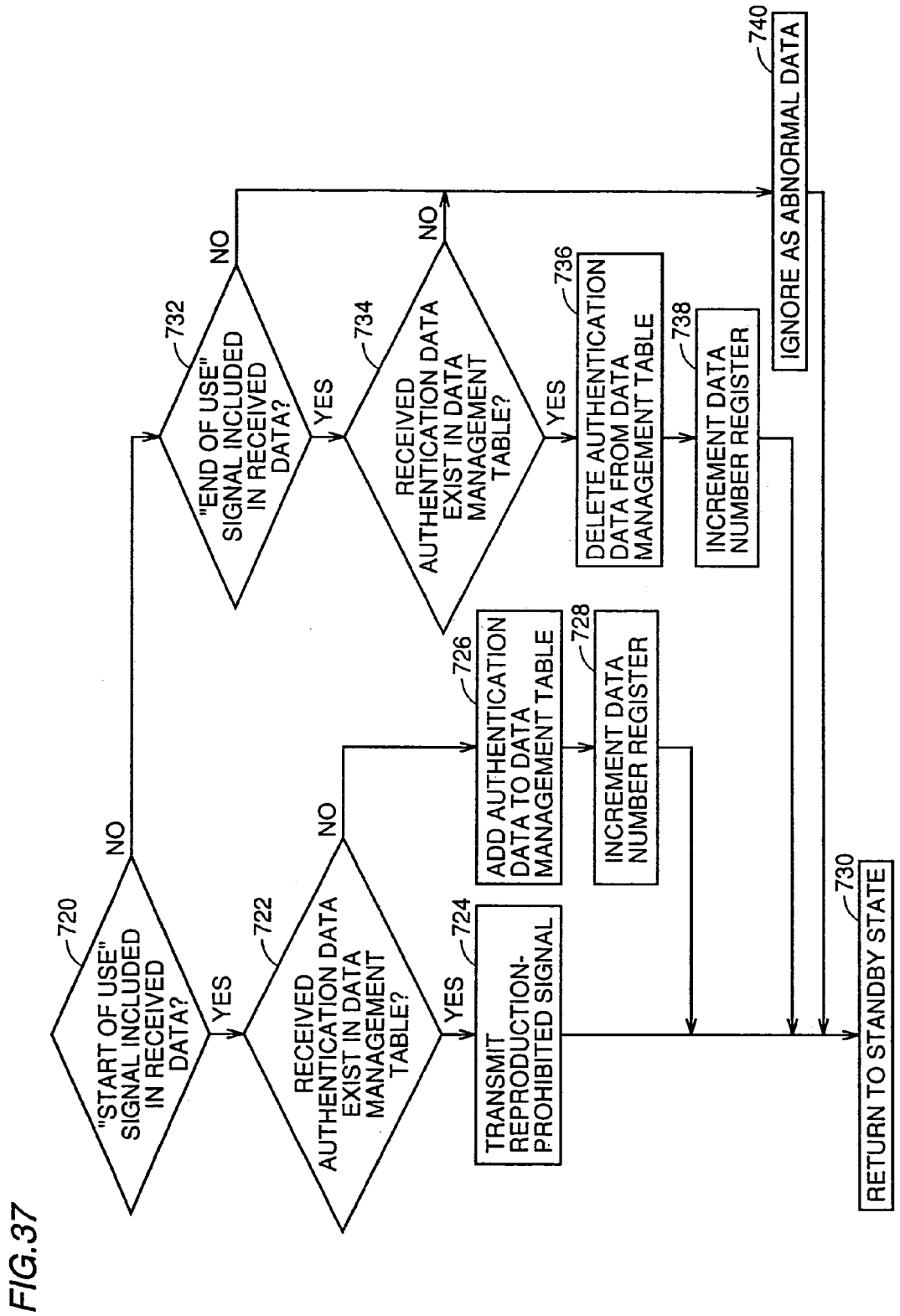
FIG. 37 is a flow chart representing an operation of a data checking apparatus in accordance with the seventh embodiment.

The processing in data checking apparatus 640 when any signal or data is transmitted from data reproducing apparatus 682 will be described with reference to FIG. 37. The process corresponds to the process steps performed by controller 670 shown in FIG. 33. First, controller 670 determines whether the data received by data communication apparatus 674 includes "start of use" signal or not (720). If the answer is YES, control proceeds to step 722, and if it NO, control proceeds to step 732, respectively.

When the received data includes "start of use" signal, whether the authentication data 710 included in the received data is already present in data management table 678 or not is determined (722). If there is, the "reproduction prohibited" signal is transmitted to data communication apparatus 682 of the data reproducing apparatus as the source of the data (724), and the control returns to the standby state (730). If there is not the data identical with the received authentication data 710 in data management table 678 in the determination of step 722, controller 670 adds the transmitted authentication data 710 to the last of the data management table 678 (726). Further, controller 760 increments the data number register 676 (728). Thereafter, the control returns to the standby state (730).

In step 720, when it is determined that the received data does not include "start of use" signal, controller 670 continuously determines whether the received data includes "end of use" signal (732). If the received data does not include the "end of use" signal, it ignores the received data as abnormal data (740), and the control returns to the standby state (730).

If the received data includes "end of use" signal (732), controller 670 continuously determines whether the received authentication data is in the data management table 678 (734). If the received authentication data does not exist in data management table 678 (NO), controller 670 ignores the data as abnormal data (740), and returns to the standby state (730).

If the received authentication data exist in the data management table 678, controller 670 deletes the authentication data from data management table 678 (736), decrements the data number register 676 (738), and returns to the standby state (730).

When the authentication data is deleted from data management table 678 in step 736, it is assumed that the authentication data following the deleted authentication data are shifted in order so as to leave no free area between the authentication data, in the present embodiment.

By the system 630, unauthorized copying of data is suppressed in the following manner. Referring to FIG. 35, assume that a plurality of mini disks 700, 702 and 704 have authentication data 710 (FIG. 36) of the same value. When one mini disk, for example, mini disk 700 is reproduced first by any of the data reproducing apparatuses, the authentication data 710 thereof is stored in data management table 678.

If other mini disk, for example, mini disk 702 is a copy of mini disk 700, then mini disk 702 would have the same authentication data of mini disk 700. When mini disk 702 is to be reproduced by the reproducing apparatus, determinations of steps 720 to 722 of FIG. 37 are made. The result of determination of step 722 would be YES in this example. Therefore, by the process of step 724, the reproduction prohibiting signal is transmitted from data checking apparatus 640 to the data reproducing apparatus and, as a result, mini disk 702 will not be reproduced by data reproducing apparatus. Namely, only one of the plurality of mini disks can be used at one time, if the mini disks have the same authentication data 710.

When a person mass-produces unauthorized copies of a mini disk maliciously, the unauthorized copy of the mini disk has the same authentication data as the original mini disk provided that the copying is done by common means. Therefore, only one of the copies can be used at one time. Other mass-produced mini disks cannot be used at that time and, as a result, the copies are of no use. When an individual copies the data for the purpose of back up, such a problem does not arise, as there is no such situation in which the back up mini disk and the original mini disk are used simultaneously. Thus, system 630 suppresses unauthorized copying of data.

In the present embodiment, data communication apparatus 682 of data reproducing apparatus 642 and data communication apparatus 674 of data checking apparatus 640 are assumed to communicate bi-directionally. The present invention, however, is not limited thereto. For example, communication may be one-directional from data communication apparatus 682 to data communication apparatus 674. Though transmission of "reproduction prohibited" from data communication apparatus 674 to data reproducing apparatus 642 and prohibition of reproduction in data reproducing apparatus 642 are not possible, copying of data itself can be detected. Therefore, though there is no direct effect of suppressing unauthorized copy, useful information can be given to take other actions to suppress unauthorized copying.

In the embodiment above, the authentication data 710 has been described as clearly separated from reproduction data 712. The present invention, however, is not limited to such a format. For example, authentication data 710 may be embedded encoded in reproduction data 712. This makes it more difficult to separate the authentication data 710 from reproduction data 712, and hence it becomes possible to prevent a person to rewrite the authentication data only of the copied mini disk to keep uniqueness of the authentication data.

Eighth Embodiment

FIG. 38 shows a block diagram of the copied data detecting system 750 in accordance with the eighth embodiment of the present invention. Similar to the system 630 shown in FIG. 32, system 750 includes a data checking apparatus 760 and a plurality of data reproducing apparatuses 762, 764 and so on.

Figure 39:
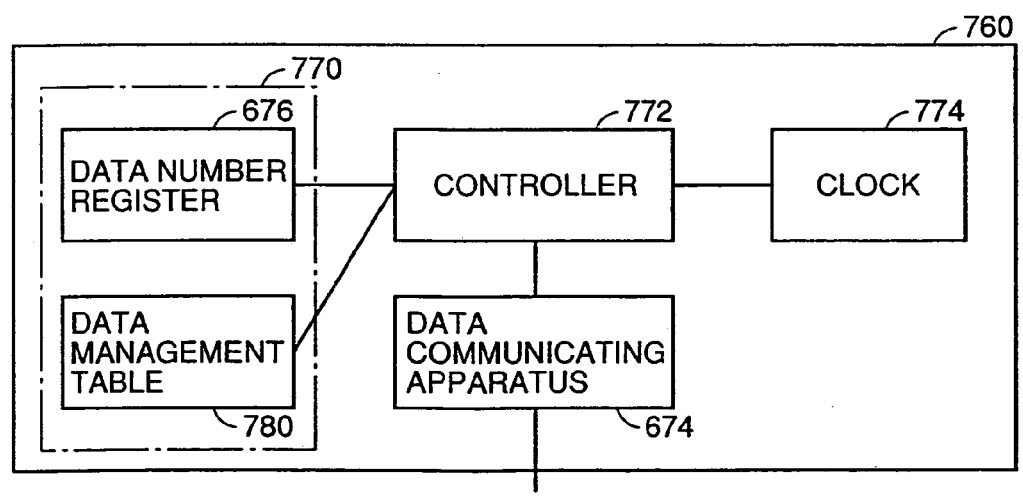
FIG. 39 is a block diagram of the data checking apparatus in accordance with the eighth embodiment.

Referring to FIG. 39, data checking apparatus 760 includes a controller 772, a data communication apparatus 674 similar to that shown in FIG. 33, a storage device 770 and a clock 774 connected to controller 772. Storage device 770 includes a data number register 676 similar to that shown in FIG. 33, and a data management table 780.

Figure 40:
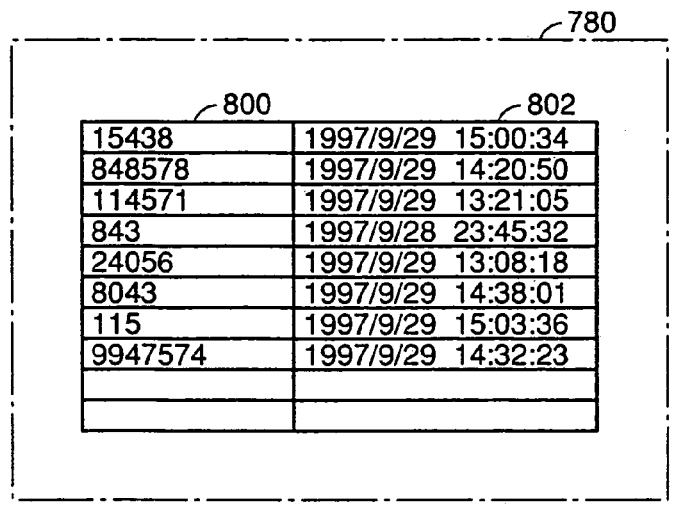
FIG. 40 shows the contents of a data management table in accordance with the eighth embodiment of the present invention.

Referring to FIG. 40, the data management table 780 in accordance with the eighth embodiment includes an authentication data field 800 and a time field 802. Data management table 780 is assumed to store, in a pair, a certain authentication data in authentication data field 800 and the time of transmission of the authentication data in time field 802.

Again referring to FIG. 34, clock 774 can be referred to at any time by controller 772, and maintains year, month, date as well as time, minute and second.

Figure 41:
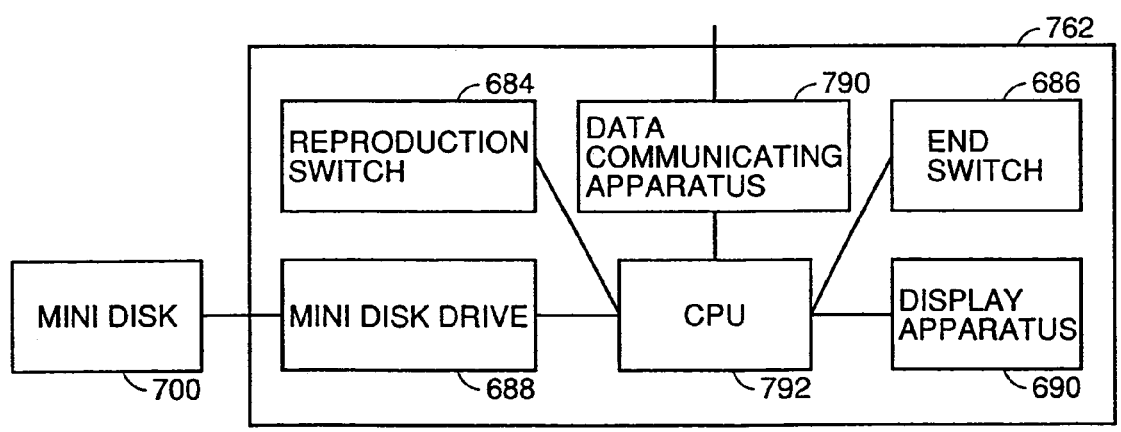
FIG. 41 is a block diagram of a data reproducing apparatus in accordance with the eighth embodiment.

Referring to FIG. 41, data reproducing apparatus 762 includes a CPU 792, a data communication apparatus 790 connected to data checking apparatus 760, a reproduction switch 684 similar to that shown in FIG. 35, an end switch 686, a mini disk drive 688 and a display apparatus 690. In FIG. 41, components similar to those of FIG. 35 are denoted by the same reference characters and named by the same names. Functions are also the same. Therefore, detailed description thereof will not be repeated here.

Mini disk 700 includes an authentication data 710 and a reproduction data 712, as in the case of FIG. 36.

The operation of the copied data detecting system 750 in accordance with the eighth embodiment will be described in the following. Basically, the system of the eighth embodiment is the same as the system of seventh embodiment, and therefore, differences from the seventh embodiment will be discussed. First, assume that the user presses the reproduction switch 684 with the mini disk 700 inserted in mini disk drive 688. Data communication apparatus 790 transmits the authentication data 710 reproduced by mini disk drive 688 to data communication apparatus 674 (see FIG. 39) at every predetermined time interval of α seconds. Data communication apparatus 790 continues the repeated transmission until the end switch 686 is pressed. Here, it is assumed that transmission of the authentication data is not performed for a predetermined period of β seconds (β>α), after the mini disk 700 is inserted to mini disk drive 688 and reproduction switch 684 is pressed. Data communication apparatus 790 starts transmission of authentication data 710 for the first time after β seconds. The reason for this will be described later.

Figure 42:
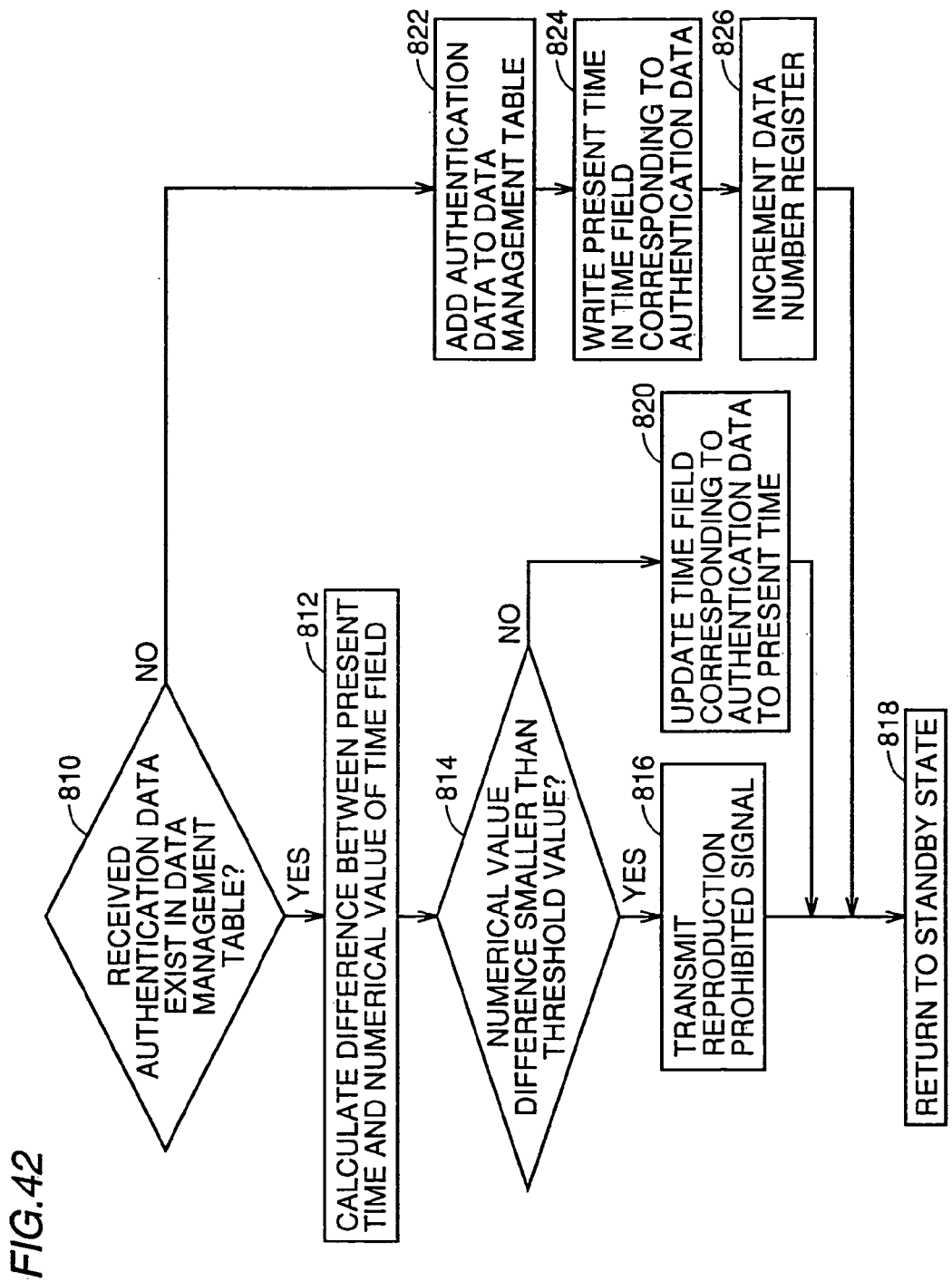
FIG. 42 is a block diagram representing an operation of the data checking apparatus in accordance with the eighth embodiment.

When data is transmitted from data reproducing apparatus 762, data checking apparatus 760 operates in the following manner. Referring to FIG. 42, controller 772 determines whether the transmitted authentication data already exists in authentication data field 800 of data management table 780 (810). If the transmitted authentication data 710 already exists in authentication data field 800, controller 772 calculates the difference between the present time obtained from clock 774 and the contents of time field 802 corresponding to authentication data 710. Determination is made as to whether the difference is smaller than the predetermined time interval of γ seconds (α>γ) (814). If the difference is smaller than γ, controller 772 transmits the "reproduction prohibited" signal to data communication apparatus 790 (816), and returns to the standby state (818). As a result of determination of step 814, if the difference is not smaller than the threshold value γ, controller 772 updates the contents of the time field 802 corresponding to the authentication data 710 to the present time (820), and returns to the standby state (818).

Returning to the start, in step 810, when it is determined that the received authentication data does not exist in the data management table, the received authentication data is added to the last data of authentication data field 800 (822), and the present time obtained from clock 774 is written to the corresponding time field 802 (824). Further, controller 772 increments the data number register 676 (826) and returns to the standby state (818).

Separately, controller 772 refers to the time field 802 of data management table 780 at a prescribed timing, and compares the contents with the present time obtained from clock 774. When there is an element of which the time difference is larger than the predetermined time interval of Δ seconds (Δ>>α), controller 772 deletes the element and the corresponding authentication data from time field 802 and authentication data field 800, and decrements the data number register 767. This is to prevent consumption of capacity of data management table 780 by unused data.

In this embodiment also, as in the seventh embodiment, data communication apparatus 790 may transmit the signal indicating "end of use" and authentication data 710 to data communication apparatus 674 when the end switch 786 is pressed, and unnecessary data may be deleted from data management table 780 using the transmitted signal and the data as the trigger. In this embodiment also, is assumed that portions of the time field 802 and authentication data field 800 corresponding to the deleted authentication data are not left empty but filled in.

Preferably, first transmission of the authentication data takes place after a time period longer than the threshold value γ, after the mini disk 700 is inserted to mini disk drive 688. This is to prevent, when a mini disk 700 which had been reproduced by data reproducing apparatus 764 is inserted to another data reproducing apparatus 762 for reproduction, erroneous determination by data checking apparatus 760 that the mini disk 700 inserted to reproducing apparatus 762 is a copy.

Assume that the threshold value γ is set to 15 seconds. After the last transmission of authentication data 710 of mini disk 700 from data reproducing apparatus 764, assume that mini disk 700 is taken out from data reproducing apparatus 764 and reproduction is started by data reproducing apparatus 762 within 10 seconds. At this time, data communication apparatus 790 transmits the authentication data 710 to data checking apparatus 760. More specifically, in this example, authentication data 710 is sent twice within ten seconds, to data checking apparatus 760, one from the data reproducing apparatus 764 and the other from the data reproducing apparatus 762. The time interval of 10 seconds is smaller than the threshold value γ (15 seconds), and therefore it is determined that the mini disk 700 inserted to data reproducing apparatus 762 is a copy. As the transmission of authentication data 710 starts for the first time after a prescribed time period β seconds (β>α) after the mini disk 700 is inserted to mini disk drive 688 of data reproducing apparatus 762 and reproduction switch 684 is pressed, such erroneous determination can be prevented.

In the eighth embodiment, such a problem will not arise when the signal indicating "end of use" and the authentication data 710 are transmitted to data checking apparatus 760 when the end switch 686 is pressed, as in the seventh embodiment. The reason for this is that upon reception of such data, it is possible for the data checking apparatus 760 to immediately delete the corresponding data from data management table 780.

In the eighth embodiment, unauthorized copying can be suppressed from the same reason as in the seventh embodiment. Further, unauthorized copying can be suppressed in a simple manner as compared with the seventh embodiment.

Ninth Embodiment

Figure 43:
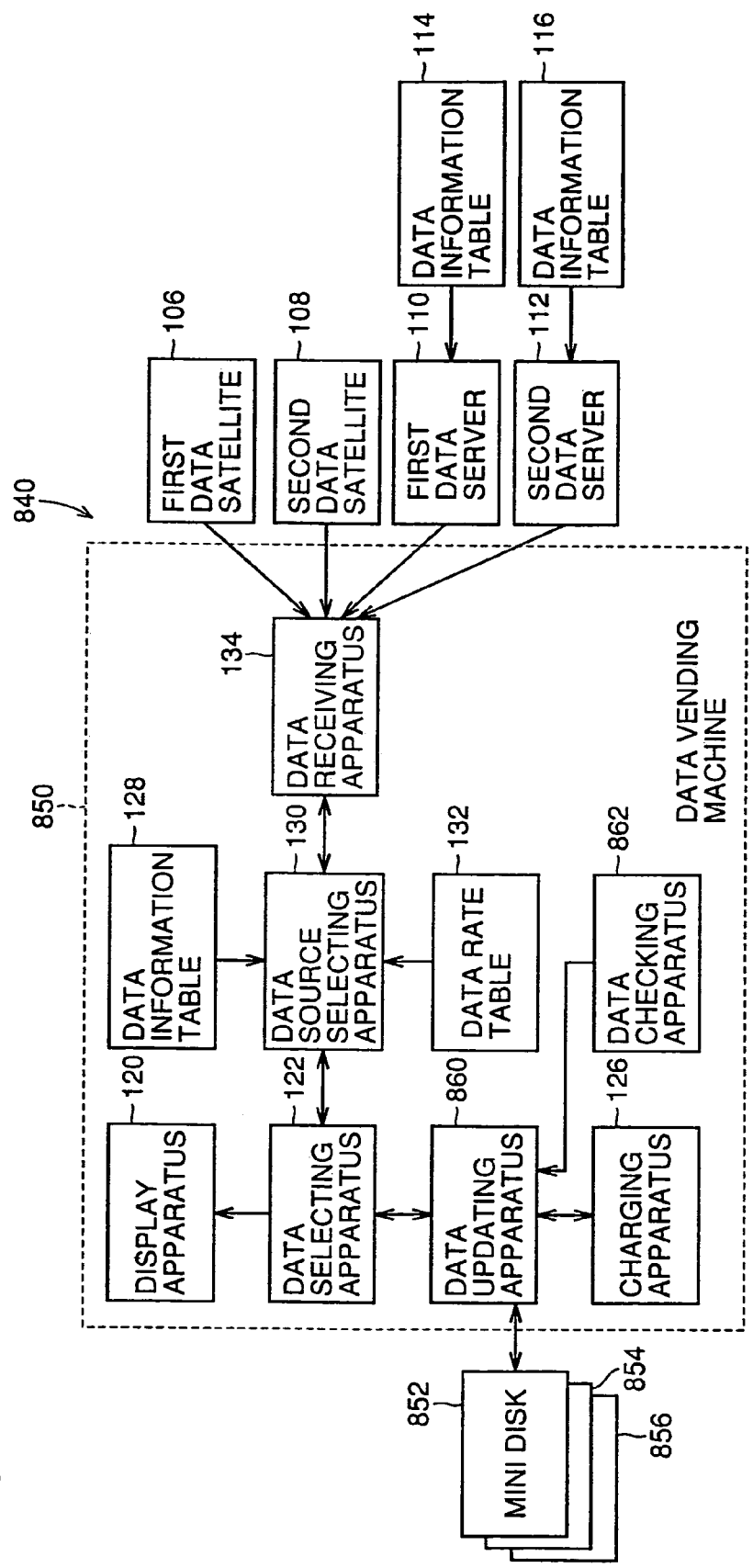
FIG. 43 is a block diagram of a data distribution system in accordance with a ninth embodiment.

FIG. 43 is a block diagram representing the data distribution system 840 in accordance with the ninth embodiment of the present invention. The system 840 differs from the system 100 in accordance with the first embodiment shown in FIG. 1 in that a data vending machine 850 is provided in place of the data vending machine 102 of FIG. 1. The schematic configuration of data vending machine 850 is the same as the data vending machine 102. The difference is that a data checking apparatus 862 is further provided, and in place of the data updating apparatus 124 of FIG. 1, a data updating apparatus 860 is provided which is capable of writing as well as reading data to and from mini disk 852. Data checking apparatus 862 is connected to data updating apparatus 860. Except for these points, corresponding portions are denoted by the same reference characters and named by the same names in FIGS. 43 and 1. The functions are also the same. Therefore, detailed description thereof will not be repeated here.

Figure 44:
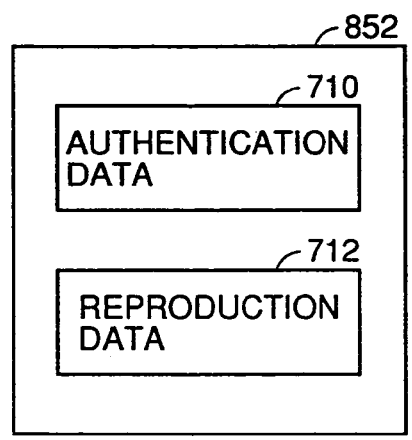
FIG. 44 is a schematic diagram representing data configuration of a mini disk used in the ninth embodiment.
Figure 45:
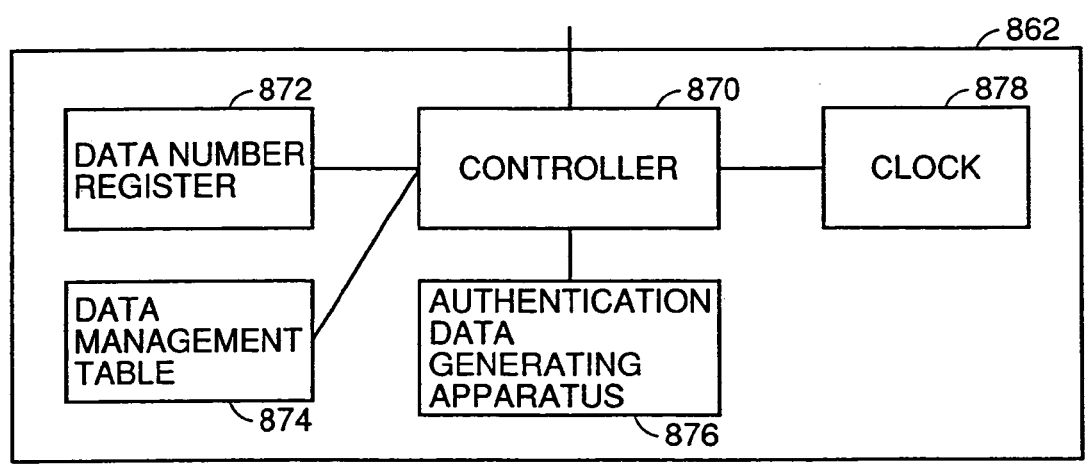
FIG. 45 is a block diagram of a data checking apparatus in accordance with the ninth embodiment.

Referring to FIG. 44, each mini disk 852 stores authentication data 710 and reproduction data 712. Similar to the authentication data 710 of the seventh and eighth embodiments, authentication data 710 is unique to each mini disk in a normal state of use. Referring to FIG. 45, data checking apparatus 862 includes a controller 870 connected to data updating apparatus 860, a data number register 872 and a data management table 874 connected to controller 870, a clock 878 providing present time to controller 870, and an authentication data generating apparatus 876 generating and applying to controller 870 the authentication data.

Figures 46, 47:
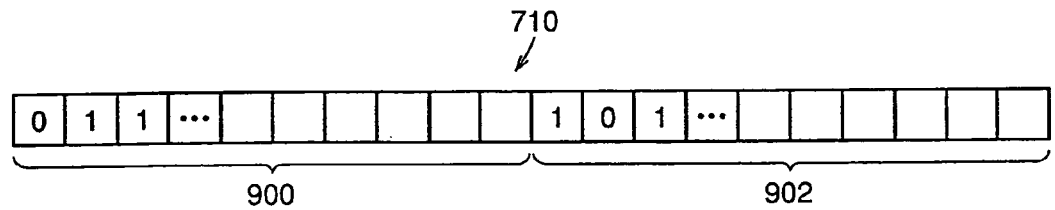
FIG. 46 is a schematic diagram representing contents of a data management table shown in FIG. 45.
FIG. 47 is a schematic diagram showing an authentication data configuration in accordance with the ninth embodiment.

Data number register 872 has the same function as data number register 676 shown in FIG. 39. Contents of data management table 874 are as shown in FIG. 46. Referring to FIG. 46, data management table 874 includes an authentication data field 890 and a corresponding time field 892. Though the configuration of data management table 874 itself is similar to data management table 780 shown in FIG. 40, the table is much different in that data management table 780 shown in FIG. 40 stores information representing data which is being used, while data management table 874 shown in FIG. 46 stores information representing data of which use is prohibited. The number of authentication data stored in data management table 874 is stored in data number register 872.

Authentication data generating apparatus 876 has a function of applying a unique new authentication data to mini disk 852. This is a problem especially when there are a plurality of data vending machines 850 within the system 840, and hence there are a plurality of authentication data generating apparatuses 876 within the system.

In such a case, it is necessary to appropriately determine the method of generating the authentication data so that the authentication data generated by authentication data generating apparatus 862 is unique.

One configuration of the authentication data allowing such a method is as shown in FIG. 47. Referring to FIG. 47, authentication data 710 is a data of 128 bits, that is, upper 64 bits (900) and lower 64 bits (902). Each authentication data generating apparatus 876 has a unique ID number allotted in advance, and the upper 64 bits (900) are for storing the ID number. The lower 64 bits (902) store serial number 0, 1, 2, 3 of the authentication data generated by each authentication data generating apparatus 876. As the authentication data 710 is adapted to have such a configuration, uniqueness of the authentication data can be guaranteed within the system, no matter which authentication data generating apparatus 876 is used.

Data vending machine 850 operates in the following manner. The user inserts his/her mini disk 852 to data updating apparatus 860. Data updating apparatus 860 reads the authentication data 710 from mini disk 852 and transmits the read data to data checking apparatus 862. Based on the transmitted authentication data 710, data checking apparatus 862 determines whether there is a copy of mini disk 852. If it is determined that there is a copy, based on the signal from data checking apparatus 862, a message indicating that there is a copy of the inserted disk is displayed on display apparatus 120, the mini disk 852 is ejected from data updating apparatus 860 without data writing and data vending machine 850 is returned to the initial state. When it is determined that there is no copy, data checking apparatus 862 generates a new authentication data and applies to data updating apparatus 860, and data updating apparatus 860 writes the authentication data as authentication data 710 of mini disk 852. The operation of data vending machine 850 thereafter is the same as the operation of data vending machine 102 described in the first embodiment.

Figure 48:
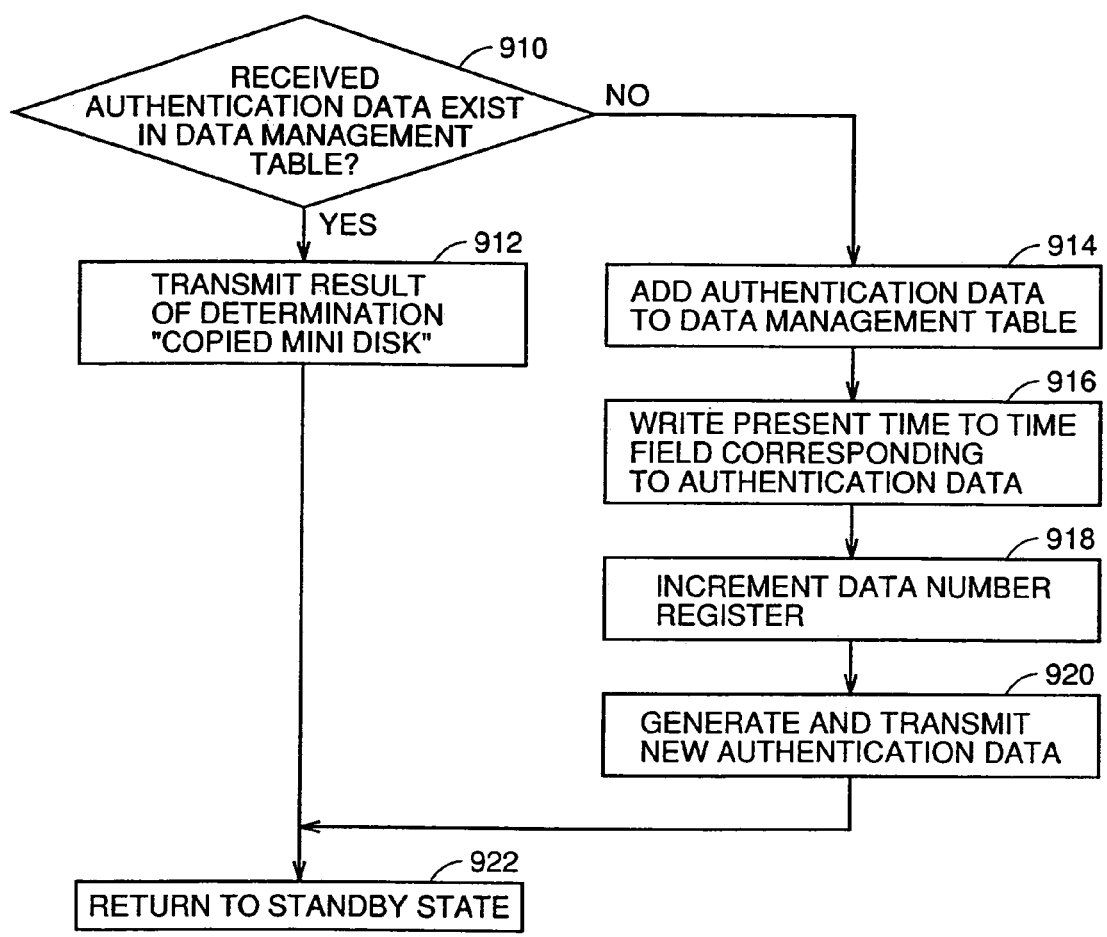
FIG. 48 is a flow chart representing an operation of the data checking apparatus in accordance with the ninth embodiment.

The operation of data checking apparatus 862 when the user inserted the mini disk 852 to data updating apparatus 860 will be described specifically referring to FIG. 48. First, controller 870 (see FIG. 45) refers to authentication data field 890 of data management table 874 (see FIG. 46), and determines whether there is a match with the authentication data 710 read from mini disk 852 (910). When there is a match, controller 870 transmits the result of determination of "mini disk is a copy" to data updating apparatus 860 (912) and returns to the standby state (922). If there is no match, controller 870 adds the contents of authentication data 710 to the last of authentication data field 890 (914), and writes the present time obtained from clock 878 in the time field 892 corresponding to the authentication data (916). Further, controller 870 increments the data number register 872 (918), generates a new authentication data by authentication data generating apparatus 876 and transmits the data to data updating apparatus 860 (920), and returns to the standby state (922). The new authentication data generated at this time is the new data of different contents from the read authentication data 710.

Separately, controller 870 refers to the time field 892 at a prescribed timing, and compares the contents with the present time obtained from clock 878. If the difference is larger than a predetermined time interval, for example, 30 days, controller 870 deletes the time and the corresponding authentication data from time field 892 and authentication data field 890, and decrements the data number register 872. This is to prevent use of the capacity of data management table 874 by unnecessary data. If it is possible to prepare a data management table 874 of sufficiently large capacity, deletion of data in this manner is not necessary. In place of such periodical deletion of data, the contents of data management table 874 may be adjusted in accordance with a prescribed standard only when the data management table 874 becomes full. One possible method is to delete the authentication data having the oldest time in time field 892 and the corresponding time from data management table 874.

It is assumed that in this embodiment, portions of the time field 892 and the authentication data field 890 corresponding to the deleted authentication data are not left as empty area but filled in.

The system 840 employing the data vending machine 850 described above prevents unauthorized copying in the following manner. Assume that a person mass-produces unauthorized copies of a mini disk maliciously. In this case, when data is rewritten by using one of the copied disks (including the original), the data of the remaining disks cannot be re-written for at least a certain period. Therefore, handling of the medium bearing such an unauthorized copy would be extremely limited as compared with a legitimate medium which can be used freely. Thus, the system 840 of the present embodiment suppresses unauthorized copy of the medium.

If it is determined that the mini disk 852 inserted to data updating apparatus 860 is a copy by data checking apparatus 862, various actions can be taken other than simply ejecting the disk from the data updating apparatus 860. For example, reproduction data 712 itself of mini disk 852 may be erased to disable reproduction of data, the mini disk 852 may be retracted inside the data vending machine 852, or a shop clerk may be called.

In order to ensure that the mini disk of which contents have not been updated yet and a mini disk which has been updated have the unique authentication data, it is necessary to provide the authentication data in accordance with a common frame work in any case. More specifically, the apparatus for generating authentication data 710, used when the authentication data 710 is allotted during manufacturing of mini disk, may be considered as one of the authentication data generating apparatus 876. By allocating a unique ID number to such an apparatus and by adapting the authentication data to have 128 bit data as shown in FIG. 46, it becomes possible to ensure uniqueness of the authentication data in all the mini disks.

Tenth Embodiment

Figure 49:
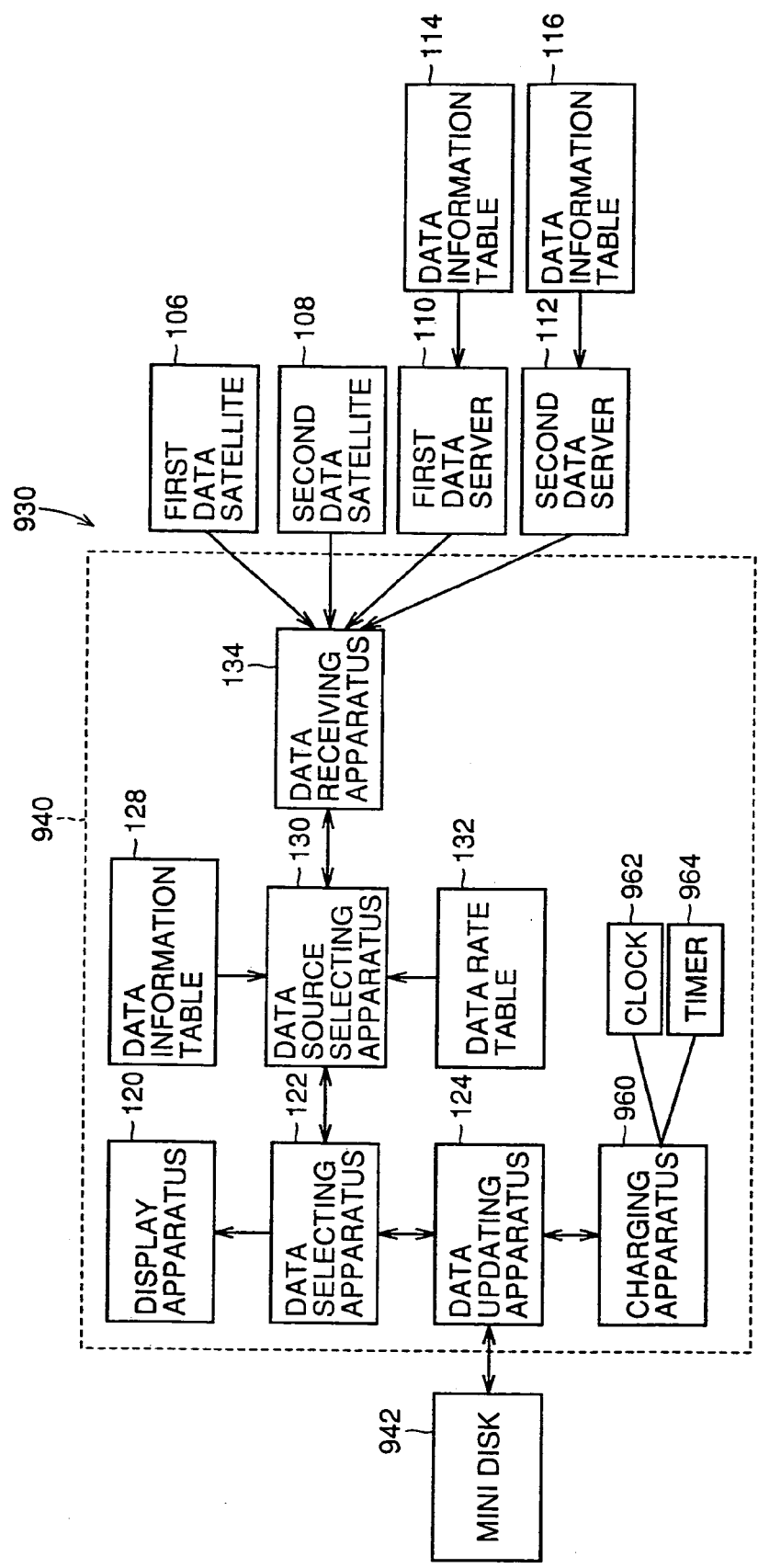
FIG. 49 is a block diagram of a data distribution system in accordance with the tenth embodiment of the present invention.

FIG. 49 is a block diagram representing a data distribution system 930 in accordance with the tenth embodiment of the present invention. In FIG. 49, portions corresponding to those of FIG. 1 are denoted by the same reference characters. The portions have the same names and same functions. Therefore, detailed description thereof will not be repeated here.

The feature of the data distribution system 930 in accordance with the tenth embodiment is that the charge for use of data is determined based on the time while the data is held mini disk 942, in the present system 930. The time is calculated when the data held in mini disk 942 is updated, and the user is charged by the time.

Figure 50:
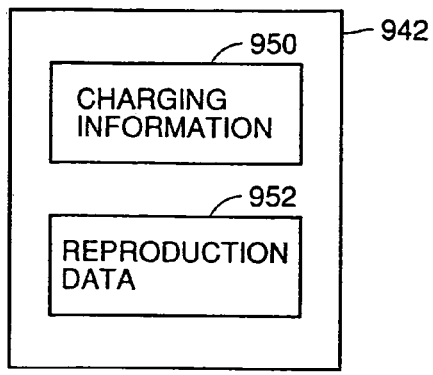
FIG. 50 is a schematic diagram representing a data configuration of a mini disk used in the tenth embodiment.

Referring to FIG. 49, the data distribution system 930 differs from data distribution system 100 shown in FIG. 1 in that in place of data vending machine 102, a data vending machine 940 is provided which includes, in place of the charging apparatus 126, a clock 962, a timer 964 and a charging apparatus 960 determining the charge for the data by making reference to the clock 962 and the timer 964. A mini disk 942 used in the data distribution system 930 stores charging information 950 and reproduction data 952, as shown in FIG. 50. Charging information 950 includes, as shown in FIG. 51, data update time 970, data charge 972 and data update number 974.

Figure 51:
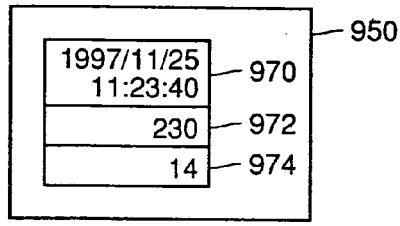
FIG. 51 is a schematic diagram showing contents of charging information stored in the mini disk.

The data charge 972 shown in FIG. 51 stores the charge of data per 24 hours. It is assumed that the same information is stored in price field 144 of data information table 128 (see FIG. 2).

Again referring to FIG. 49, it is assumed that the clock 962 maintains year, month, day as well as hour, minute and second. Many timer may be used as timer 964, provided that is capable of measuring a prescribed time period. Here, the timer 962 is assumed to measure the time period of 20 seconds. As will be described later, timer 964 is provided for implementing more practical user interface of data distribution system 930, and it is not an indispensable component of data distribution system 930.

Figure 52:
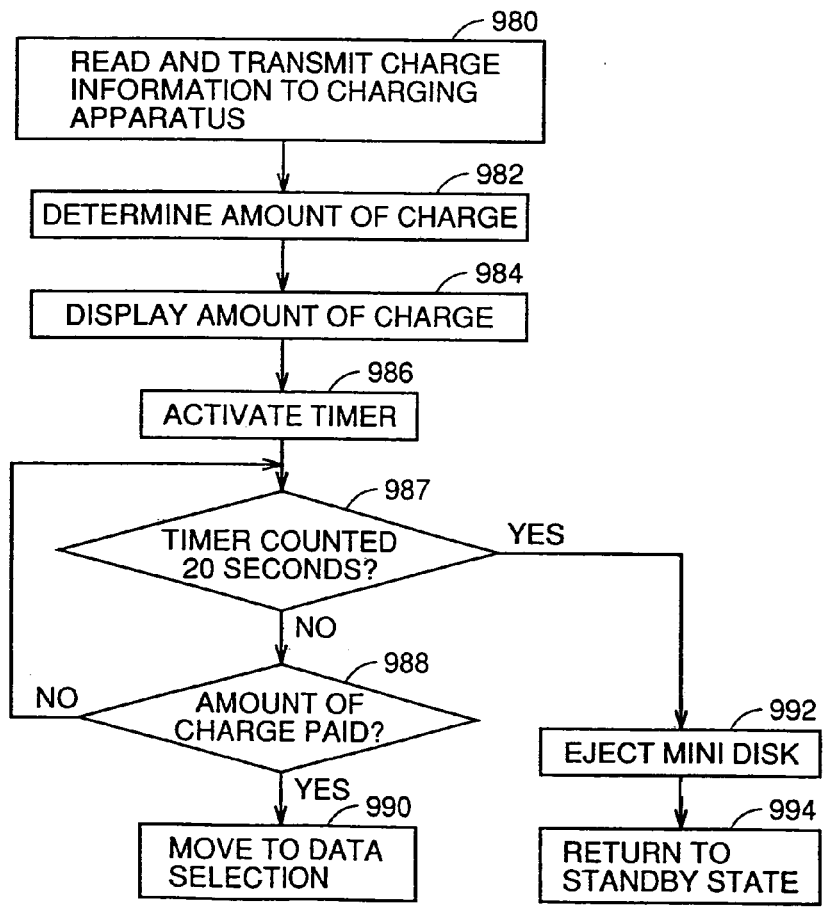
FIG. 52 is a flow chart showing a former half of the operation of the data vending machine in accordance with the tenth embodiment.

In the following, the operation of data vending machine 940 when the user inserts a mini disk 942 to data updating apparatus 124 of date vending machine 940 will be described with reference to the flow chart of FIG. 52.

When mini disk 942 is inserted, data updating apparatus 124 reads charge information 950 from mini disk 942, and transmits to charging apparatus 960 (980). Charging apparatus 960 refers to the present time obtained from 962, the data update time 970 and data charge 972, and determines the amount of charge (982). There may be various methods of determining the amount of charge by the charging apparatus 960. Here, the amount of charge is determined, for example, in accordance with the following equation.

Amount of charge=unit price*(present time−last data update time)/24 hours.

Here, the unit price is stored in data charge 972 (see FIG. 51), and represents the charge of data per 24 hours. The last data update time in the equation above can be obtained from data update time field 970.

Charging apparatus 960 displays the amount of charge determined in this manner on display apparatus 120 (984). Charging apparatus 960 further activates timer 964 (986). Timer 964 starts counting of time for 20 seconds. When the time is up, (YES in step 987), data updating apparatus 120 ejects mini disk 942 (992), and returns to the standby state (994).

If the counting of timer is not yet completed (NO in step 987), whether the user paid the charge amount calculated in the above described manner or not is determined (988). Until the charge amount is paid, or until the end of timer operation, the determinations of steps 987 and 988 are repeated. When the user pays the prescribed amount of charge (YES in step 988), the operation mode moves to data selection (990).

Figure 53:
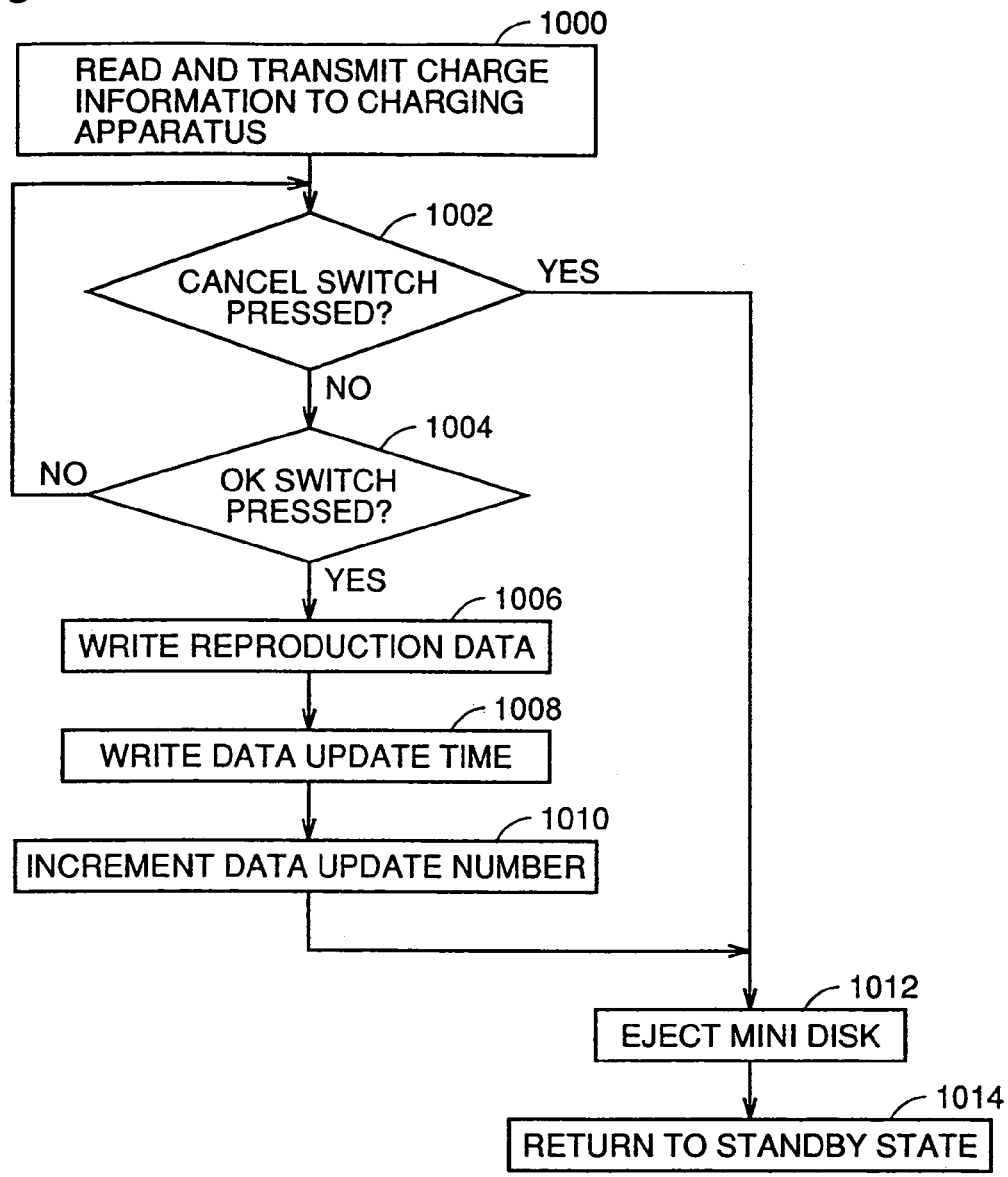
FIG. 53 is a flow chart showing a latter half of the operation of the data vending machine in accordance with the tenth embodiment.

Thereafter, the operation of data distribution system 930 immediately before the data selecting apparatus 122 displays the price of data obtained from price field 144 (see FIG. 2) of data information table 128 on display apparatus 120 is the same as that of the first embodiment. Therefore, detailed description thereof will not be repeated here. In the following, the operation of data distribution system 930 after the data selecting apparatus 122 displayed the price of data on display apparatus 120 will be described with reference to the flow chart of FIG. 53.

Data selecting apparatus 122 displays the price of data obtained from the price field 144 (see FIG. 2) of data information table 128, on display apparatus 120 (100). Different from the first embodiment, the payment by the user takes place when the data is updated next time. Therefore, here, user does not pay. The price depends on the time passed until the next updating, and hence the price itself cannot be displayed. Therefore, it is desired that a message explicitly notifying the user of the method of charge such as "200 yen per day" or "1000 yen up to one week, 50 yen per day thereafter" is displayed. It is needless to say that such a display of message is unnecessary if the method of charge is announced sufficiently to the user by other means.

The user presses the OK switch 176 or cancel switch 178 shown in FIG. 4. When cancel switch 178 is pressed (YES in step 102), data updating apparatus 120 ejects mini disk 942 (1012), and the data vending machine 940 returns to the standby state (1014).

When the cancel switch is not pressed in step 1002, whether the OK switch 176 is pressed or not is determined (1004). When the OK switch 178 is pressed, data receiving apparatus 134 receives data from the data source, and transfers the received data to data updating apparatus 124. Data updating apparatus 124 writes the transferred data to reproduction data 952 of mini disk 942 (106).

Charging apparatus 960 transmits the present time obtained from clock 962 to data updating apparatus 124. Data updating apparatus 124 writes the present time to data update time 970 of mini disk 942 (1008). Data updating apparatus 124 writes the contents of price field 144 of data information table 128 to data charge 972 of mini disk 942 (1008), increments the contents of data update number 974 (1014), and finally ejects the mini disk 942 (1012). Thereafter, data vending machine 940 returns to the standby state (1014).

In this example, the charge is simply based on the time how long the data is held on mini disk 942. The method of determining the amount of charge is not limited thereto. For example, the amount of charge may be determined by a general function of the time for which the data is held in mini disk 942, or it may be the function of both the held time and the number of updating 974. For example, if the updating number 974 is large, the amount of charge may be set low. Various other system of charging may be possible, dependent on the policy of the operator of data distribution system 930.

Eleventh Embodiment

Figure 55:
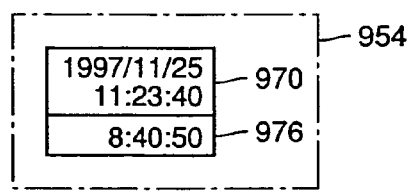
FIG. 55 is a block diagram of a data reproducing apparatus in accordance with the eleventh embodiment.

The data distribution system in accordance with the eleventh embodiment of the present invention will be described. The data distribution system can be implemented by the same hardware as the data distribution system 930 of the tenth embodiment shown in FIG. 49. The eleventh embodiment differs from the system of the tenth embodiment in its operation, which will be described in the following. The charging information of a mini disk in the eleventh embodiment is not the charging information 950 shown in FIG. 51 but the charging information 954 shown in FIG. 55. The charging information 954 includes data update time 970 and record of data use 976. Record of data use 976 is for keeping history of the reproduction data 952 of the mini disk (see FIG. 50) reproduced by the data reproducing apparatus. In this example, it is assumed that the record of data use 976 stores the total time of reproduction of reproduction data 952 by the data reproducing apparatus.

In this example, the amount of charge is determined by the charging apparatus 960 (see FIG. 49) in accordance with the following equation.

Amount of charge=constant*(record of data use 976*0.9+time passed from last update of data*0.1)

Here, the time past from the last update of data can be obtained as the difference between the present time obtained from clock 962 and the contents of data update time 970.

This method of calculation prevents excessive charge for the data not much used, through it has been held for a long period of time on mini disk 942. In other words, the charge is by the actual time of use of the data. In the equation above, the values (0.9 and 0.1) used as weights for efficiency are, of course, only the examples for description, and any value may be used as these coefficients based on the policy of the operator.

In the operation of the eleventh embodiment, what is different from the operation of data distribution system 930 in accordance with the tenth embodiment is that the contents of display when the data selecting apparatus 122 displays the interval of data obtained from data information table 128 is changed in accordance with the change in the method of calculating the amount of use, and that the data reproducing apparatus must have a function of recording the time of data use, so as to keep the record of data use 976. Except for these points, the data distribution system of the eleventh embodiment is the same as the data distribution system of the tenth embodiment both in hardware and in operation. Therefore, detailed descriptions thereof are not repeated here.

The method of calculating the amount of charge in the present embodiment is not limited to those described above. For example, regardless of the data update time 970, the amount of charge may be calculated as a function solely of the record of data use 976. In that case, clock 962 is unnecessary. Alternatively, the amount of charge may be set to 0 if the time recorded on the record of data use 976 is shorter than a prescribed value.

Figure 54:
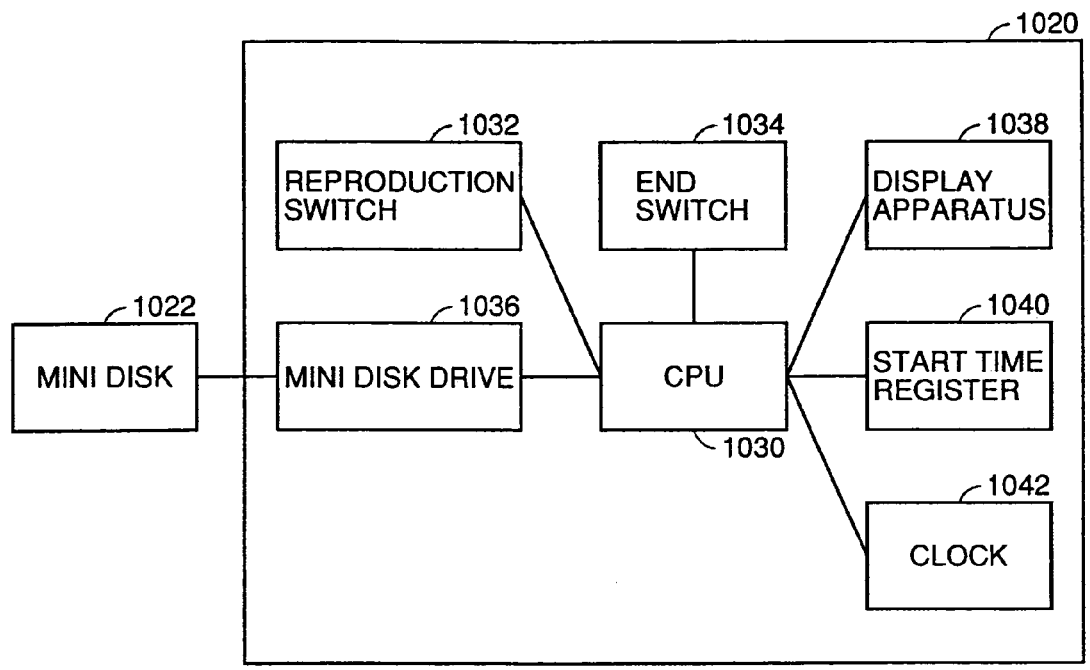
FIG. 54 is a schematic diagram showing contents of the charging information in accordance with the eleventh embodiment.

FIG. 54 shows an example of a data reproducing apparatus for keeping the record of data use 976. Referring to FIG. 54, the data reproducing apparatus 1020 includes a CPU 1030, a mini disk drive 1036, a display apparatus 1038, a reproduction switch 1032, an end switch 1034, a clock 1042 and a start of use time register 1040. The start of use time register 1040 is for storing the contents of clock 1042 when the reproduction switch 1032 is pressed. When the end switch 1034 is pressed, CPU 1030 calculates, based on the contents of clock 1042 and start of use time register 1040, the time of use of the reproduction data in mini disk 1022.

The data reproducing apparatus operates in the following manner. First, the user inserts mini disk 942 to mini disk drive 1036. Further, the user presses the reproduction switch 1032. Thus, reproduction starts. In response to pressing of reproduction switch 1032, CPU 1030 stores the contents of clock 1042 at that time in the start of use time register 1040. When the user presses the end switch 1034, CPU refers to the contents of clock 1042 at that time, calculates the difference between the contents of clock 1042 and the start of use time register 1040, and writes the difference to the record of data use 976 of mini disk 942. Mini disk drive 1036 ejects mini disk 942. In the calculation described above, CPU 1030 ignores the reproduction switch 1032 once the reproduction switch 1032 is pressed, until the end switch 1034 is pressed next.

By the use of the data reproducing apparatus 1020, it becomes possible to update the record of data use 976 of mini disk 942 in accordance with the time of data use, and the data distribution system 930 of the eleventh embodiment can be implemented.

Twelfth Embodiment

An electronic book display apparatus preventing distribution of unauthorized copies will be described. The electronic book displaying apparatus reproduces and displays electronic book data such as a magazine, a novel or cartoons, as digital data (hereinafter referred to as "electronic book data"). Though an electronic book displaying apparatus is described as an example of this embodiment, the present invention is generally applicable to an apparatus which reproduces and displays digital data.

The electronic book display apparatus in accordance with the twelfth embodiment is characterized in that an ID number is allocated in advance to the display apparatus, and the operation of the display apparatus is controlled with reference to the ID number of the display apparatus.

Figure 56:
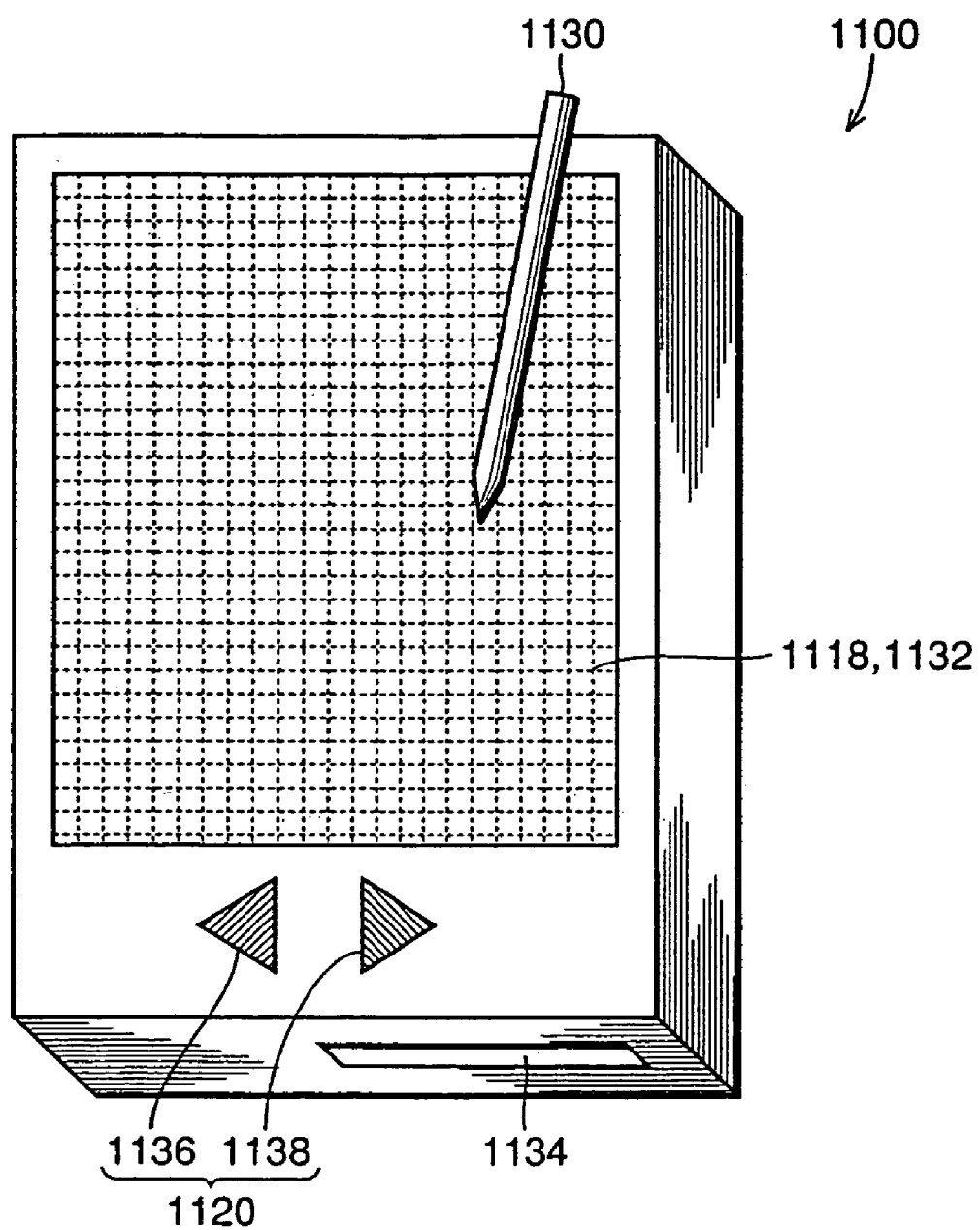
FIG. 56 is a schematic diagram showing an appearance of an electronic book reproducing apparatus in accordance with the twelfth embodiment.
Figure 57:
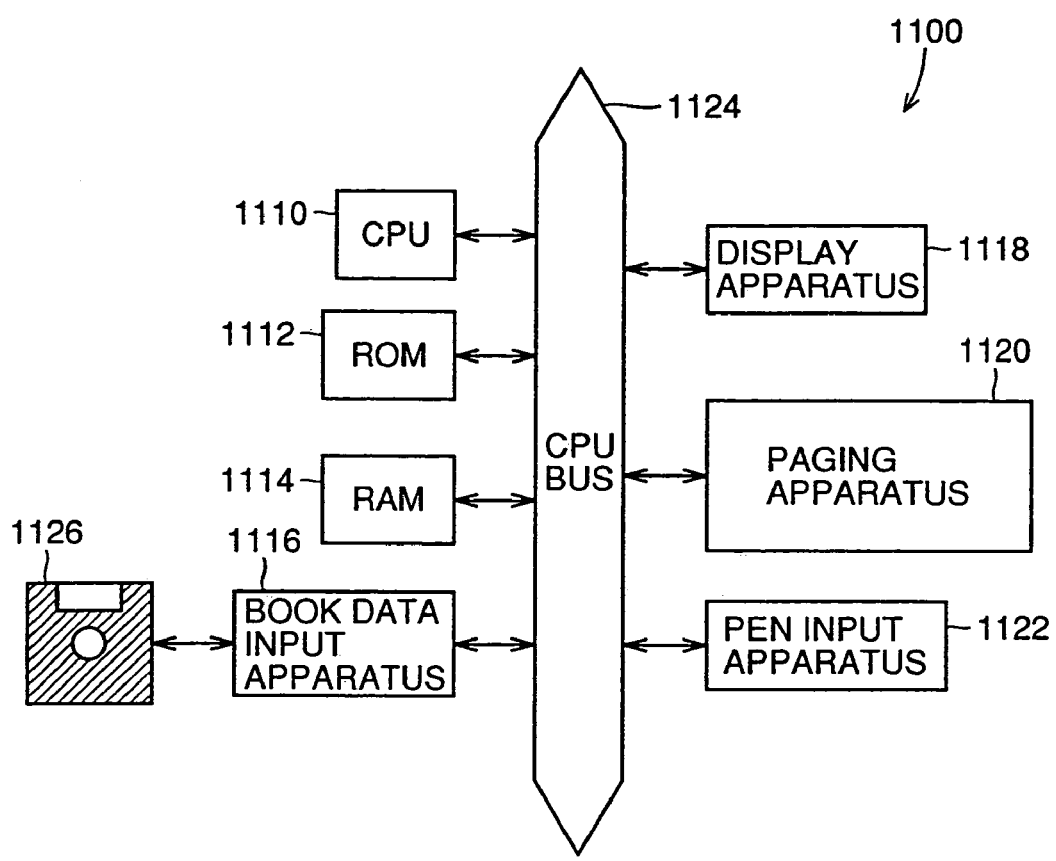
FIG. 57 is a block diagram of the electronic book reproducing apparatus in accordance with the twelfth embodiment.

FIG. 56 shows an appearance of the electronic book displaying apparatus in accordance with the twelfth embodiment, and FIG. 57 shows a block configuration thereof. Referring to FIGS. 56 and 57, the electronic book displaying apparatus includes a CPU 110 for controlling the overall apparatus, an ROM (Read Only Memory) 1112 storing a control program for that apparatus and ID information unique to the display apparatus itself, an RAM 1114 storing a program for operating the electronic book displaying apparatus as well as the work area of the program and the book data, a book data input apparatus 1116 for reading and reproducing book data recorded on a storage medium 1126 or recording ID information, such as a disk drive or a communication network, a display apparatus 1118 for displaying the reproduced book data, a paging apparatus 1120 operated by the user to instruct turning of the page of the displayed electronic book, a pen input apparatus 1122 used for the user to enter ID information to update the display apparatus ID information recorded on the book data, and a CPU bus 1124 for connecting the components of the apparatus to each other.

CPU 1110 performs processes for reproduction, recording and display of the book data, by controlling the book data input apparatus 1116 and the display apparatus 1118, in accordance with the control program stored in ROM 1112. Further, CPU 1110 has a function of performing various processes in accordance with a user's instruction, through the paging apparatus 1120 or a pen input apparatus 1122.

Referring particularly to FIG. 56, display apparatus 1118 consist of a liquid crystal display apparatus, and a transparent tablet 1132 is adhered on a surface of the display screen. Tablet 1132 and a pen 1130 constitute the pen input apparatus 1122.

Two buttons 1136 and 1138 are provided below the display apparatus 1118, and these two buttons constitute the paging apparatus 1120. More specifically, by pressing the right side button 1134, the displayed page proceeds to a certain direction, and by pressing the button 1136, the displayed page proceeds to the opposite direction. FIG. 56 shows a storage medium inlet 1134, through which storage medium 1126 is inserted to book data input apparatus 1116.

Figures 58, 59:
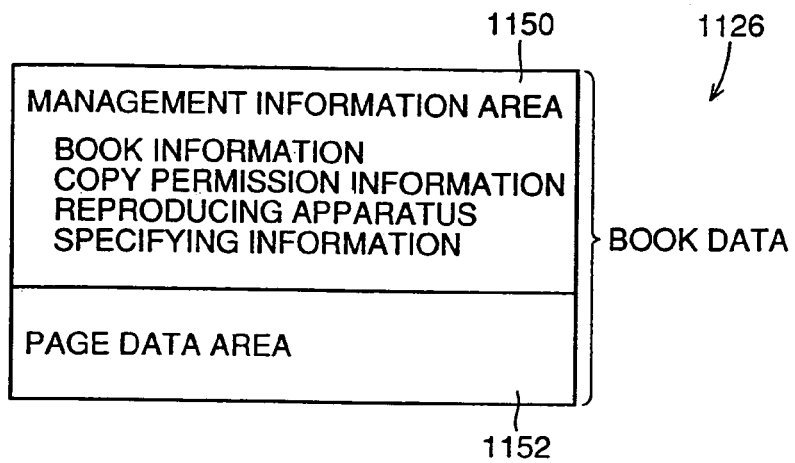
FIG. 58 is a schematic diagram showing contents of the book data in accordance with the twelfth embodiment.
FIG. 59 is a schematic diagram showing a configuration of a management information area in accordance with the twelfth embodiment.

Referring to FIG. 58, the book data stored in storage medium 1126 has a management information area 1150 and page data area 1152. Management information area 1150 includes bibliographic information, copy permission information and reproduction apparatus specifying information. The page data area stores, page by page, the actual data of the book. Generally, the storage medium 1126 is an IC card or a flexible disk.

Referring to FIG. 59, management information area 1150 includes: management information area identifier 1160 indicating that the area is the management information area; a data size 1162 of the management information area; a bibliographic information area 1164 recording the title, author and the like of the book recorded on page data area 1152; a copy permission information area 1166 indicating whether the copy of the book data is permitted or not; a reproducing apparatus specifying information area 1168 specifying the apparatus by which the page data of the book is reproduced and displayed; and a free area 1170. In FIG. 59, the numerals on the right side of respective areas represent number of bytes of the data stored in the respective areas.

Referring to FIG. 60, the copy permission information area 1160 includes a copy permission information identifier 1180 indicating that the area is the copy permission information area, a data size 1182 of the copy permission information area, and a copy permission value 1184 specifying whether the copy is permitted or not. In FIG. 60 also, the numerals on the right side of each area represents the length thereof in byte number. It is assumed that as the copy permission value, 0×01 is recorded when the copy of the data is permitted and 0×00 is recorded when the copy is prohibited (not permitted), by the creator of the book data, in advance.

The characteristic of the electronic book displaying apparatus 1100 in accordance with the present embodiment is that each apparatus has different display apparatus ID information allocated in advance. The display apparatus ID information is recorded in reproduction apparatus specifying information area 1168 shown in FIG. 59, and by comparing the contents of the reproduction apparatus specifying information area 1168 with the display apparatus ID information of the actual reproduction apparatus at the time of reproduction, whether the data is to be displayed or not is determined. In this embodiment, nothing is recorded in the reproduction apparatus specifying information area 1168 until the book data is reproduced for the first time, and when the book data is reproduced for the first time, the ID information of the display apparatus which reproduced the data is written. The ID information may be updated in the following manner if necessary.

If it is possible to write the ID information of the display apparatus to the reproduction apparatus specifying information area 1168 before the first reproduction of book data, it may be written. For example, at the time of sales of the book data to the user, if it is possible for the user to present the ID information of the display apparatus held by the user, such an approach may be possible. In that case, the ID information of the presented display apparatus may be written to the reproduction apparatus specifying information area 1168 of the book data, and the storage medium may be sold thereafter.

The display apparatus ID information may be stored encoded in a predetermined method, to the reproduction apparatus specifying information area 1168, so as to prevent easy decoding by the user. In order to discourage unauthorized copying, not only the display apparatus ID information but also a password registered by the user may be encoded and stored in the reproduction apparatus specifying information area 1168 or the free area 1170, and the book data may be displayed when and only when both of these are entered correctly. If the electronic book display apparatus of the present invention is provided as a software for a general purpose apparatus such as a personal computer, information unique to the software to operate the general purpose apparatus as the electronic book displaying apparatus of the present invention may be used as the display apparatus ID information.

Referring to FIG. 61, reproducing apparatus specifying information area 1168 includes a display apparatus ID information identifier 1190 indicating that the display apparatus ID information is stored in this area, a data size 1192 of the area 1168, and the ID information 1194 of the display apparatus on which the book data is displayed.

Figure 62:
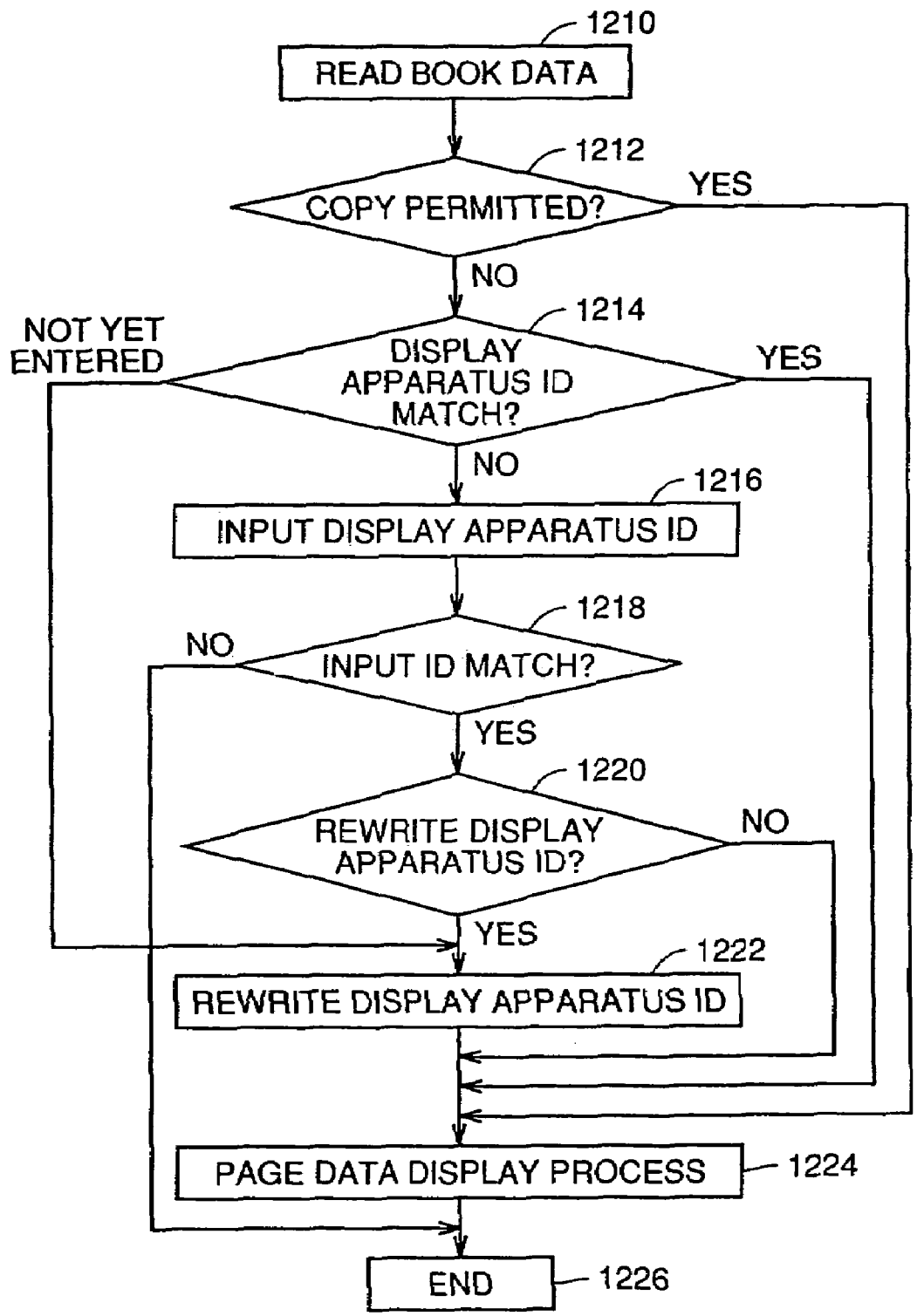
FIG. 62 is a flow chart representing an operation of the apparatus in accordance with the twelfth embodiment.

Referring to FIG. 62, the operation of the electronic book displaying apparatus in accordance with the twelfth embodiment will be described. First, book data recorded on a storage medium 1126 is read by book data input apparatus 1116, and reproduction of the data starts (1210). Thereafter, copy permission value 1184 in copy permission information area 1166 included in the management information area 1150 of the read book data is checked (1212). If the copy of the book data is permitted (YES in step 1212), the process for displaying page data takes place in step 1224, and the process terminates as soon as the display terminates (1226).

If it is determined that the copy is not permitted in step 1212 (NO), whether the display apparatus ID information 1194 in the reproducing apparatus specifying information area 1168 matches the ID information of the display apparatus used for the display this time is determined (1214). If the display apparatus ID information 1194 is not yet written, the display apparatus ID rewriting process (1222) is performed. In step 1222, the display apparatus ID information recorded in the ROM 1112 (see FIG. 57) of the display apparatus reproducing the book data is recorded in display apparatus ID information 1184 of the book data. Thereafter, the process proceeds to the page data displaying process 1224.

Again referring to FIG. 62, when the display apparatus ID information 1194 recorded in the book data matches the ID information of the display apparatus presently reproducing the book data (YES) in step 1214, the page data displaying process (1124) takes place.

In step 1214, when the display apparatus ID information 1194 stored in the book data is different from the display apparatus ID information recorded in the ROM 1112 of the display apparatus presently reproducing the book data (NO), the control proceeds to step 1216. In step 1216, a prompt urging input of the display apparatus ID information displayed the book data last time is given on display apparatus 1118, asking the user to input. More specifically, referring to FIG. 56, a keyboard image is displayed on display apparatus 1118, and it is possible for the user to enter the character string of the ID information by tapping the keys on the keyboard image by a pen 1130.

Thereafter, whether the ID information input in this manner matches the contents of display apparatus ID information 1194 is determined (1218). If these two do not match, the process is terminated without displaying the data (1226). When there is a match in step 1218, the user is asked whether the display apparatus ID information 1194 recorded in the book data is to be overwritten by the display apparatus ID information of the apparatus presently reproducing the book data (1220). If the user instruct that the rewriting is unnecessary, then the page data displaying process 1224 is performed. When there is an instruction of rewriting, the display apparatus ID information 1194 is re-written with the display apparatus ID information of the electronic book reproducing apparatus presently reproducing (1222), and page data displaying process (1224) is performed.

The processes in steps 1218 to 1222 are for the convenience of a user having a plurality of electronic book display apparatuses in accordance with the present invention. Without such processings, when the user wishes to reproduce a book data by an apparatus different from the one used last time, the display apparatus of ID information of the apparatuses do not match, preventing reproduction. By the process of steps 1218 to 1222, it becomes possible for the user having a plurality of electronic book displaying apparatuses, to reproduce the same book data by different apparatuses.

As described above, as the display apparatus ID information specifying a display apparatus by which reproduction is permitted is recorded and managed in the book data, whereby the following effects can be achieved. When the book data is copied as it is and an attempt is made to reproduce the copy by other display apparatus, the contents of the display apparatus ID information 1194 in the book data is different from the ID information of the other display apparatus. Therefore, unless the original display apparatus ID information is known, it is impossible to reproduce the copied book data by the process of steps 1216 to 1218. As long as the display apparatus same as the original display apparatus is used, the page data display process (1224) starts without fail, from the process of step 1214, and therefore a legitimate user is allowed to reproduce and display the book data without any restriction. Therefore, reproduction or display by the legitimate user of the personally copied book data for back up, for example, is not restricted. Further, even a display apparatus having different ID information from the display apparatus ID information recorded on the book data is capable of reproducing the book data, if the user enters the ID information same as the ID information recorded on the book data. Therefore, when the user has a plurality of display apparatuses, any display apparatus may be used for reproduction, if the correct ID information of the original display apparatus is known.

Thirteenth Embodiment

The electronic book display apparatus in accordance with the thirteenth embodiment of the present invention will be described with reference to FIG. 63 and the following. The characteristic of the present apparatus is that an operation of the display apparatus is controlled by a unique ID information recorded on an external medium, different from the storage medium of the book data.

Figure 63:
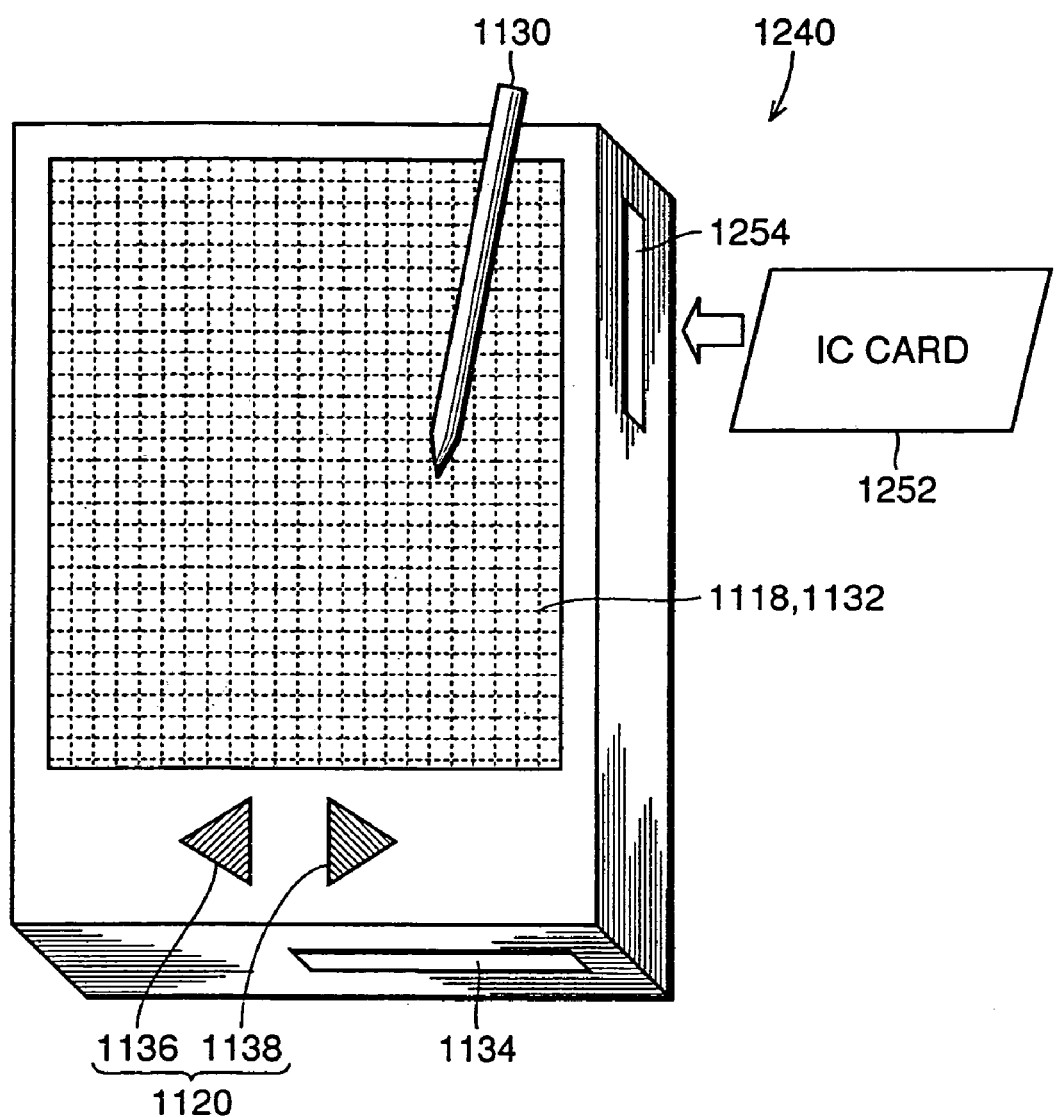
FIG. 63 is a schematic diagram showing an appearance of an electronic book reproducing apparatus in accordance with a thirteenth embodiment.
Figure 64:
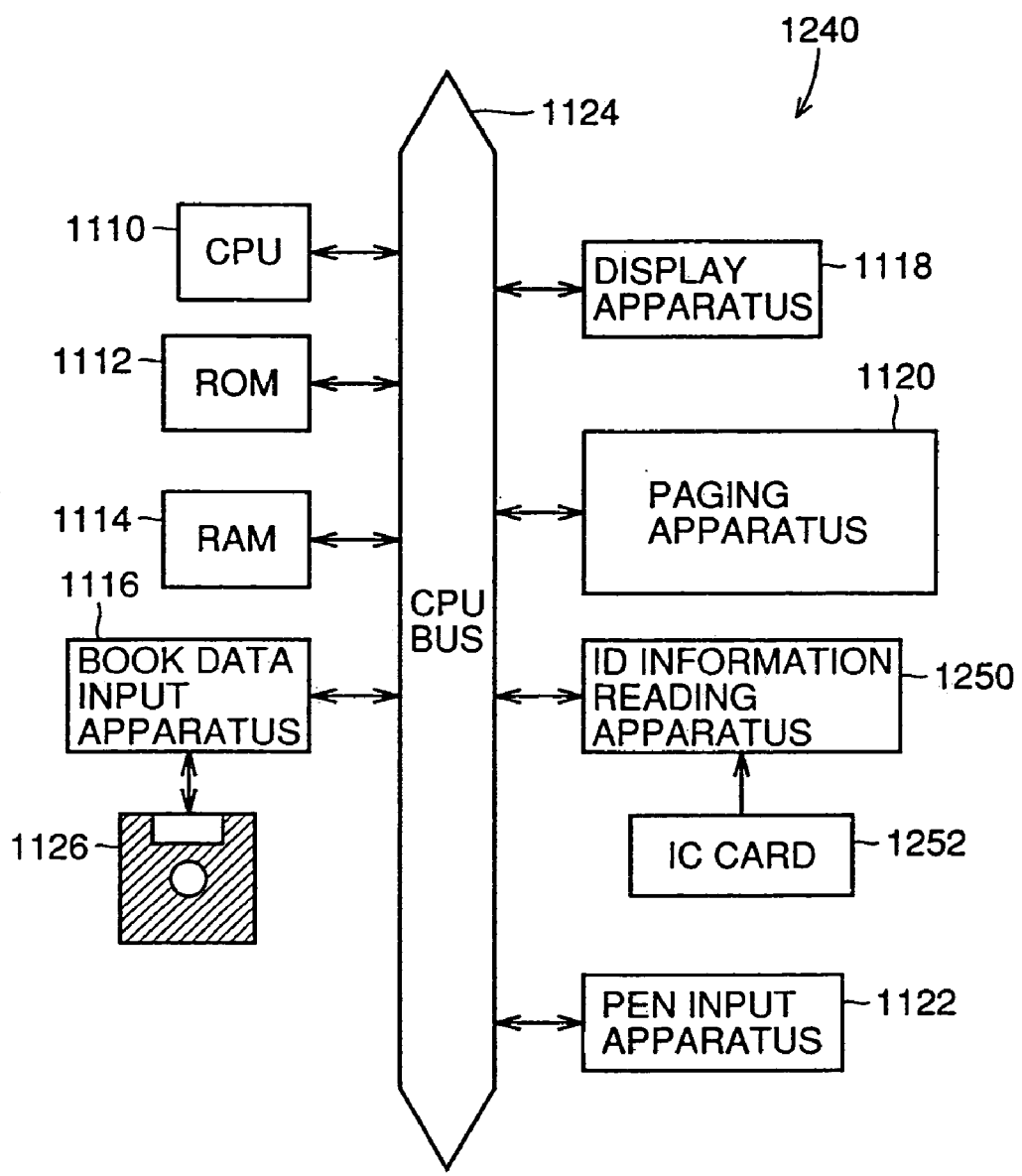
FIG. 64 is a block diagram of the electronic book reproducing apparatus in accordance with the thirteenth embodiment.

FIG. 63 shows the appearance of the electronic book displaying apparatus in accordance with the thirteenth embodiment, and FIG. 64 is a block diagram thereof. In FIGS. 63 and 64 and FIGS. 56 and 57, corresponding portions are denoted by the same reference characters and named by the same names. Functions are also the same. Therefore, detailed description thereof will not be given here.

The electronic book displaying apparatus 1240 in accordance with the thirteenth embodiment differs from the electronic book displaying apparatus 1100 (see FIGS. 56 and 57) of the twelfth embodiment in that an IC card 1252 recording a unique ID information is mounted, and an ID information reading apparatus 1250 connected to a CPU bus 1124 is newly provided for reading the ID information from IC card 1252 and passing the information to CPU 1110. IC card 1252 is mounted to a mounting portion 1254 formed on a side surface of electronic book displaying apparatus 1240, and connected to ID information reading apparatus 1250 within the mounting portion 1254. ID information unique to each IC card (external medium ID information) is recorded on IC card 1252, and it is assumed that each user has his/her own IC card 1252. The external medium for storing the external medium ID information is not limited to such an IC card as used in the present embodiment, and any medium which can store the ID information may be used. For example, medium recording optically readable pattern may be used.

Figure 65:
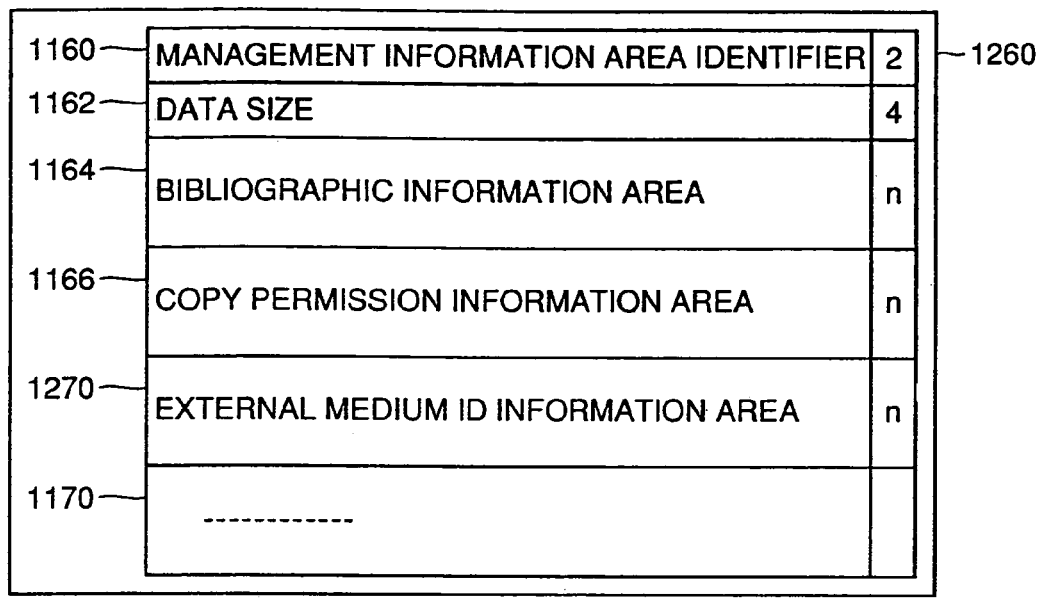
FIG. 65 is a schematic diagram representing a configuration of a management information area in accordance with the thirteenth embodiment.
Figure 66:
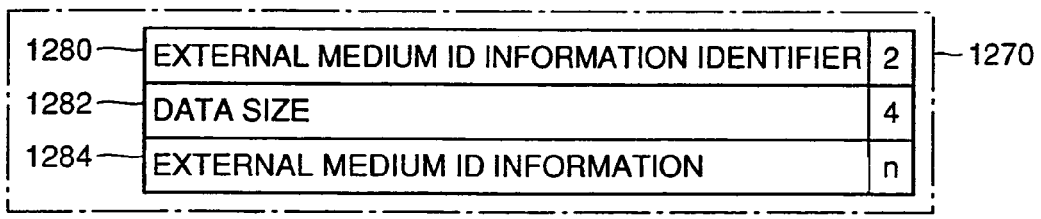
FIG. 66 is a block diagram showing a configuration of an external medium ID information area in accordance with the thirteenth embodiment.

FIG. 65 shows the data format of book data 1260. The book data is different from the book data of storage medium 1126 used in the twelfth embodiment in that in place of the reproducing apparatus specifying information area 1168 shown in FIGS. 59 and 60, it uses one having an external medium ID information area 1270 recording the external medium ID information as shown in FIGS. 65 and 66. Specifically, referring to FIG. 66, external medium ID information area 1270 includes: an external medium ID information identifier 1280 representing that the area is for storing the external medium ID information; a data size 1282 of this area; and an area 1284 storing external ID information recorded on the IC card that must be connected to the electronic book displaying apparatus when the book data 1260 is reproduced and displayed. As the external medium ID information area 1270 is provided in the book data 1260, it is possible to limit the apparatus which can reproduce and display the book data to that one to which the IC card is mounted The method will be described in the following.

Figure 67:
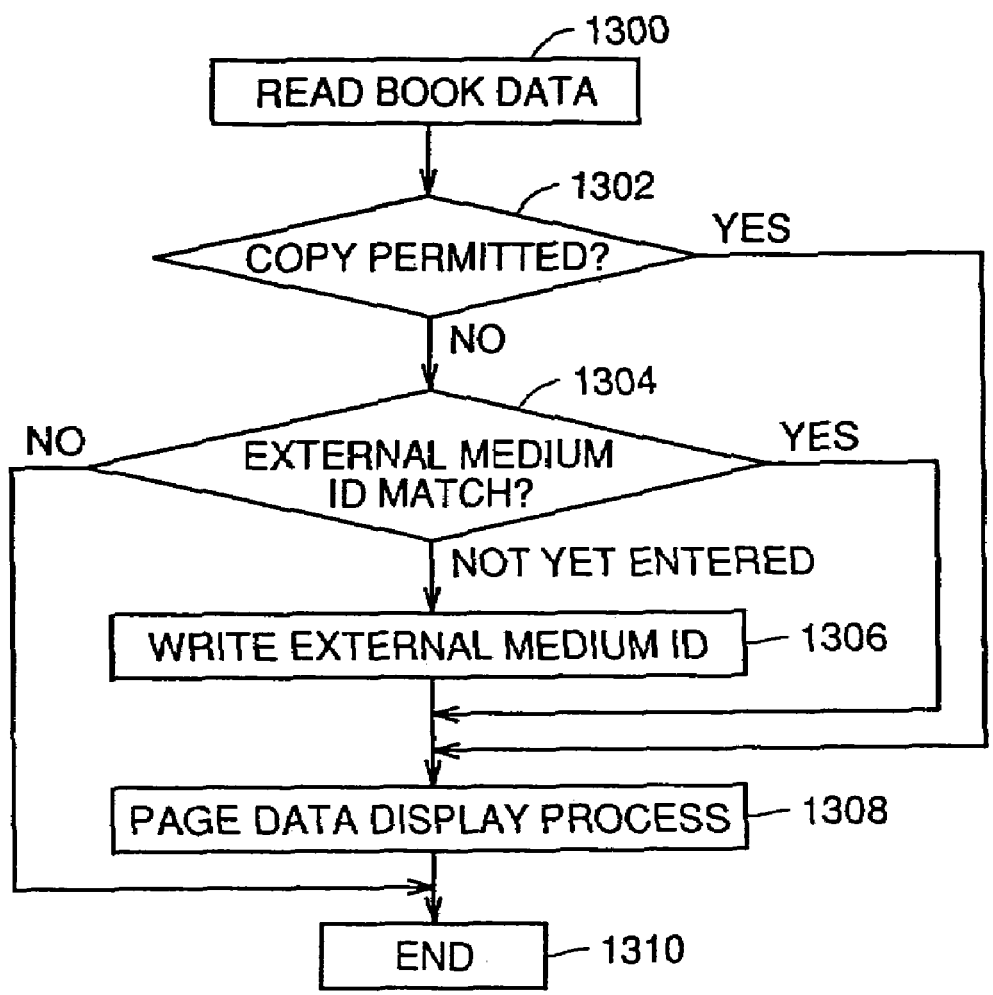
FIG. 67 is a flow chart showing an operation of an electronic book reproducing apparatus in accordance with the thirteenth embodiment.

Referring to FIG. 67, the operation of the electronic book displaying apparatus in accordance with the thirteenth embodiment will be described. First, book data recorded on a storage medium is read through book data input apparatus 1116 and reproduction starts (1300).

Thereafter, the copy permission value 1184 of copy permission information area 1166 (see FIGS. 65 and 60) is referred to, to see if the copy of the book data is permitted or not (1302). If the copy is permitted, the control proceeds to step 1308, and the page data display process takes place.

If the copy of the book data is not permitted, whether the external medium ID information in external medium ID information area 1270 shown in FIGS. 65 and 66 match the ID information of the ID card connected to the electronic book reproducing apparatus reproducing the book data or not is determined (1304). If the information do not match, the process terminates (1310). If the external medium ID information is not recorded in the external medium ID information area 1270 of book data 1260, the ID information in the IC card connected to the apparatus reproducing the book data is written to and recorded into the external medium ID information (1284) (1306), and the process for displaying the corresponding page data is performed (1308), and thereafter the process terminates (1310).

In step 1304, if the external medium ID information 1284 recorded in the book data matches the ID information of the ID card presently connected to the apparatus, the page data display process 1308 is performed without performing the process of step 1306.

As described above, in the present embodiment, each user has an external medium having unique ID information recorded thereon. When each user reproduces the book data, the external medium ID information stored in the IC card mounted by the user to the electronic book reproducing apparatus at that time is recorded in the book data. Thereafter, when the book data is to be reproduced and displayed, the external medium ID information recorded in the book data is compared with the ID information of the IC card mounted to the electronic book reproducing apparatus to be used for reproduction and display, and whether the display is permitted or not is managed dependent on the result of comparison. Therefore, unless the external medium on which the ID information of each user is recorded is mounted to the electronic book display apparatus itself, it is impossible to display the book data, and therefore, reproduction of the book data by an unauthorized user can substantially be prevented. Further, if the user is a legitimate user of the book data to be reproduced, it is possible to reproduce the book data of his own by any apparatus, simply by inserting the external medium on which the unique ID information is recorded, to the electronic book reproducing apparatus.

As described above, in an embodiment of the present embodiment, among data sources holding the same data, such a data source that has the shortest wait time for the user is automatically selected, so that the user's wait time can be reduced. When a data buffering apparatus is used as a data source, the user's wait time can further be reduced, and therefore, even when some of the data sources are slow, influence on the average wait time of the user can be reduced.

When transmission time is automatically allocated to that one of the data transmitted time-divisionally which is selected frequently, the average wait time of the user can be similarly reduced.

In another embodiment of the present invention, a medium copied without authorization cannot be used in the system simultaneously with the original medium. Therefore, while it is possible for a good faith user to make a back up of the data, mass reproduction and distribution through sales of unauthorized copies by a person with ill will can be discouraged. If updating of the contents of a copied medium is prevented at least for a prescribed time period after the updating of the original contents, while a good faith user can make a back up of the data, mass reproduction and distribution through sales of unauthorized copies by a person with ill will can be discouraged.

In the embodiment of the present invention, a system can be provided that can automatically select an optimal data source in accordance with various standards, even when there are a plurality of different data sources.

According to some of the embodiments of the present invention, the charge to the user is automatically determined not at the time of purchase of the data, but based on the actual time period while the user held the data, or on the record of use. If the data is found to be uninteresting after actual reproduction, there would be no charge or just a small amount of charge. This encourages the user to try data casually, and hence promotes on-line data distribution.

According to some of the embodiments of the present invention, even when a user desires data not yet turned to electronic format, it is possible to make an inquiry or place an order to an electronic publisher or the like by the same vending machine. Therefore, it is possible for the user to inquire or place an order of a desired data or a book using the data distribution system, without the necessity of confirming whether the desired data has been put into electronic form.

According to another embodiment of the present embodiment, portions of electronic data matching a search condition entered by the user can be automatically retrieved by a collective unit. Further, it is possible for the user to select which unit is to be used for retrieval. Therefore, there is an advantage that the data can be searched and retrieved in an appropriate form, in accordance with the object of use.

According to another embodiment of the present invention, ID information unique to a display apparatus or to a storage medium mountable to the display apparatus is recorded on a storage medium, and the same ID information is required at the time of reproduction. Therefore, an unauthorized user making an attempt to use a display apparatus different from the original one or using a storage medium having ID information different from the original to display the book data is not allowed to reproduce the digital data. By contrast, a legitimate user has the matching ID information, and hence, allowed to display digital data. Further, when the digital data is dead-copied for back up, for example, it is possible for the legitimate user to see the contents, while it is not allowed for the unauthorized user. Thus, distribution of digital data is promoted, while preventing distribution of unauthorized copies of the digital data.

The embodiments described above are, in every point, examples only and are not to be taken by way of limitation. The scope of the present invention is defined not by the embodiments above but by the claims, and encompasses all modifications and variations within the equivalent meaning and scope of the claims.

INDUSTRIAL APPLICABILITY

As described above, by the data distribution system, data vending machine and the data reproducing apparatus of the present invention, it is possible to make more convenient purchasing of digital data by a user, while preventing distribution of unauthorized copies of digital data. Therefore, the data distribution system, data vending machine and the data reproducing apparatus in accordance with the present invention are suitable to be used in a new data distribution system for distributing digital data through networks.

The invention claimed is:

1. A display apparatus for reproducing and displaying digital data stored on storage media, said digital data including data to be displayed, reproducing apparatus specifying information specifying an apparatus capable of reproduction and copy permission information, said reproducing apparatus specifying information and said copy permission information being stored on said storage media together with said data to be displayed, comprising:
- a memory storing display ID information unique to said display apparatus;
- means for reading out said digital data from said storage media;
- copy permission determining means for checking said copy permission information read out from said storage media separately of said reproducing apparatus specifying information and for determining based on said copy permission information whether copying of said digital data is permitted or not;
- ID information determining means for determining whether the display apparatus is capable of reproducing said data to be displayed based on said display ID information stored in said memory and said reproducing apparatus specifying information; and
- display control means for controlling display and non-display of said data to be displayed dependent on determinations by said copy permission determining means and said ID information determining means.

2. The display apparatus according to claim 1, wherein said display control means controls said display or non-display such that said digital data is displayed regardless of the result of said determination by said ID information determining means, when it is determined by said copy permission determining means that copying of said digital data is permitted.

3. A computer readable media storing a program for causing a computer including a display to execute processes as a display apparatus for reproducing and displaying digital data stored on data storage media, said digital data including data to be displayed, reproducing apparatus specifying information specifying an apparatus capable of reproduction and copy permission information, said reproducing apparatus specifying information and said copy permission information being stored on said storage media together with said data to be displayed, wherein said processes comprise the steps of:
- storing to a storage device associated with said computer display apparatus ID information unique to said program when said program is installed on said computer;
- reading out said digital data from said data storage media;
- checking said copy permission information read out from said data storage media separately of said reproducing apparatus specifying information;
- determining based on said copy permission information whether copying of said digital data is permitted or not:
- determining whether said computer is capable of reproducing said data to be displayed based on said stored display apparatus ID information and said reproducing apparatus specifying information; and
- controlling display and non-display of said data to be displayed dependent on determinations of whether copying of said digital data is permitted and of whether said computer is capable of reproducing said data to be displayed.

4. A display method for causing a computer including a display to execute processes as a display apparatus for reproducing and displaying digital data stored on data storage media, said digital data including data to be displayed, reproducing apparatus specifying information specifying an apparatus capable of reproduction and copy permission information, said reproducing apparatus specifying information and said copy permission information being stored on said data storage media together with said data to be displayed, said method comprising the steps of:
- providing said computer with ID information unique to a program installed on said computer for causing said computer to function as the display apparatus;
- storing to a storage device associated with said computer said ID information unique to said program installed on said computer;
- reading out said digital data from said data storage media;
- checking said copy permission information read out from said data storage media separately of said reproducing apparatus specifying information;
- determining based on said copy permission information whether copying of said digital data is permitted or not:
- determining whether said computer is capable of reproducing said data to be displayed based on said ID information provided to said computer and said reproducing apparatus specifying information stored in said storage media; and
- controlling display and non-display of said data to be displayed dependent on determinations of whether copying of said digital data is permitted and of whether said computer is capable of reproducing said data to be displayed.

* * * * *

UNITED STATES PATENT AND TRADEMARK OFFICE
CERTIFICATE OF CORRECTION

PATENT NO.        : 7,676,401 B2                                              Page 1 of 1
APPLICATION NO.   : 11/314017
DATED             : March 9, 2010
INVENTOR(S)       : Yuji Sawada et al.

It is certified that error appears in the above-identified patent and that said Letters Patent is hereby corrected as shown below:

Title page, please insert Item --(30) Foreign Application Priority Data:

Mar. 26, 1998    (JP)..........................10-78758 (P)
Mar. 31, 1998    (JP)..........................10-85402 (P)--

Signed and Sealed this

Second Day of November, 2010

David J. Kappos
*Director of the United States Patent and Trademark Office*